(12) United States Patent
Ichishi et al.

(10) Patent No.: US 6,170,274 B1
(45) Date of Patent: Jan. 9, 2001

(54) VEHICLE AIR-CONDITIONING SYSTEM WITH AUTOMATIC LOUVER OSCILLATION CONTROL

(75) Inventors: Yoshinori Ichishi, Kariya; Toshifumi Kamiya, Takahama; Katsuhiko Samukawa, Obu; Takayoshi Kawai, Hoi-gun; Yuichi Kajino; Hikaru Sugi, both of Nagoya, all of (JP)

(73) Assignee: Denso Corporation, Kariya (JP)

( * ) Notice: Under 35 U.S.C. 154(b), the term of this patent shall be extended for 0 days.

(21) Appl. No.: 09/310,447

(22) Filed: May 12, 1999

(30) Foreign Application Priority Data

May 13, 1998 (JP) .................................................. 10-130686
Dec. 16, 1998 (JP) .................................................. 10-357159
Mar. 23, 1999 (JP) .................................................. 11-078198

(51) Int. Cl.[7] ............................... F24F 7/00; F24F 13/06
(52) U.S. Cl. ......................... 62/179; 236/49.3; 236/91 C; 454/313
(58) Field of Search .................................... 454/256, 285, 454/313; 236/49.3, 91 C; 62/179, 186

(56) References Cited

U.S. PATENT DOCUMENTS 5,039,008 * 8/1991 Sugawara et al. ..................... 62/179

FOREIGN PATENT DOCUMENTS

| Y2-58-37694 | 8/1983 | (JP) . |
| 61-39610 U | 3/1986 | (JP) . |
| 62-201337 U | 12/1987 | (JP) . |
| 5-32124 | 2/1993 | (JP) . |
| Y2-7-54010 | 12/1995 | (JP) . |

* cited by examiner

Primary Examiner—William Wayner
(74) Attorney, Agent, or Firm—Harness, Dickey & Pierce, PLC

(57) ABSTRACT

A vehicle air-conditioning system for achieving a comfortable blowout state of conditioned air at all times both with respect to air-conditioning load factors which change frequently, like solar radiation strength, and with respect to air-conditioning load factors which change slowly, like passenger compartment temperature, by automatic control of grill louver swing control times corresponding to different air-conditioning loads. For example, when it can be estimated that solar radiation is incident on a driver side or passenger side front or rear seat occupant, oscillating driver side and passenger side center louvers are paused at a swing end of the occupant estimated to be exposed to solar radiation for a time that corresponds to the amount of cooling load. Therefore, it is possible to direct conditioned air at an occupant exposed to sun and thus improve the comfort of occupants upon whom sun is incident.

52 Claims, 61 Drawing Sheets

FIG. 12
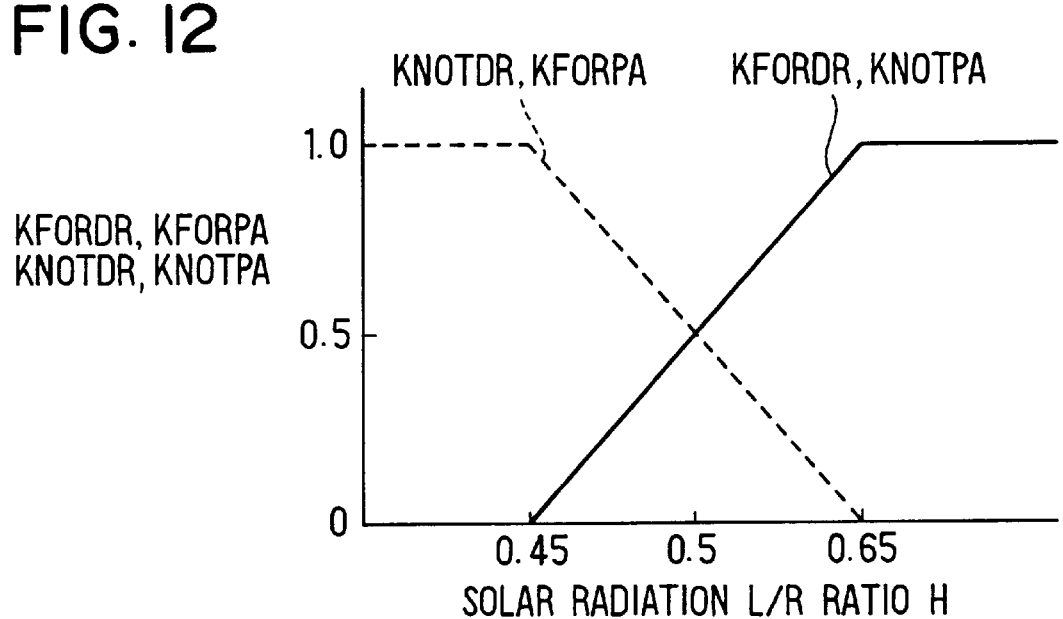
FIG. 13A
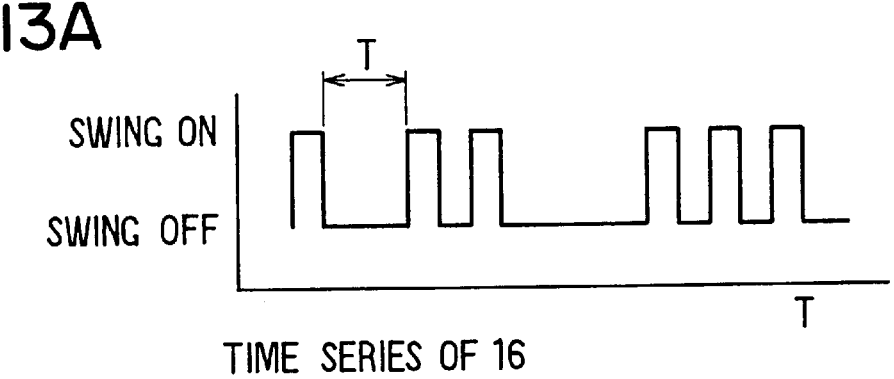
TIME SERIES OF 16
FIG. 13B
OFF TIME SERIES
T = 1, 1, 10, 1, 30, 1, 1, 1, 1, 20, 1, 10, 20, 40, 10, 10
(sec)
RETURN TO START AFTER THIS ONE
OPERATING PATTERN

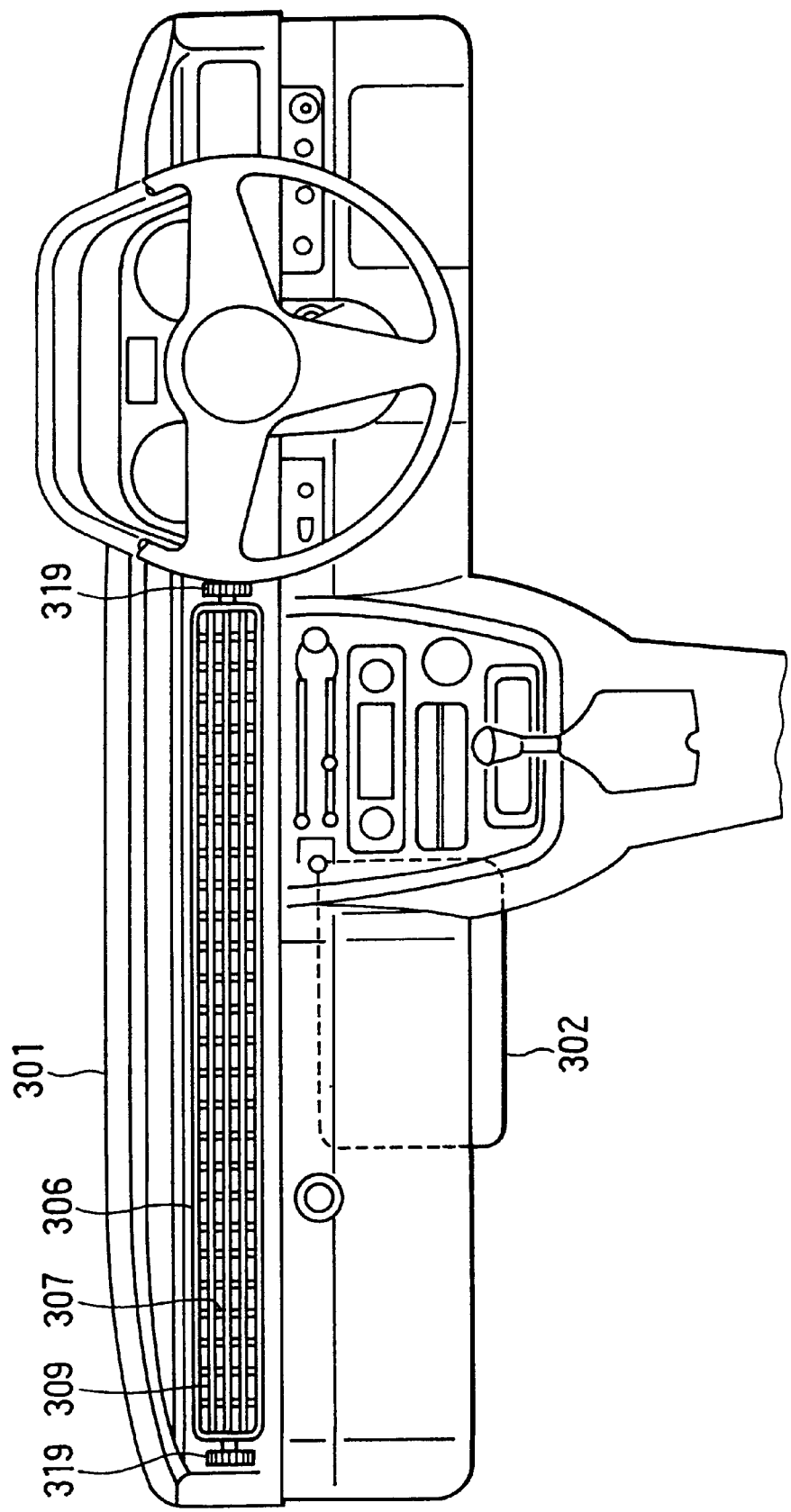

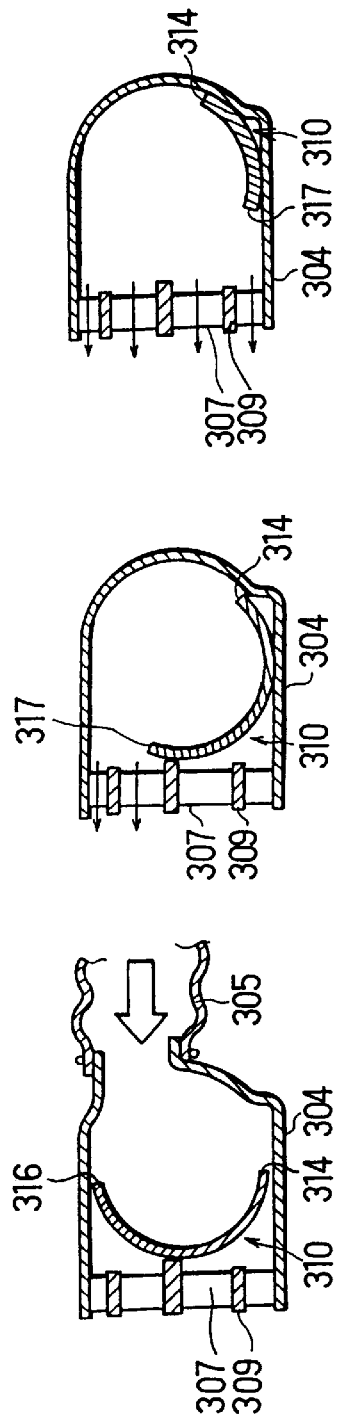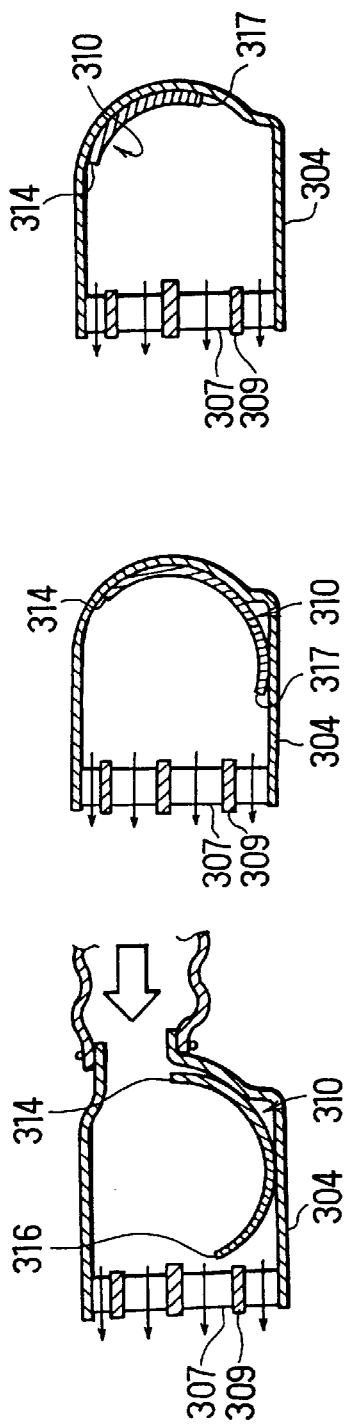

OUTSIDE AIR TEMP. -20°C
SOLAR RADIATION
  INTENSITY 700W/m²
ELEVATION ANGLE: 30°
n = 2

VEHICLE AIR-CONDITIONING SYSTEM WITH AUTOMATIC LOUVER OSCILLATION CONTROL

CROSS-REFERENCE TO RELATED APPLICATIONS

The present application is related to, and claims priority from, Japanese Patent Application Nos. 10-130686, 10-357159, and 11-78198, the contents of which are incorporated herein by reference.

BACKGROUND OF THE INVENTION

This invention relates to generally to vehicle air-conditioning systems, and particularly to a system in which at least an air-conditioning parameter, such as a conditioned air blowout speed or direction, is automatically changed based on sensed conditions to increase the comfort of occupants within a vehicle passenger compartment.

In Japanese Utility Model Publication No. Hei. 7-54010 there is proposed a vehicle air-conditioning system for changing the blowout direction of conditioned air blown from an outlet by imparting an oscillating motion to movable louvers in a swing grill. A switch for setting a time during which the movable louvers are temporarily stopped from swinging is provided at the front of the swing grill. Through the swing louver device, a desired swing state can be obtained by a vehicle occupant setting a swing pause time with the pause time selection switch.

However, with conventional swinging louver devices, it has been very troublesome for the vehicle occupant to have to change the swing pause time via manual operation of the pause time selection switch every time an air-conditioning load influence, such as the amount of solar radiation entering the vehicle, changes. That is, manually adjusting the swing pause time shorter when incident solar radiation is weak, and manually adjusting the swing pause time longer when incident solar radiation is strong, is difficult.

Furthermore, obtaining an optimal swing state with respect to air-conditioning load factors which change slowly as air-conditioning proceeds, such as passenger compartment temperature, are still more complicated. That is, when the passenger compartment temperature is high the swing pause time needs to be set to a relatively long time, and when the passenger compartment temperature is low the swing pause time needs to be set to a relatively shorter time. Manual adjustment therefore becomes even more difficult.

SUMMARY OF THE INVENTION

It is therefore an object of the present invention to provide a vehicle air-conditioning system with which it is possible to obtain a comfortable blowout state of conditioned air at all times both with respect to air-conditioning load factors which change frequently, like solar radiation strength, and with respect to air-conditioning load factors which change slowly, like passenger compartment temperature, by automatically setting louver swing control times corresponding to different air-conditioning loads.

To achieve this and other objects, the present invention provides a vehicle air-conditioning system with an air-conditioning unit having an outlet for blowing conditioned air toward an air-conditioning zone. In the unit, a blowout state of the conditioned air blown from the outlet is changed by a blowout state changing device. An actuator for imparting an oscillating motion to the blowout state changing device. An air-conditioning load detector detects an air-conditioning load of the air-conditioning zone, while a blowout state controller controls the actuator to pause or slow the oscillation of the blowout state changing device for a predetermined time in an occupant direction, when the air-conditioning load detected by the air-conditioning load detecting means is above a predetermined value.

The present invention includes several embodiments, each of which includes a blowout state control device for controlling the actuator to thereby automatically control the blowout of conditioned air. The blowout control device control controls the actuators based on any number of parameters, including incident solar radiation information, so that conditioned air is blown toward, or away from, a particular passenger, for a predetermined amount of time based on the parameters.

BRIEF DESCRIPTION OF THE DRAWINGS

FIG. 12 is a characteristic diagram showing swing range correction coefficients vs. solar radiation left-right ratio according to the first preferred embodiment;

FIG. 13A is a timing diagram showing a random swing operating pattern, and FIG. 13B is a view showing an OFF time series according to the first preferred embodiment;

FIG. 51 is a front view of an instrument panel in accordance with a seventh preferred embodiment of the present invention;

FIGS. 53A–53C are sectional views showing an angular position of the rotary valve in a spot blowout mode according to a seventh preferred embodiment of the present invention;

FIGS. 54A–54C are sectional views showing an angular position of the rotary valve in a wide blowout mode according to a seventh preferred embodiment of the present invention;

DETAILED DESCRIPTION OF THE PREFERRED EMBODIMENTS

First Preferred Embodiment

Figure 1:
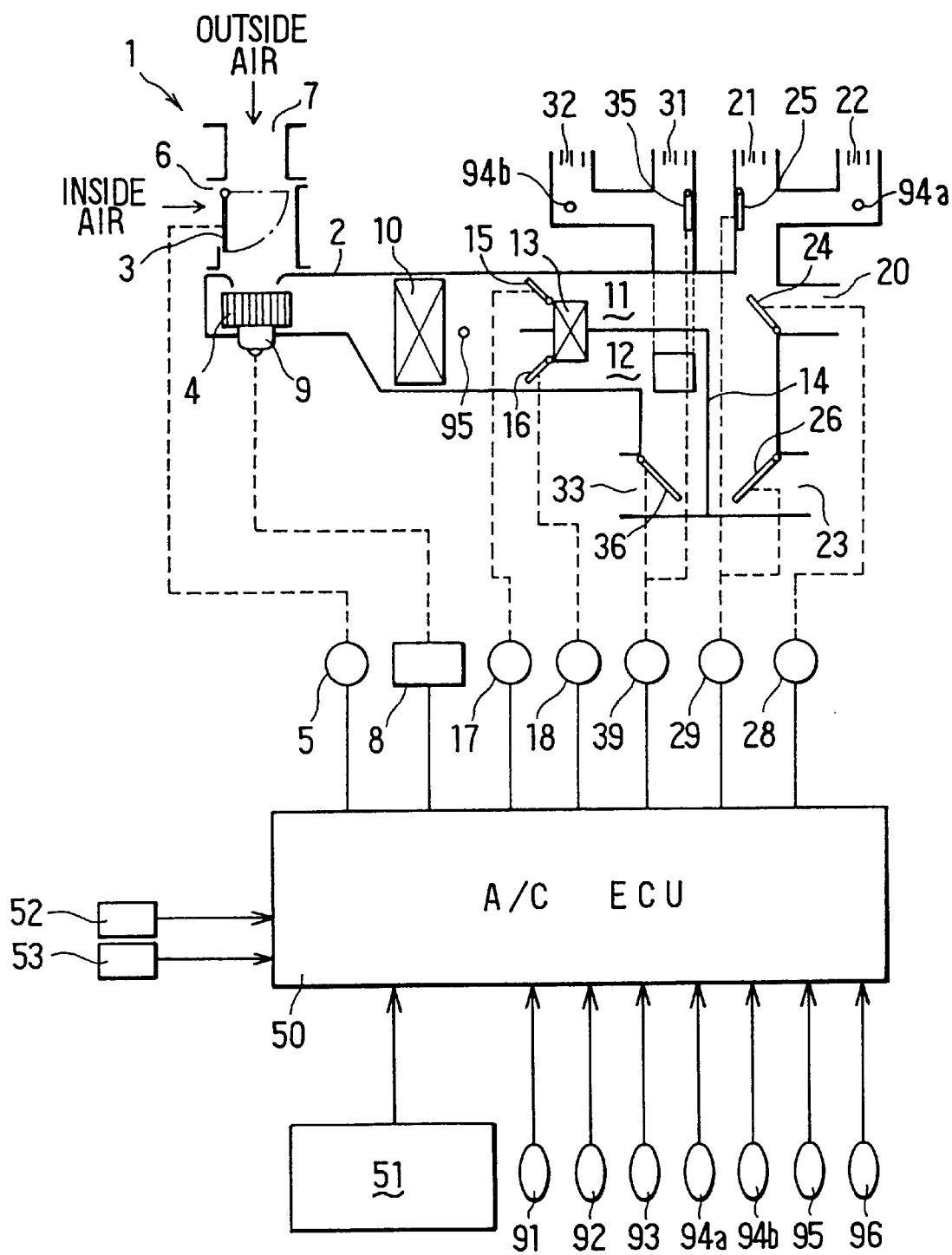
FIG. 1 is a schematic view showing the overall construction of a vehicle air-conditioning system according to a first preferred embodiment of the present invention.

FIGS. 1–44 show a first preferred embodiment of the invention. In the vehicle air-conditioning system of this preferred embodiment, air-conditioning actuators in an air-conditioning unit 1 for air-conditioning a vehicle passenger compartment are controlled by an air-conditioning control unit (hereinafter, air-conditioning ECU) 50. This air-conditioning unit 1 is capable of performing temperature adjustment independently for each of a driver side air-conditioning zone (extending from an occupant of a front right seat to an occupant of a rear left seat) and a passenger side air-conditioning zone (extending from an occupant of a front left seat to an occupant of a rear right seat) in the passenger compartment of the vehicle.

The air-conditioning unit 1 has an air-conditioning duct 2 disposed at the front of the vehicle passenger compartment. An inside/outside air switching door 3 and a blower 4 are disposed at an upstream end of this air-conditioning duct 2. The inside/outside air switching door 3 is driven by an actuator such as a servo motor 5, for changing the apertures of an inside air inlet 6 and an outside air inlet 7 (that is, for changing a so-called inlet mode). The blower 4, which is driven by a blower motor 9 controlled by a blower drive circuit 8, blows air through the air-conditioning duct 2 toward the passenger compartment.

An evaporator 10 of a refrigerating cycle for cooling the air passing through the air-conditioning duct 2 is disposed in a middle part of the air-conditioning duct 2. A heater core 13 for heating air passing through first and second air passages 11, 12 is disposed on the downstream side of this evaporator 10.

The first and second air passages 11, 12 are separated by a partition plate 14. Driver side and passenger side air-mixing (A/M) doors 15, 16 for performing temperature adjustment independently for the driver and passenger side air-conditioning zones are provided on the upstream side of the heater core 13. The driver side and passenger side A/M doors 15, 16 are driven by actuators such as servo motors 17, 18 and adjust outlet temperatures of air blown toward the driver side and the passenger side.

Figure 2:
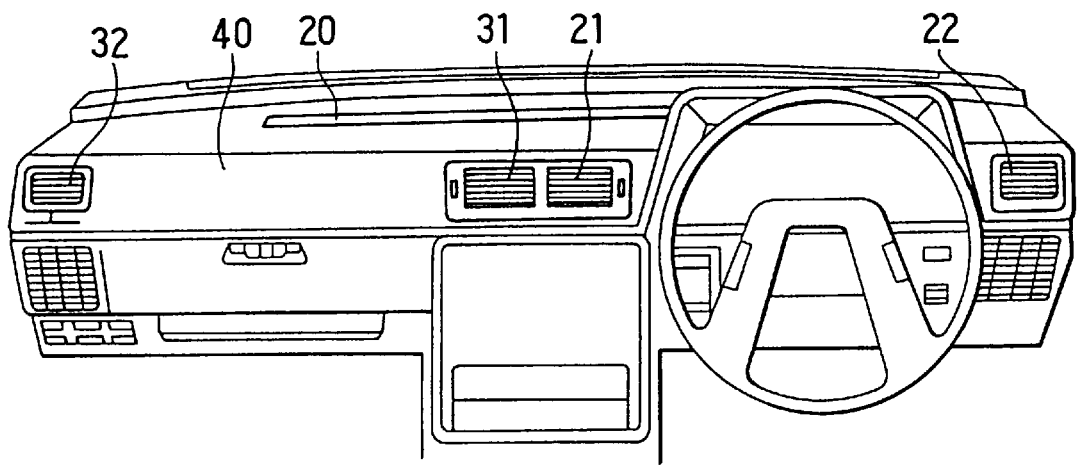
FIG. 2 is a front view of a vehicle instrument panel.
Figure 3:
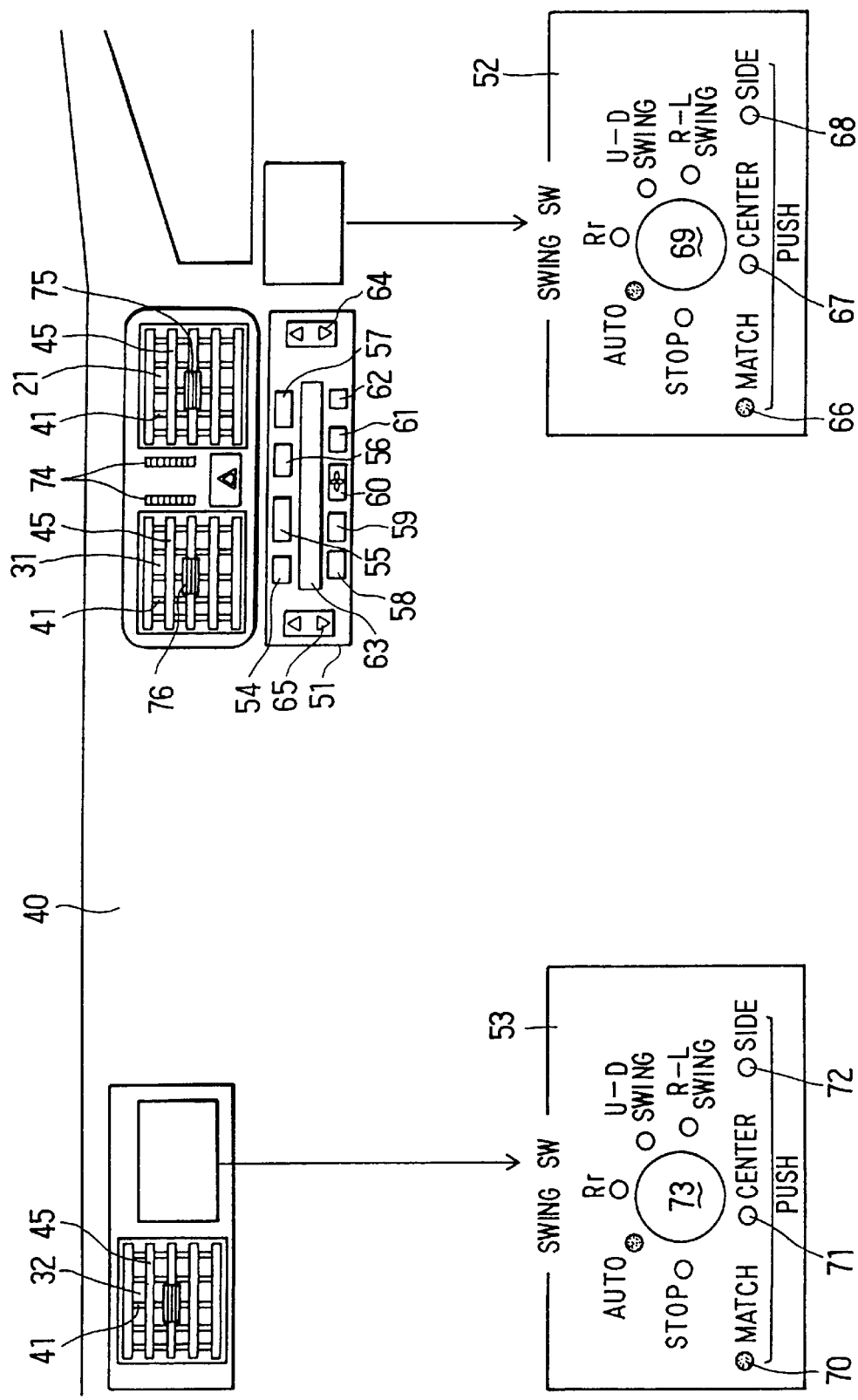
FIG. 3 is a front view of an air-conditioning operating panel.

As shown in FIGS. 1–3, a defroster outlet (DEF) 20, a driver side center face (FACE) outlet 21, a driver side side face (FACE) outlet 22 and a driver side foot (FOOT) outlet 23 are provided in an instrument panel (housing member) 40 at the downstream end of the first air passage 11.

A passenger side center face (FACE) outlet 31, a passenger side side face (FACE) outlet 32 and a passenger side foot (FOOT) outlet 33 are provided in the instrument panel 40 at the downstream end of the second air passage 12. Driver side and passenger side outlet switching doors 24–26 and 35, 36 for independently setting driver side and passenger side outlet modes in the passenger compartment are provided inside the first and second air passages 11 and 12.

The driver and passenger side outlet switching doors 24–26 and 35, 36 are mode switching doors, driven by actuators such as servo motors 28, 29 and 39, for switching driver side and passenger side outlet modes. Here, the driver side and passenger side outlet modes include for example a FACE mode, a B/L mode, a FOOT mode, an F/D mode and a DEF mode.

Also, at each of driver and passenger side center swing grills and driver and passenger side side swing grills fitted in the driver side and passenger side center FACE outlets 21, 31 and the driver side and passenger side side FACE outlets 22 and 32, a blowout state changing device is mounted in the instrument panel (housing member) 40. The driver side side FACE outlet 22 and the passenger side side FACE outlet 32 may alternatively be located in the front doors or in inner panels of side body of a vehicle.

Figure 4:
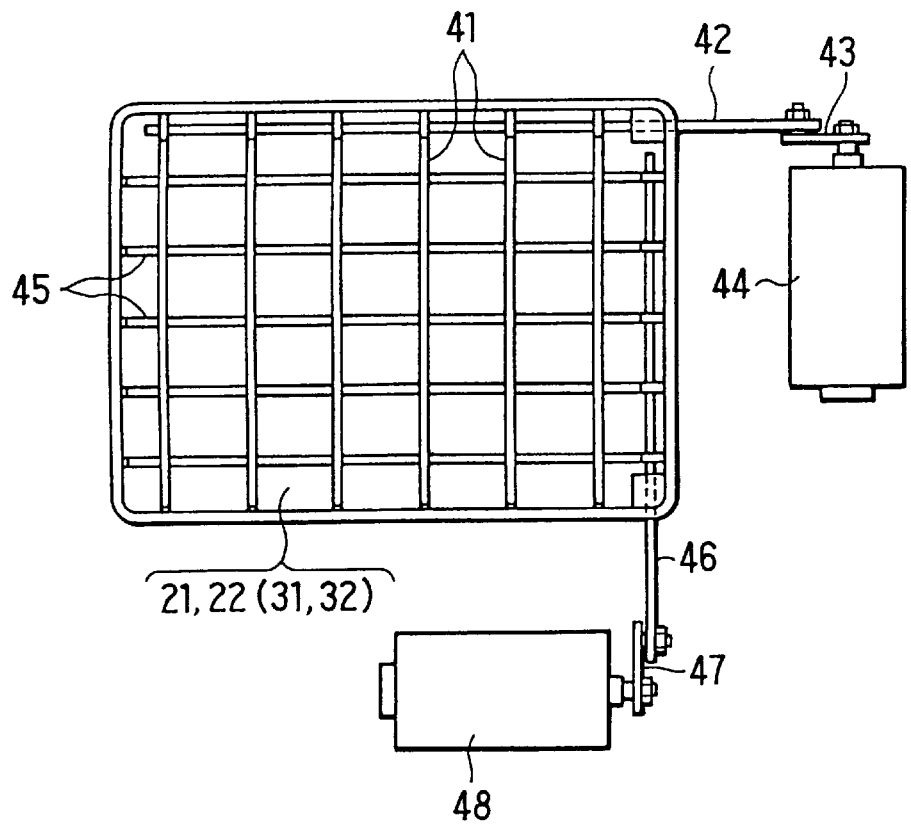
FIG. 4 is a front view showing the overall construction of a blowout state changing device according to the first preferred embodiment.

Next, these blowout state changing devices disposed at the driver side and passenger side center swing grills and the driver side and passenger side side swing grills will be briefly described on the, basis of FIG. 4 and FIG. 5.

The blowout state changing devices are mounted in the driver and passenger side center swing grills and the driver and passenger side side swing grills. Air passages in these swing grills are used as the driver and passenger side center FACE outlets 21, 31 and the driver and passenger side side FACE outlets 22, 32. The blowout state changing device of each of the swing grills has a louver left-right direction oscillating mechanism and a louver up-down direction oscillating mechanism.

Figure 5A:
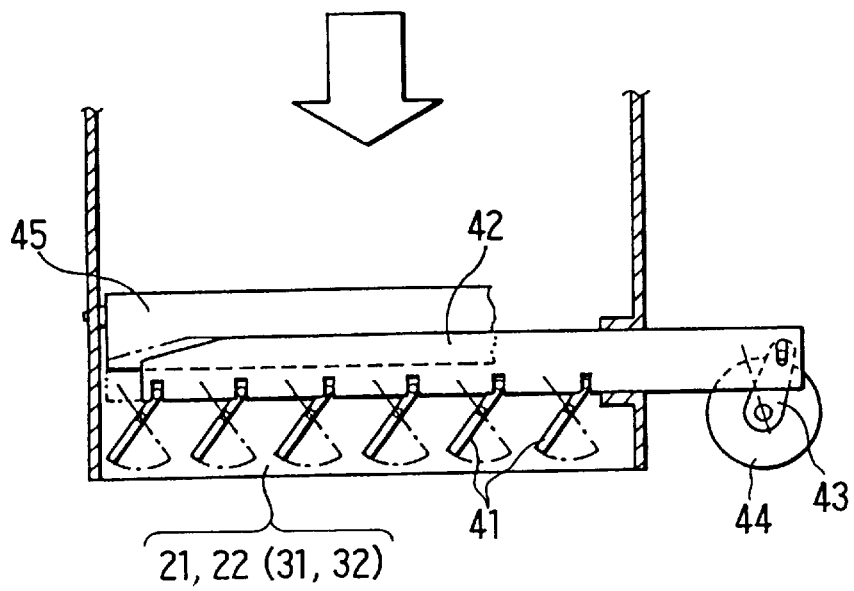
FIG. 5A is a sectional plan view of a louver left-right direction oscillating mechanism.

As shown in FIG. 5A, the louver left-right direction oscillating mechanism is made up of a link lever 42 for imparting an oscillating motion to a plurality of flow-directing louvers 41 about pivotal support points thereof, and a stepping motor 44 for reciprocating the link lever 42 horizontally by way of an arm plate 43. These flow-directing louvers 41 are swinging louvers arrayed in the left-right direction (the width direction of the vehicle) in each of the swing grills. Hereinafter the flow-directing louvers mounted in the center grills will be called center louvers and the flow-directing louvers mounted in the side grills will be called side louvers.

Figure 5B:
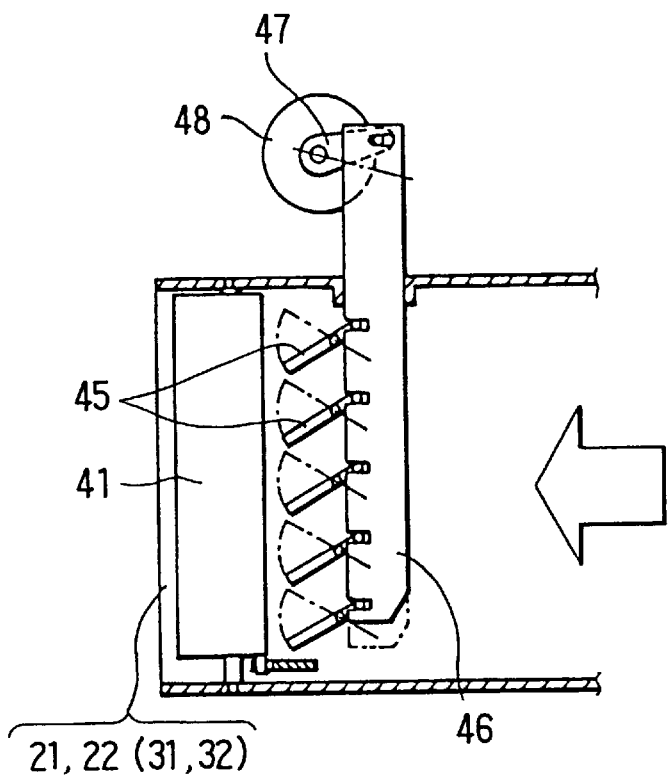
FIG. 5B is a sectional side view of a louver up-down direction oscillating mechanism, each according to the first preferred embodiment.

As shown in FIG. 5B, the louver up-down direction oscillating mechanism is made up of a link lever 46 for imparting an oscillating motion to a plurality of flow-directing louvers 45 about pivotal support points thereof, and a stepping motor 48 for reciprocating the link lever 46 up and down by way of an arm plate 47. These flow-directing louvers 45 are swinging louvers arrayed in the vertical direction (the height direction of the vehicle) in each of the swing grills. Hereinafter, the flow-directing louvers mounted in the center grills will be called center louvers and the flow-directing louvers mounted in the side grills will be called side louvers.

Here, the driver and passenger side center and side flow-directing louvers 41, 45 described above correspond to the blowout state changing device of the present invention. The stepping motors 44, 48 work as oscillation range changing devices for making conditioned air (cold or warm drafts) blown into the driver side and passenger side air-conditioning zones oscillate over predetermined ranges of oscillation. By being stopped at predetermined angles, the stepper motors also work as blowout direction changing devices or blowout position changing devices for fixing the drafts in the directions of driver and passenger side front seat occupants, in directions avoiding the driver and passenger side front seat occupants, or in the directions of passenger side and driver side rear seat occupants.

To ensure that large loads are not applied to the stepping motors when the driver side and passenger side center and side louvers 41, 45 are operated manually, large, clutch devices for cutting off an operating force from an occupant which would otherwise be transmitted through the link levers 42, 46 or the arm plates 43, 47 to the output shafts of the stepping motors 44, 48 are provided between the output shafts of the stepping motors 44, 48 and either the link levers 42, 46 or the arm plates 43, 47.

The angles through which the stepping motors move per pulse are predetermined, and when they are to point the center and side louvers 41, 45 in a certain blowout direction, or when they are to make the center and side louvers 41, 45 swing over a certain range, they are driven by a number of pulses obtained according to the following expression Exp. 1 output from the air-conditioning ECU 50.

pulses required=(angular movement required)/(angular movement per pulse) (Exp. 1)

The air-conditioning ECU 50 comprises an ordinary microcomputer made up of a CPU, ROM, RAM and other conventional components. As shown in FIG. 1 and FIG. 3, switching signals from an air-conditioning operating panel 51, a driver side louver control (SWING SW) panel 52 and a passenger side louver control (SWING SW) panel 53 are input into the air-conditioning ECU 50.

The air-conditioning operating panel 51 is integrally installed with the instrument panel 40 in the width direction center of the vehicle at the front of the passenger compartment. On this air-conditioning operating panel 51 are provided an air-conditioning (A/C) switch 54, an inlet mode switching switch 55, a front defroster switch 56, a rear defroster switch 57, a DUAL switch 58, an outlet mode switching switch 59, a blower flow switching switch 60, an AUTO switch 61, an OFF switch 62, a liquid crystal display (display) 63, a driver side temperature setting switch 64 and a passenger side temperature setting switch 65. All switches may be displayed on the display 63.

Of these, the DUAL switch 58 is for invoking left/right independent temperature control whereby temperature adjustment of the driver side air-conditioning zone and temperature adjustment of the passenger side air-conditioning zone are performed independently. The driver side temperature setting switch 64 is for setting the temperature in the driver side air-conditioning zone to a desired temperature. The passenger side temperature setting switch 65 is for setting the temperature in the passenger side air-conditioning zone to a desired temperature.

The driver side louver control panel 52 is mounted near the central part of the instrument panel 40 on the right side of the air-conditioning operating panel 51 and is made up of a MATCH switch 66 for enabling swinging of the louvers 41, 45 of both the driver side center swing grill and the driver side side swing grill, a CENTER switch 67 for enabling swinging of the louvers 41, 45 of the driver side center swing grill, a SIDE switch 68 for enabling swinging of the louvers 41, 45 of the driver side side swing grill, and a swing mode switching switch 69.

Of these, the MATCH switch 66, the CENTER switch 67 and the SIDE switch 68 are push switches having a normal position (OFF) and a pushed-in position (ON). The swing mode switching switch 69 is a rotary switch having the switching positions of 'STOP', 'AUTO', 'Rr', 'U-D SWING', and 'R-L SWING'.

When set to 'AUTO', the swing mode switching switch 69 outputs a command invoking automatic louver control of the driver side center and side louvers 41, 45. When set to 'Rr', the swing mode switching switch 69 causes the driver side center and side louvers 41, 45 to swing so that the draft flow distribution favors a rear seat side air-conditioning zone over a front seat side air-conditioning zone. For example, the swing rate of the driver side center and side louvers 41, 45 is increased in a zone into which the conditioned air is blown to a driver side front seat occupant and decreased in a zone into which the conditioned air is blown to not strike a driver side front seat occupant (and rather to strike a passenger side rear seat occupant).

When set to 'U-D SWING', the swing mode switching switch 69 outputs a command to make the driver side center and side louvers 45 swing in the up-down direction (U-D direction) over a predetermined range. When set to 'R-L SWING', the swing mode switching switch 69 outputs a command to make the driver side center and side louvers 41 swing in the left-right direction (R-L direction) over a predetermined range.

The passenger side louver control panel 53, as with the driver side louver control panel 52, is made up of a MATCH switch 70 for enabling swinging of the louvers 41, 45 of both the passenger side center swing grill and the passenger side side swing grill, a CENTER switch 71 for enabling swinging of the louvers 41, 45 of the passenger side center swing grill, a SIDE switch 72 for enabling swinging of the louvers 41, 45 of the passenger side side swing grill, and a swing mode switching switch 73. All of the switches may be displayed on the display 63.

Of these, the MATCH switch 70, the CENTER switch 71 and the SIDE switch 72 are push switches having a normal non-depressed position (OFF) and a depressed position (ON). The swing mode switching switch 73 is a rotary switch having the switching positions of 'STOP' (stop swing), 'AUTO' (auto swing), 'Rr', 'U-D SWING' (up-down direction swing), and 'R-L SWING' (left-right direction swing).

When set to 'AUTO', the swing mode switching switch 73, like the swing mode switching switch 69, outputs a command invoking automatic louver control of the passenger side center and side louvers 41, 45. When set to 'Rr', the swing mode switching switch 73 causes the passenger side center and side louvers 41, 45 to swing so that the draft flow distribution favors a rear seat side air-conditioning zone over a front seat side air-conditioning zone. For example, the swing rate of the passenger side center and side louvers 41, 45 is increased in a zone into which the conditioned air is blown to a passenger side front seat occupant and decreased in a zone into which the conditioned air is blown to not strike a passenger side front seat occupant (and rather strike a driver side rear seat occupant).

When set to 'U-D SWING', the swing mode switching switch 73 outputs a command to make the passenger side center and side louvers 45 swing in the up-down direction (U-D direction) over a predetermined range. And when set to 'R-L SWING', the swing mode switching switch 73 outputs a command to make the passenger side center and side louvers 41 swing in the left-right direction (R-L direction) over a predetermined range. The switching mode switching switches 69, 73 may be substituted by a single switching switch which carries out switching between 'AUTO mode' and 'OFF'.

As shown in FIG. 3, door opening/closing switches 74 for manually operating shutters (not shown) for opening and closing the driver side and passenger side center FACE outlets 21, 31 are provided between the driver side and passenger side center swing grills. Also, the driver and passenger side center swing grills and the driver and passenger side side swing grills are each provided with knobs 75, 76 for manually moving the louvers of the center and side louvers 41, 45 in the left-right direction and the up-down direction.

In the air-conditioning ECU 50, sensor signals from various sensors are A/D-converted by an input circuit (not shown) and then input into the microcomputer. That is, an inside air temperature sensor 91, an outside air temperature sensor 92, and a solar radiation sensor 93 serving as solar radiation detecting means for detecting the amounts of solar radiation entering the driver side and passenger side air-conditioning zones are connected to the air-conditioning ECU 50.

Also connected to the air-conditioning ECU 50 are driver and passenger side outlet temperature sensors 94a, 94b for detecting the outlet temperatures of conditioned air blown into the driver side and passenger side air-conditioning zones, a post-evaporator temperature sensor 95 for detecting the temperature of air having just passed through the evaporator 10, and a cooling water temperature sensor 96 for detecting the cooling water temperature of the vehicle engine.

The solar radiation sensor 93 has a driver side solar radiation strength detecting device (for example a photodiode), which detects the amount of solar radiation (the solar radiation strength) entering the driver side air-conditioning zone and generates an output signal TS'(Dr) corresponding thereto. The sensor also includes a similar passenger side solar radiation strength detecting device which detects the amount of solar radiation entering the passenger side air-conditioning zone and generates an output signal TS'(Pa) corresponding to that solar radiation strength.

Next, an air-conditioning control method implemented by the air-conditioning ECU 50 of this preferred embodiment will be described on the basis of FIGS. 1–22.

Figure 6:
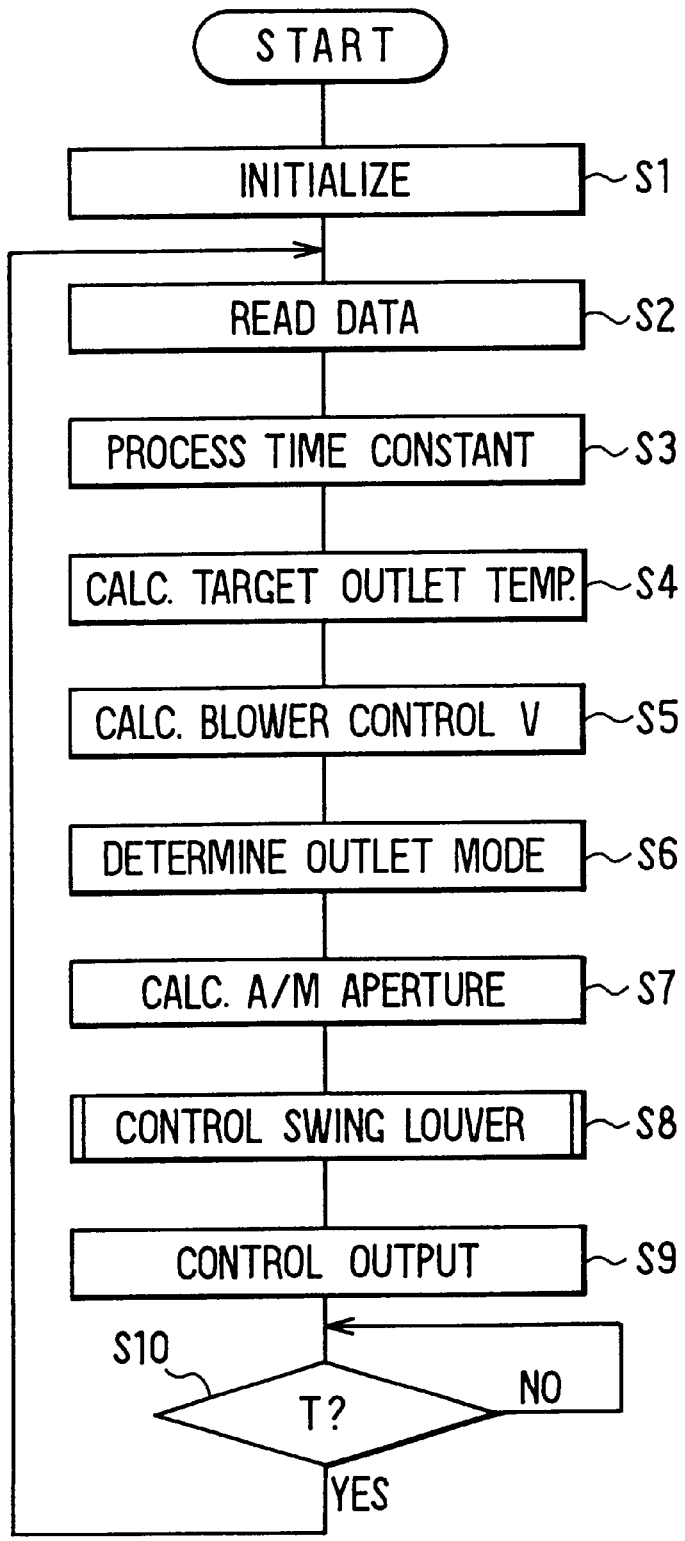
FIG. 6 is a flow diagram showing an example of a control program of an air-conditioning ECU according to the first preferred embodiment)

Referring first to FIG. 6, a flow diagram showing an example of a control program of the air-conditioning ECU 50 is shown. When a vehicle ignition switch is switched on and d.c. power is supplied to the air-conditioning ECU 50, execution of the control program is started. At this time, first, initialization of stored content of a data processing memory (RAM) is carried out (step S1).

Then, various types of data are read in to the data processing memory. That is, switch signals from the switches and sensor signals from the sensors are input (step S2). In particular, output signals corresponding to the solar radiation strengths detected by the solar radiation sensor 93 (hereinafter called solar radiation sensor signals) TS'(Dr), TS'(Pa) are input and stored in the data processing memory.

Next, solar radiation strengths TS(Dr), TS(Pa) calculated with a time constant (lag) of T1(sec) with respect to the solar radiation sensor signals TS'(Dr), TS'(Pa) stored in step S2 are determined. That is, solar radiation strengths TS(Dr), TS(Pa) for inside the passenger compartment are calculated on the basis of the solar radiation sensor signals TS'(Dr), TS'(Pa), a time constant T1 and the following expressions Exp. 2 and Exp. 3 (step S3).

$$TS(Dr)=\{TS'(Dr)+(T1/T)TSn-1(Dr)\}/(T1+T) \quad \text{(Exp. 2)}$$

$$TS(Pa)=\{TS'(Pa)+(T1/T)TSn-1(Pa)\}/(T1+T) \quad \text{(Exp. 3)}$$

Here, T is a control period (for example 1 to 4 seconds), and TSn−1(Dr) is the value of TS(Dr) one period before and TSn−1(Pa) is the value of TS(Pa) for the prior period. Also, T1 is the value of a time constant provided in the solar radiation strengths TS(Dr), TS(Pa) necessary for controlling blower control voltages VA(Dr), VA(Pa) to be impressed on the blower motor 9 of the blower 4, the driver side and passenger side outlet switching doors 24–26 and 35, 36, and the driver side and passenger side A/M doors 15, 16, and is for example 30–120 seconds.

Next, a driver side target outlet temperature TAO(Dr) and a passenger side target outlet temperature TAO(Pa) are calculated on the basis of the stored data mentioned above and the following expressions Exp. 4 and Exp. 5 (step S4).

$$TAO(Dr) = KSET \cdot TSET(Dr) - KR \cdot TR - KAM \cdot TAM - \quad \text{(Exp. 4)}$$
$$KS \cdot TS(Dr) + Kd(Dr) \times \{CD(Dr) +$$
$$Ka(Dr)(10 - TAM)\} \times \{TSET(Dr) -$$
$$TSET(Pa)\} + C$$

$$TAO(Pa) = KSET \cdot TSET(Pa) - KR \cdot TR - KAM \cdot TAM - \quad \text{(Exp. 5)}$$
$$KS \cdot TS(Pa) + Kd(Pa) \times \{CD(Pa) +$$
$$Ka(Pa)(10 - TAM)\} \times \{TSET(Pa) -$$
$$TSET(Dr)\} + C$$

Here, TSET(Dr) and TSET(Pa) respectively are a set temperature of the driver side air-conditioning zone and a set temperature of the passenger side air-conditioning zone, and TR and TAM respectively are the passenger compartment temperature and the outside air temperature. KSET, KR, KAM, KS, Kd(Dr) and Kd(Pa) respectively are a temperature setting gain, a passenger compartment temperature gain, an outside air temperature gain, a solar radiation gain, and driver side and passenger side air-conditioning zone temperature difference correction gains.

Ka(Dr) and Ka(Pa) respectively are gains for correcting the degree of influence that the outside air temperature TAM has on the air-conditioning temperatures of the driver and the passenger side air-conditioning zones, CD(Dr) and CD(Pa) are constants corresponding to this degree of influence, and C is a correction constant. Here, the values of Ka(Dr), Ka(Pa), CD(Dr) and CD(Pa) vary with various parameters such as the size and shape of the vehicle and the blowout directions from the outlets of the air-conditioning unit 1.

Next, a blower flow {blower control voltage VA to be impressed on the blower 4} is calculated on the basis of the driver side and passenger side target outlet temperatures TAO(Dr), TAO(Pa) obtained in step S4 (step S5). Specifically, the blower control voltage VA is obtained by blower control voltages VA(Dr), VA(Pa) respectively suited to the target outlet temperatures TAO(Dr), TAO(Pa) being obtained on the basis of a characteristic diagram shown in FIG. 7A, and the blower control voltages VA(Dr), VA(Pa) are then averaged.

Figure 7A:
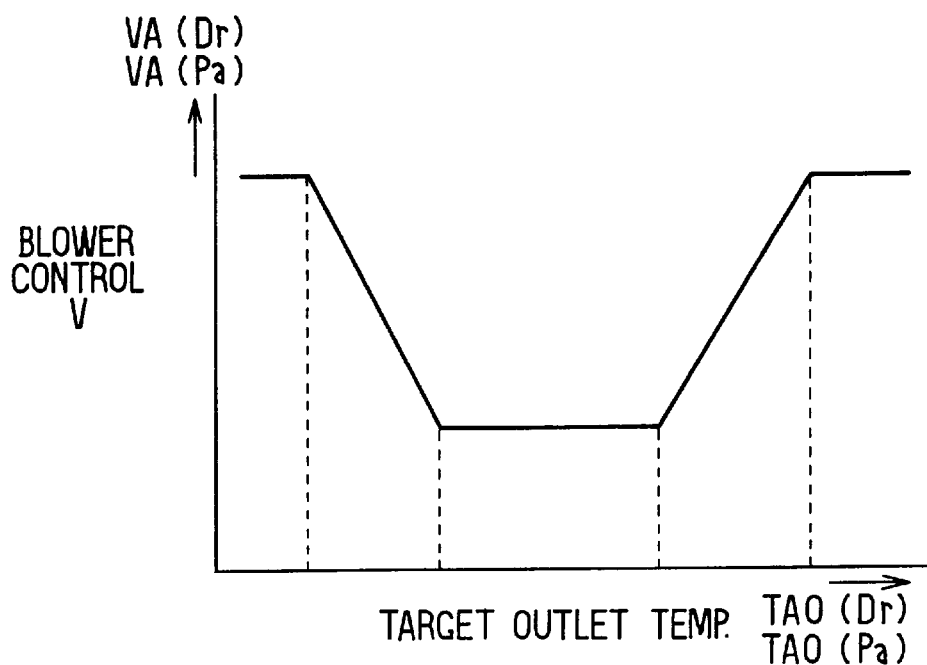
FIG. 7A is a characteristic diagram showing a blower control voltage vs. target outlet temperature characteristic.
Figure 7B:
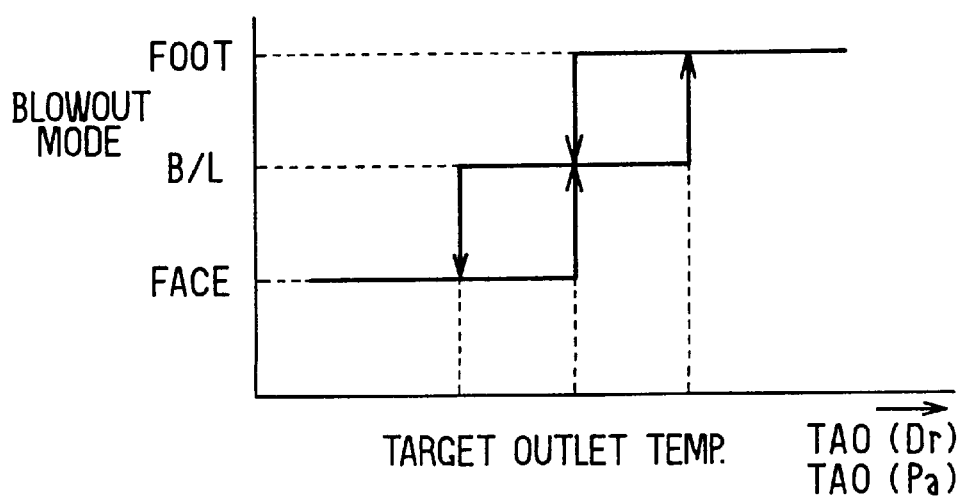
FIG. 7B is a characteristic diagram showing an outlet mode vs. target outlet temperature characteristic according to the first preferred embodiment.

Then, outlet modes of the driver and passenger side air-conditioning zones are determined on the basis of the target outlet temperatures TAO(Dr), TAO(Pa) of the driver and passenger side obtained in step S4 and an outlet mode vs. target outlet temperature characteristic shown in FIG. 7B (step S6). Specifically, in the determination of the outlet modes, the modes are determined to become the FACE mode, the B/L mode and then the FOOT mode as the above-mentioned target outlet temperatures TAO(Dr), TAO(Pa) progress from low temperatures to high temperatures. Also, any outlet mode among the FACE mode, the B/L mode, the FOOT mode and the FID mode can be fixed by the outlet mode switching switch 59 provided on the air-conditioning operating panel 51 being operated manually.

The FACE mode is an outlet mode wherein conditioned air is blown toward the upper bodies of front and rear seat occupants. The B/L mode is an outlet mode wherein conditioned air is blown toward the upper bodies and the feet of front and rear seat occupants. The FOOT mode is an outlet mode wherein conditioned air is blown toward the feet of front and rear seat occupants. The F/D mode is an outlet mode wherein conditioned air is blown toward the feet of front and rear seat occupants and toward the inside of the front windshield of the vehicle. In this preferred embodiment, when a defroster switch provided on an operating panel (not shown) is operated, a DEF mode, wherein conditioned air is blown toward the inside of the front windshield of the vehicle, is set. Also, in all of the outlet modes, the driver side side FACE outlet 22 and the passenger side side FACE outlet 32 are open.

Next, a target A/M aperture SW(Dr) (%) of the driver side A/M door 15 and a target A/M aperture SW(Pa) (%) of the passenger side A/M door 16 are calculated (step S7). The calculation of the target A/M aperture SW(Dr) and the target A/M aperture SW(Pa) is carried out on the basis of the driver side and passenger side target outlet temperatures TAO(Dr) and TAO(Pa), the post-evaporator temperature (TE) detected by the post-evaporator temperature sensor 95, the cooling water temperature (TW) detected by the cooling water temperature sensor 96, and the following expressions Exp. 6 and Exp. 7.

$$SW(Dr)=\{TAO(Dr)-TE\}\times 100/(TW-TE) \quad \text{(Exp. 6)}$$

$$SW(Pa)=\{TAO(Pa)-TE\}\times 100/(TW-TE) \quad \text{(Exp. 7)}$$

Figure 8:
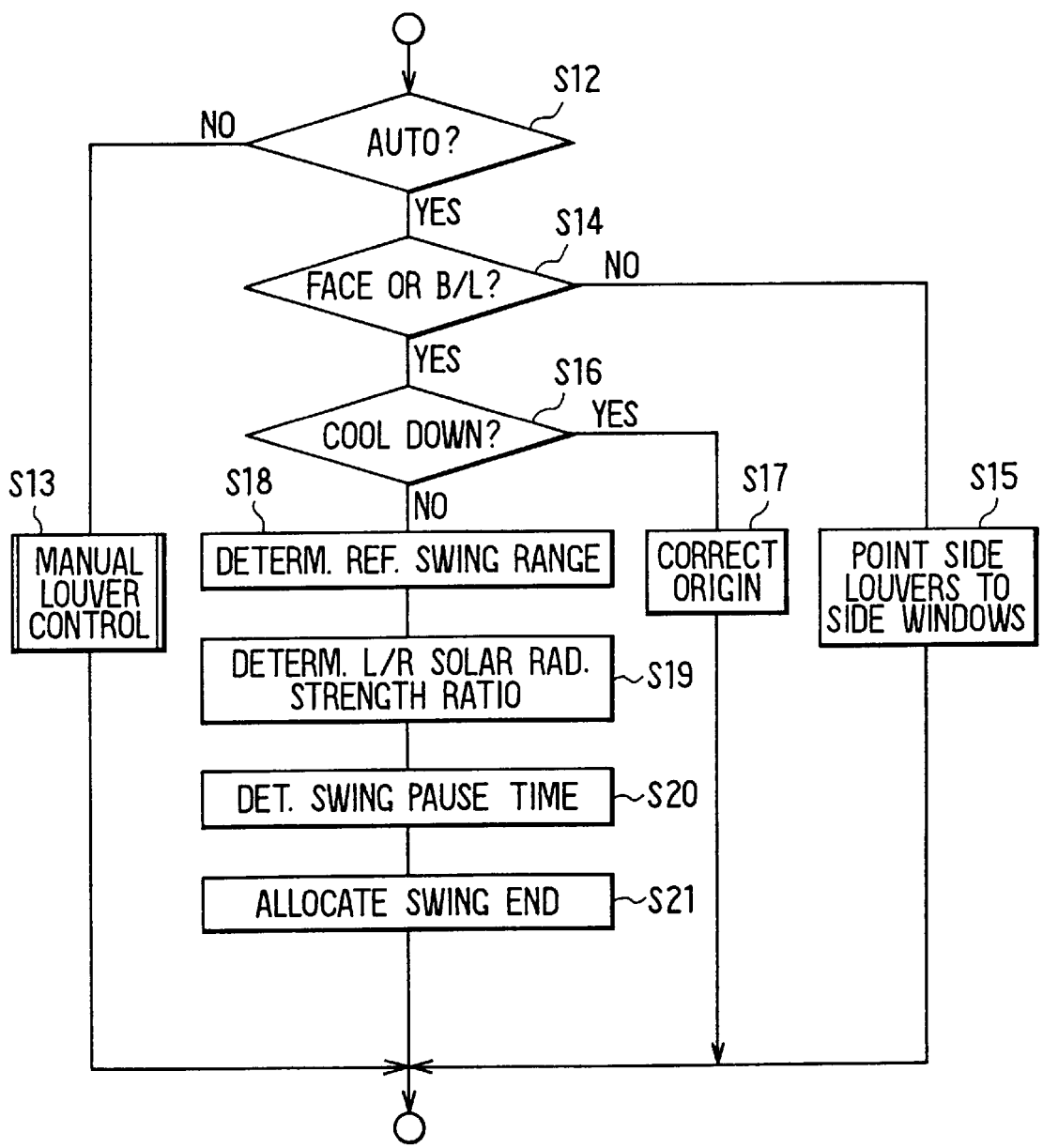
FIG. 8 is a flow diagram illustrating swing louver control carried out by an air-conditioning ECU according to the first preferred embodiment.

Next, a routine shown in FIG. 8 is started, and swing louver control (automatic or manual) is carried out. That is, in automatic louver control, the blowout state of conditioned air to be blown into the driver side air-conditioning zone from the driver side center and side FACE outlets 21, 22 is determined, and the blowout state of conditioned air to be blown toward the passenger side air-conditioning zone from the passenger side center and side FACE outlets 31, 32 is determined. Specifically, oscillation ranges and louver directions of the center and side louvers 41, 45 of the blowout state changing devices of the swing grills are determined (step S8).

Then, an output signal is sent to the blower drive circuit 8 to produce the determined blower control voltage VA(Dr), VA(Pa). The servo motors 28, 29 and 39 are controlled to implement the determined outlet modes. The servomotors 17, 18 are controlled to realize the target A/M apertures SW(Dr), SW(Pa). Control signals are then sent to the stepping motors 44, 48 to realize swing ranges about determined occupant directions or louver temporary stopping positions (step S9).

After a predetermined control period (T: for example 0.1 second to 4.0 seconds) elapses at step S10, processing returns to step S2.

Next, swing louver control carried out by the air-conditioning ECU 50 will be described on the basis of FIGS.

8–12. First, it is determined whether or not either of the swing mode switching switches 69, 73 provided on the driver and passenger side louver control panels 52, 53 has been set to 'AUTO' (step S12). When the result of this determination is NO, manual louver control according to the set positions of the swing mode switching switches 69, 73 is carried out (step S13). Thereafter, processing leaves the routine of FIG. 8.

When the result of the determination of step S12 is YES, the following automatic louver control is carried out. First, it is determined if the outlet mode is either the FACE mode or the B/L mode (step S14). When the result of this determination is NO, to effect anti-fogging of the side windows and cut cooling heat radiation, louver pausing positions are determined so that the driver side and passenger side side louvers 41, 45 point toward adjacent side windows (step S15). Processing then leaves the routine of FIG. 8.

When the determination result of step S14 is YES, a cooldown determination is carried out. For example according to the following expressions Exp. 8 and Exp. 9, it is determined whether or not the difference between the passenger compartment temperature TR and either of the set temperatures TSET(Dr), TSET(Pa) is greater than a determination value (a predetermined value; for example 5°). Or, it is determined whether or not the passenger compartment temperature TR is greater than a determination value (a predetermined value; for example 35° C.) (step S16).

$$5(°) \{TR-TSET(Dr)\} \quad \text{(Exp. 8)}$$

$$5(°) \{TR-TSET(Pa)\} \quad \text{(Exp. 9)}$$

Here, TR is the passenger compartment temperature detected by the inside air temperature sensor 91, and TSET (Dr), TSET(Pa) respectively are a set temperature of the driver side air-conditioning zone and a set temperature of the passenger side air-conditioning zone. The above-mentioned determination value is preferably set to a higher value corresponding to the amount of air-conditioning load in the initial stage of air-conditioning or in the initial stage of conditioned air blowout. However, even when the passenger compartment temperature (TR) is very high, when concentrated blowout to a front seat or rear seat occupant continues for a long time, the conditioned air may be made to swing to reduce annoyance to the occupant.

Figure 9A:
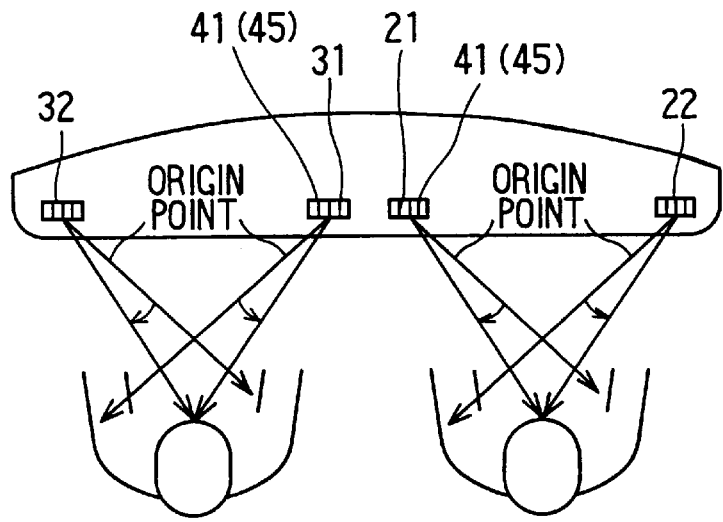
FIG. 9A is an explanatory view showing louver origin correction directions.

When the determination result of step S16 is YES, in the case of the difference between the passenger compartment temperature TR and either of the set temperatures TSET(Dr) and TSET(Pa) being greater than a predetermined value (for example 5°), origin correction of the driver side and passenger side center louvers 41, 45 and the driver side and passenger side side louvers 41, 45 is carried out. After that, as shown in FIG. 9A, according to the seat positions of the occupants of the driver side and passenger side front seats, target values are determined to send control outputs to the stepping motors 44, 48 so that the louver directions of the driver side and passenger side center louvers 41, 45 and the driver side and passenger side side louvers 41, 45 point toward the front seat occupants (step S17). Thereafter, processing leaves the routine of FIG. 8. It is preferable for the origin correction by the cooldown determination to be performed so that it is carried out only once after the ignition switch is turned ON.

Here, as the origin correction of the driver and passenger side center louvers 41, 45 and the driver and passenger side side louvers 41, 45, control outputs are sent to the stepping motors 44, 48 to cause the ends to swing in the louver origin correction directions shown in FIG. 9A. In addition, with those louver positions as origins, when the seat positions of the driver side and passenger side front seat occupants are forward, a few pulses are sent to the stepping motors 44, 48. When the seat positions of the driver and passenger side front seat occupants are rearward, pulses are sent to the stepping motors 44, 48, whereby target values are determined so that the louver directions of the driver and passenger side center louvers 41, 45 and the louver directions of the driver side and passenger side side louvers 41, 45 point in the directions of the occupants of the driver and passenger side front seats.

The louvers are brought to their swing ends in the louver origin correction directions shown in FIG. 9A because, in this preferred embodiment, the blowout state changing devices do not have potentiometers to serve as blowout direction detecting devices for detecting the present positions of the driver side and passenger side center and side louvers 41, 45 when the present positions of the driver side and passenger side center or side louvers 41, 45 are changed or manually moved. Also, the louvers are brought to their swing ends in the louver origin correction directions shown in FIG. 9A to enable conditioned air to be supplied to driver and passenger side front seat occupants as quickly as possible, because the origin correction takes about ten seconds.

It is conceivable to provide seat front-rear position detecting devices such as potentiometers in the vicinities of the front seats (driver and passenger side seats) to detect the seat positions of driver and passenger side front seat occupants. Alternatively, the driver and passenger side front seats may be set by switches or on the liquid crystal display 63. Also, the seat positions may be made settable by, for example, the vehicle dealer. A method wherein the seat positions are set by driver side and passenger side front seat occupants or by a dealer is preferable, because it enables the louver directions adopted at times of cooldown to be adjusted according to personal preference.

Figure 9B:
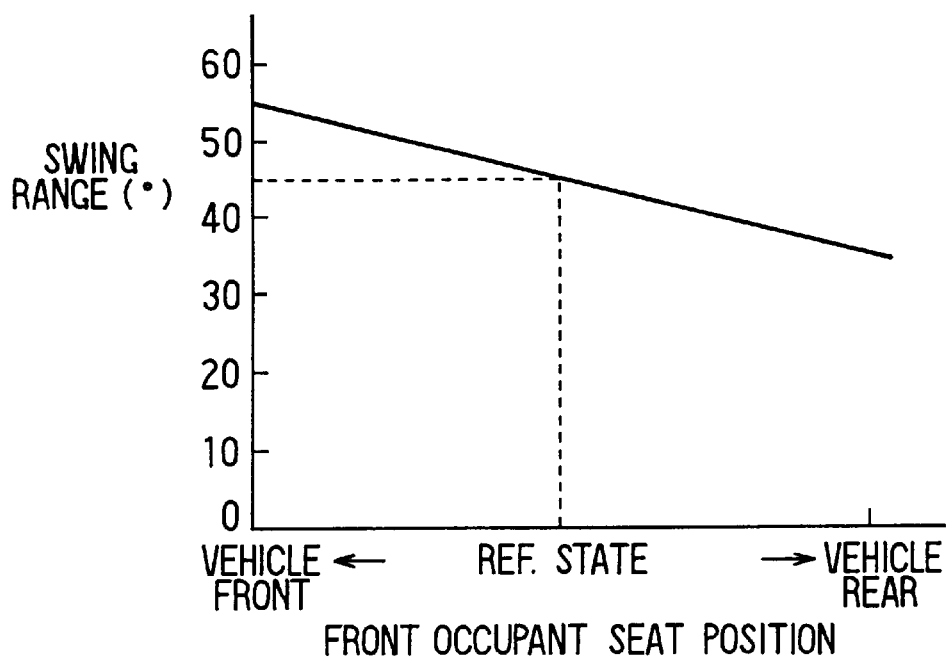
FIG. 9B is a characteristic diagram showing a relationship between front seat position and swing range according to the first preferred embodiment.

When the determination result of step S16 is NO, i.e. when the air-conditioning state is determined to be steady-state or when the passenger compartment temperature is below a predetermined value, a range over which the driver and passenger side center and side louvers 41, 45 are to swing is determined according to the seat positions of the driver and passenger side front seat occupants, as shown in the characteristic diagram of FIG. 9B (step S18). The characteristic diagram of FIG. 9B is of course corrected according to the seat layout and the positions and apertures of the FACE outlets, which differ from vehicle to vehicle. Also, according to the personal preference of the occupant, when conditioned air is not desired, the swing range can be narrowed. In this preferred embodiment, the swing range of the driver and passenger side side louvers 41, 45 and the swing range of the driver side and passenger side center louvers 41, 45 are the same.

Figure 10A:
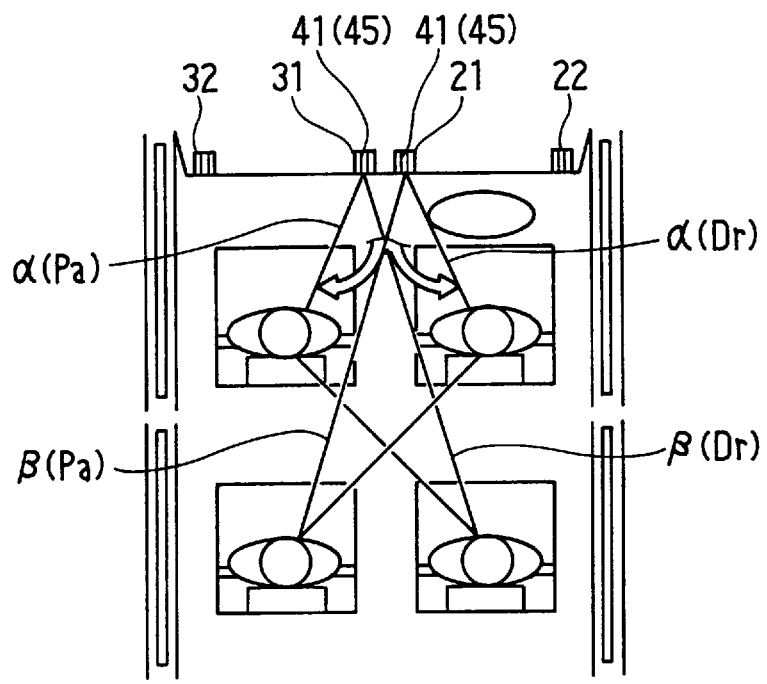
FIG. 10A is an explanatory view showing swing ranges of conditioned air in a passenger compartment.

The air-conditioning range over which air-conditioning effected by swinging of the driver side center louvers 41, 45 is possible (the range over which conditioned air from the driver side center FACE outlet 21 can be blown directly) is, as shown in FIG. 10A, limited to the range of from a driver side front seat occupant direction (Dr) to a passenger side rear seat occupant direction β(Pa). The air-conditioning range over which air-conditioning effected by swinging of the passenger side center louvers 41, 45 is possible (the range over which conditioned air from the passenger side center FACE outlet 31 can be directly blown) is, as shown in FIG. 10A, limited to the range of from a passenger side front seat occupant direction (Pa) to a driver side rear seat occupant direction β(Dr).

The driver side front seat occupant direction (Dr) swing end shows a driver side front seat occupant side swing end obtained from one or more among the seat position or seat shape of the driver side front seat and the physique, conditioned air preferences and posture of the occupant of the driver side front seat. Similarly, the passenger side front seat occupant direction (Pa) swing end shows a passenger side front seat occupant side swing end obtained from one or more among the seat position or seat shape of the passenger side front seat and the physique, conditioned air preferences and posture of the occupant of the passenger side front seat.

The further forward the positions toward which it is desired that the driver and passenger side center louvers 41, 45 be pointed become, the more the swing ranges of the driver side and passenger side center louvers 41, 45 are corrected in a widening direction. Conversely, the further rearward the positions toward which it is desired that the driver and passenger side center louvers 41, 45 be pointed become, the more the swing ranges of the driver and passenger side center louvers 41, 45 are corrected in a direction making the swing ranges narrower.

In this preferred embodiment it is supposed that the occupants of the driver and passenger side rear seats are in a standard state, and the driver side and passenger side rear seat occupant side swing ends are fixed. Of course, alternatively, in the same way as the front seat occupant side swing ends, the driver side and passenger side rear seat occupant side swing ends may also be corrected according to the rear seat positions or seat shapes or the physique, conditioned air preferences and posture of the respective rear seat occupants.

Also, in this preferred embodiment, when the driver side front seat occupant or the passenger side front seat occupant directly operates the center or side louvers 41, 45, the swing range may be shifted in the direction of the occupant's operation. The swing range determining control of the present preferred embodiment may also be disabled an occupant manually selects a mode wherein swinging between the driver's seat and the passenger seat is carried out. Otherwise, by making it possible for the swing range of the invention to be canceled in accordance with manual operation, even when the swing range of the present preferred embodiment does not suit an occupant, it is possible to prevent the swing control from not being unused.

Also, at times such as when the air-conditioning load is very large, or when a guest is seated in a rear seat or the passenger seat and that seat is to be preferentially air-conditioned, the swing range determining control of this preferred embodiment may be disabled to rapidly preferentially air-condition a particular vehicle occupant zone. When there is uneven solar radiation and when the air-conditioning capacity on a solar radiation side is insufficient, the present invention enables a cool draft to come not only from the FACE outlets which air-condition primarily that air-conditioning zone, but also from a FACE outlet which primarily air-conditions a neighboring air-conditioning zone. Therefore, it is possible to improve the air conditioning of the entire of the passenger compartment.

Also, at times such as air-conditioning start-up or start-up of the driver and passenger side center louvers 41, 45, the driver and passenger side center louvers 41, 45 may each be made to swing into the neighboring air-conditioning zone side. This appearance improvement or origin correction may alternatively be carried out after a predetermined time from air-conditioning start-up or operation start-up of the driver and passenger side center louvers 41, 45, or may be carried out on air-conditioning shut-down, after shut-down of the driver side and passenger side center louvers 41, 45, or at predetermined intervals.

Figure 11A:
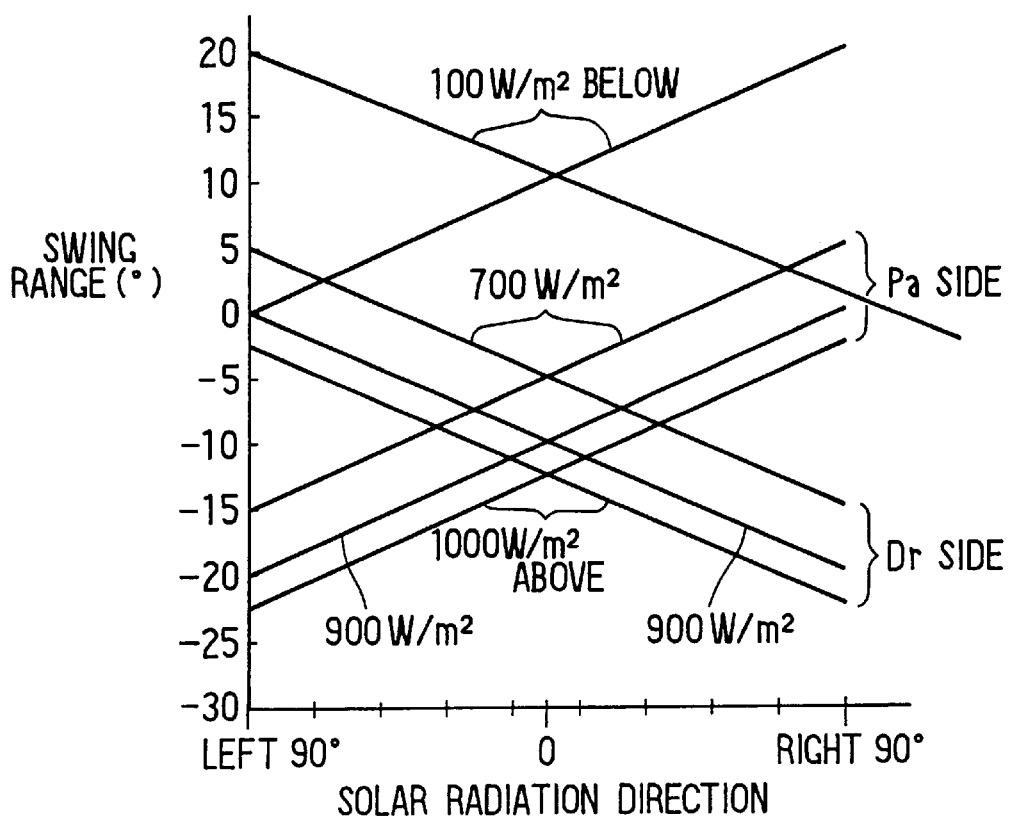
FIG. 11A is a characteristic diagram showing driver side and passenger side louver swing ranges vs. solar radiation direction and solar radiation strength characteristic.
Figure 11B:
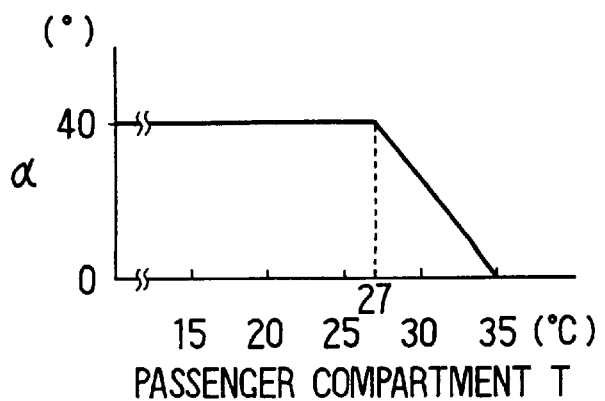
FIG. 11B is a characteristic diagram showing a correction angle vs. passenger compartment temperature characteristic, each according to the first preferred embodiment.

Next, the oscillation ranges of the driver and passenger side center and center louvers 41, 45 may be determined on the basis of solar radiation directions and solar radiation strengths in the driver and passenger side air-conditioning zones and the characteristic diagram shown in FIG. 11A.

Here, reference swing ranges $\theta(Dr)$, $\theta(Pa)$ of the center and side louvers 41, 45 refer to (left-right direction louver angle×2) about that occupant direction when the louver directions of the center and side louvers 41, 45 are pointed toward respective occupants. And the reference swing range $\theta(Dr)$ of the center and side louvers 41, 45 refers to (up-down direction louver angle×2) about the occupant direction when the louver directions of the center and side louvers 41, 45 are pointed toward an occupant.

Also, passenger compartment temperature correction of the swing ranges of the center and side louvers 41, 45 is carried out. Specifically, reference swing ranges $\theta(Dr)$, $\theta(Pa)$ may be determined on the basis of driver and passenger side swing ranges $\theta(Dr)$ and $\theta(Pa)$, the characteristic diagram of FIG. 11B, and the following expressions Exp. 10 and Exp. 11.

$$\theta(Dr)=\theta(Dr)+\alpha(°) \qquad \text{(Exp. 10)}$$

$$\theta(Pa)=\theta(Pa)+\alpha(°) \qquad \text{(Exp. 11)}$$

Figure 10B:
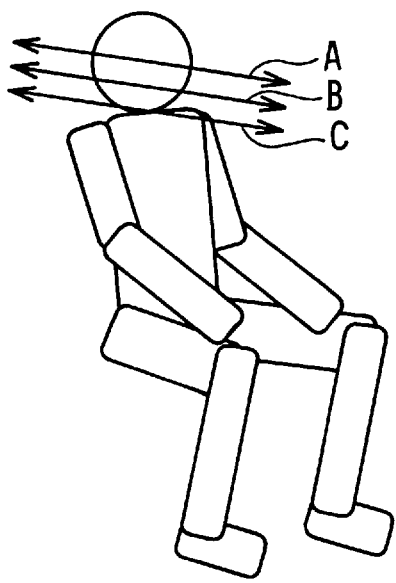
FIG. 10B is a schematic view showing swing heights of center and side louvers according to the first preferred embodiment.

Also, swing heights of the driver and passenger side center and side louvers 41, 45 may be determined on the basis of the blower control voltage $VA(Dr)$, $VA(Pa)$ impressed on the blower motor 9. Specifically, as shown in FIG. 10B, when the blower control voltage is 4(V) to 5(V), the swing height may be set to (A), when the blower control voltage is 6(V) to 8(V) the swing height may be set to (B), and when the blower control voltage is 9(V) or over the swing height may be set to (C). This control is for giving the occupant a feeling of a high-speed flow of conditioned air, even when the speed is low.

On the basis of the solar radiation strengths $TS(Dr)$, $TS(Pa)$ determined in step S3 of FIG. 6 and the following expression Exp. 12, a left-right ratio (H) of strengths of solar radiation entering the passenger compartment is calculated (step S19).

$$H=TS(Dr)/\{TS(Dr)+TS(Pa)\} \qquad \text{(Exp. 12)}$$

When $\{TS(Dr)+TS(Pa)\} \leq 150$ W/m$^2$, H is set to 0.5.

Next, a total pause time to be the total of a swing pause time at the driver side and passenger side front seat occupant side swing ends and a swing pause time at the driver side and passenger side rear seat occupant side swing ends is determined (step S20). In this preferred embodiment, the total pause time is preset to seven seconds. Alternatively, a total pause time corresponding to the swing ranges of the driver and passenger side center louvers 41, 45 and the driver and passenger side side louvers 41, 45 may be calculated.

Using the solar radiation left-right ratio, it is calculated how much of the total pause time obtained at step S20 is to be distributed to the driver side front seat occupant (KFORDR) side swing end and to the passenger side rear seat occupant (KNOTPA) side swing end and how much is to be distributed to the passenger side front seat occupant (KFORPA) side swing end and to the driver side rear seat occupant (KNOTDR) side swing end (step S21). Thereafter, processing leaves the routine of FIG. 8.

For the above calculation, the following expressions Exp. 13–Exp. 16 and the characteristic diagram of FIG. 12 are used. Control is carried out so that at the swing end of an occupant side on which solar radiation is presumed to be incident, the swing pause time is increased and the center louvers 41, 45 are paused for a longer period than at the swing end of an occupant side on which solar radiation is presumed not to be incident, so that more cool air is supplied to the occupant on which solar radiation is inferred to be incident.

$$(FORDR\text{-}STOP\text{-}TIME) = KFORDR \times 7 \text{ (sec)} \quad \text{(Exp. 13)}$$

Here, FORDR-STOP-TIME is the swing pause time at the driver side front seat occupant side swing end.

$$(NOTDR\text{-}STOP\text{-}TIME) = KNOTDR \times 7 \text{ (sec.)} \quad \text{(Exp. 14)}$$

Here, NOTDR-STOP-TIME is the swing pause time at the driver side rear seat occupant side swing end.

$$(FORPA\text{-}STOP\text{-}TIME) = KFORPA \times 7 \text{ (sec)} \quad \text{(Exp. 15)}$$

Here, FORPA-STOP-TIME is the swing pause time at the passenger side front seat occupant side swing end.

$$(NOTPA\text{-}STOP\text{-}TIME) = KNOTPA \times 7 \text{ (sec)} \quad \text{(Exp. 16)}$$

Here, (NOTPA-STOP-TIME) is the swing pause time at the passenger side rear seat occupant side swing end.

At least one second may be added to each of the swing pause times at the driver and passenger side front seat occupant side swing ends and the swing pause times at the driver side and passenger side rear seat occupant side swing ends. Consequently, it is possible to avoid the swing pause time at the driver side and passenger side rear seat occupant side swing ends being reduced to zero.

Although in this preferred embodiment the total pause time at step S20 is set to seven seconds, alternatively this may be made a random pause time (T), as shown in FIG. 13A and FIG. 13B. Specifically, in a random swing in this preferred embodiment, a swing pause time for which a swing is to stop at a predetermined position is determined. In this preferred embodiment a random swing pause time determined with a preset operating pattern is used, but of course there is no particular limitation.

Specifically, when a first swing is carried out, there is a pause at a predetermined position until one second elapses. After the next swing, there is a paused at a predetermined position until one second elapses. After the next swing, there is a pause at a predetermined position for ten seconds, and so on for a set of sixteen swings, after which the swing cycle is repeated. As a result of this cycle, occupants do not become accustomed to the conditioned air, and their feeling of comfort is less liable to diminish. In this case, a random table for when the air-conditioning load is high and a random table for when the air-conditioning load is low may be provided.

Figure 14:
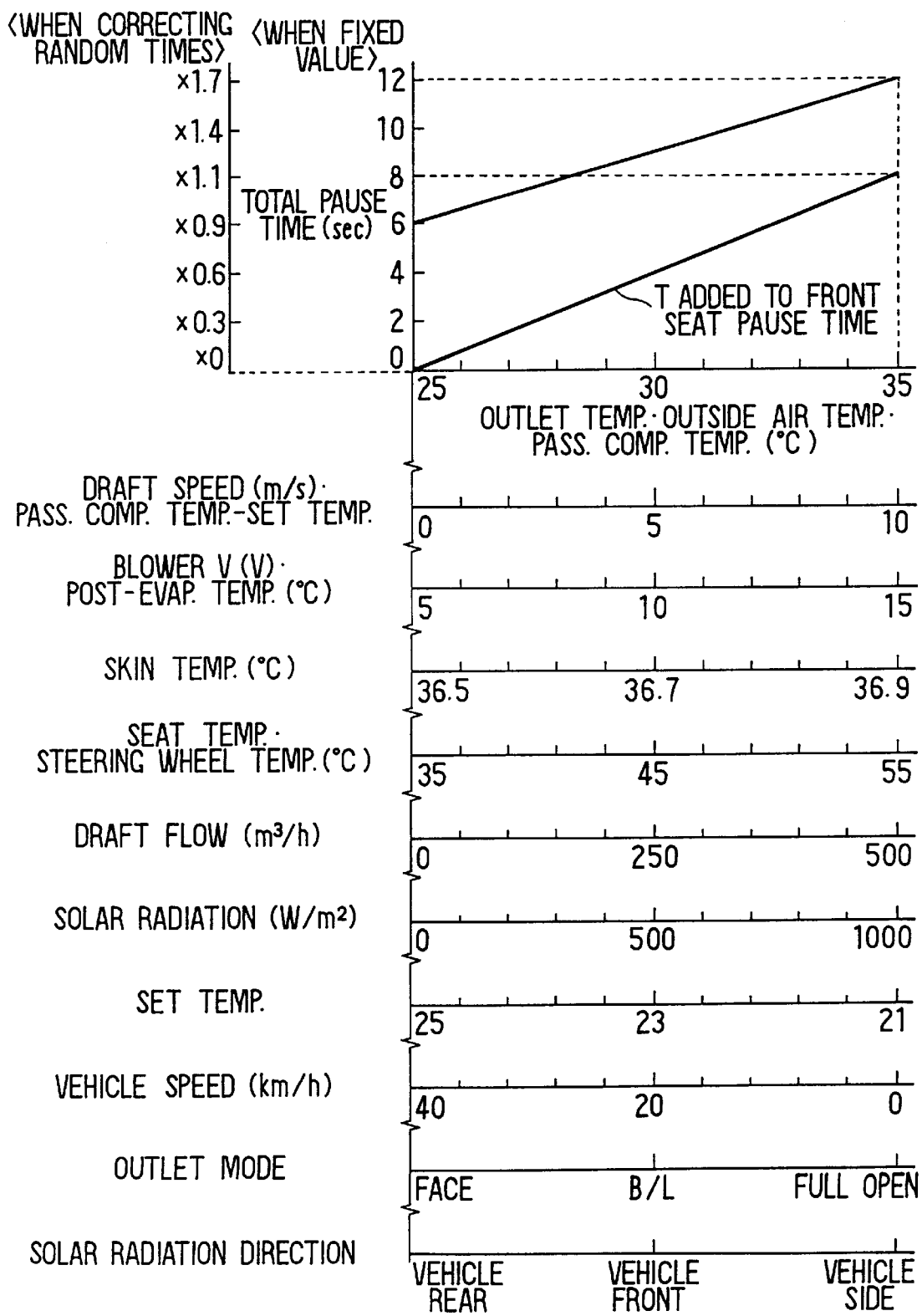
FIG. 14 is a characteristic diagram showing a relationship between air-conditioning load factors and total pause time according to the first preferred embodiment.

Also, when the air-conditioning load is high, by increasing the total pause time constituting the total of the swing pause time at the driver side and passenger side front seat occupant side swing ends and the swing pause time at the driver side and passenger side rear seat occupant side swing ends as shown in the characteristic chart of FIG. 14, it is possible to increase the proportion of time for which the swing ranges of the driver side and passenger side center louvers 41, 45 point toward driver side and passenger side front seat occupants or passenger side and driver side rear seat occupants, and thereby increase the overall air-conditioning effect. This improvement can also be obtained by shortening the time required for the blowout directions of the conditioned air to move from the driver side and passenger side front seat occupant side swing ends to the passenger side and driver side rear seat occupant side swing ends when the driver side and passenger side center louvers 41, 45 swing, thereby increasing the time for which they point toward driver side and passenger side front seat occupants or passenger side and driver side rear seat occupants.

In FIG. 14, when a random pause time is corrected, or when the total pause time is a fixed value, the random pause time or the total pause time is set to increase as the outlet temperature of air blown into the passenger compartment, the outside air temperature and the passenger compartment temperature increase. Also, the random or total pause time is set to increase as the speed of blowout toward occupants, the difference between the passenger compartment temperature and the set temperature, and the blower voltage increase. Likewise, the random or total pause time is set to increase as the post-evaporator temperature, a skin temperature, a seat temperature, and a steering wheel temperature increase, as the blower flow and the solar radiation strength increase, as the set temperature decreases, and as the vehicle speed increases.

Also, the random pause time or the total pause time is set to be longer when the outlet mode is the B/L mode compared to when it is the FACE mode, and longer when the outlet mode is a full-open mode compared to when it is the B/L mode. And the random pause time or the total pause time is set to be longer when the solar radiation direction is toward the vehicle front than compared to when it is toward the vehicle rear, and longer when the solar radiation direction is toward a vehicle side compared to when it is toward the vehicle front.

Because the front seats are near the front windshield the seats are frequently exposed to solar radiation. A time to be added to the front seat side pause time therefore is also shown in the characteristic diagram of FIG. 14. However, in special cases such as when guests are riding in the rear seats, the time shown in the characteristic chart of FIG. 14 to be added to the front seat side pause time may be taken as a time to be added to the rear seat side pause time.

Also, although in this preferred embodiment the swing pause time of the driver side and passenger side center louvers 41, 45 at their front and rear seat occupant side swing ends has been set to seven seconds or the swing pause time has been made a random pause time prescribed on a separately predetermined random table, when the air-conditioning load is high, by increasing the swing pause time it is possible to increase the proportion of time for which the driver and passenger side center louvers 41, 45 face occupants in the louvers' respective swing ranges to thereby increase the air-conditioning effect. This improvement of the air-conditioning effect can similarly obtained by increasing the time for which the driver and passenger side center louvers 41, 45 face occupants by shortening the time taken for the draft directions to move from one swing end to the other.

Although in the foregoing a total pause time of the driver and passenger side center louvers 41, 45 to be the total of a swing pause time at the driver side and passenger side front seat occupant side swing ends, and a swing pause time at the driver side and passenger side rear seat occupant side swing ends has been discussed, similar effects to those of the present preferred embodiment can also be obtained by providing ranges over which the louvers swing very slowly and, for example, changing the degree of that slowness or changing the time for which the louvers swing slowly.

Figure 16:
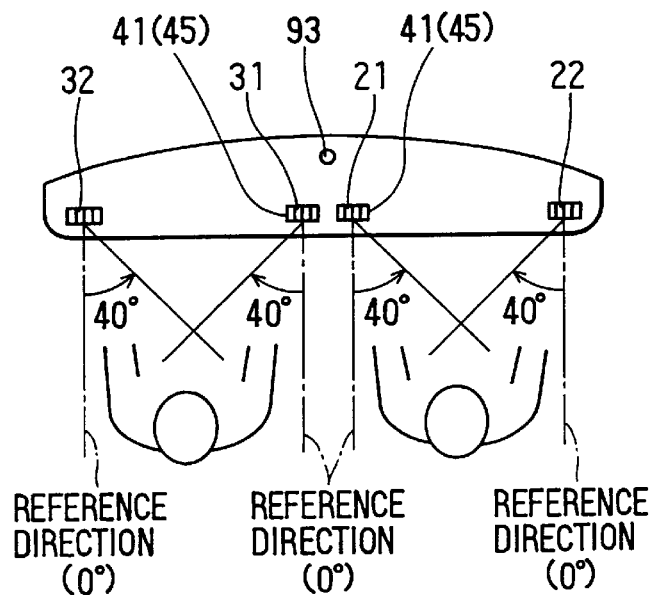
FIG. 16 is an explanatory view showing swing pause direction change widths of the first preferred embodiment.

The swing pause directions or stop positions may be changed in correspondence with the air-conditioning load as inferred for example from solar radiation strengths. As shown in FIG. 16, a state wherein the driver and passenger side center and side louvers 41, 45 are facing the front will be taken as a swing position stop direction reference direction (0°). It will be assumed that the swing position stop direction at which the draft is most distributed to the head and chest of occupants is 40°. In practice, adjustment of louver orientation at each swing grill according to the shape, orientation and position of the swing grill, the ability of the louvers to bend the conditioned air, the seat positions and so on is necessary. However, in this preferred embodiment the description will proceed with it being assumed that the distribution of draft to the head and chest of respective occupants is largest when the maximum change angle (width) of the swing position stop direction of the louvers of all of the swing grills is 40°.

When during cooldown the passenger compartment temperature (TR) has fallen to for example 31° C., swinging of the driver side and passenger side center and side louvers 41, 45 is started, because if conditioned air continues to be concentrated on occupants, it will result in local cooling and make the occupants uncomfortable. When a steady state of swinging of the driver side and passenger side center and side louvers 41, 45 continues for a long time, because the feeling of comfort of the occupants diminishes, the swinging is paused in a predetermined position for a random time.

However, when this kind of random swinging is carried out under high cooling load conditions, when the blowout direction or position of conditioned air does not correspond to a seated occupant, the occupant will and become uncomfortable if there is a swing pause time of several tens of seconds. Therefore, the swing is paused as closely as possible to the head and chest (particularly the face) of the occupant. When random swinging is carried out under a low cooling load, on the other hand, when the blowout direction or position is close to the head and chest (and particularly the face) of the occupant, and if there is a swing pause time of several tens of seconds, the occupant will become uncomfortable. Therefore, the swing is paused in a direction or position which as far as possible misses the occupant. The occupant side pause direction may alternatively be fixed in the above-mentioned 40° position.

Figure 15A:
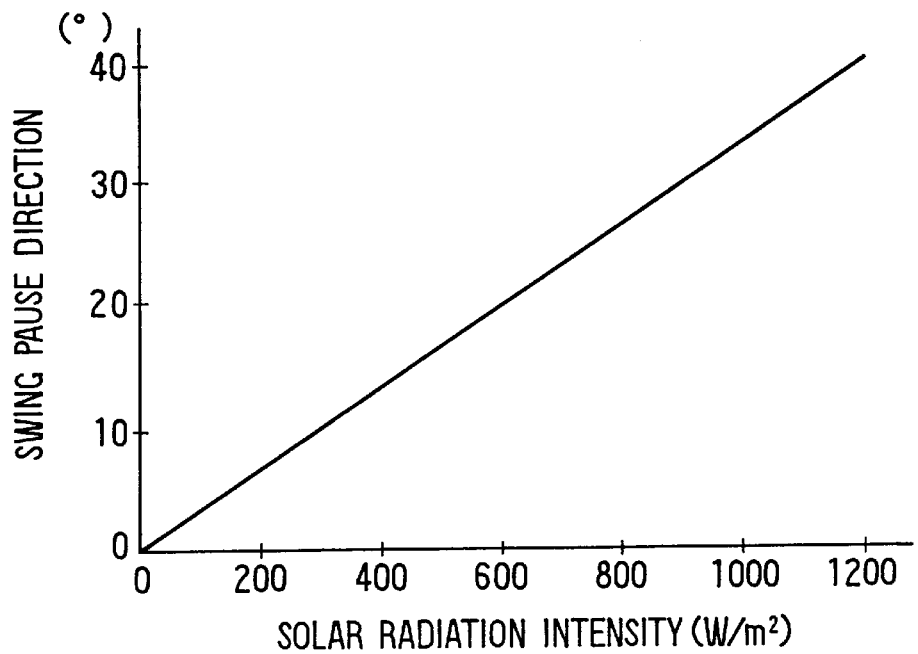
FIG. 15A is a characteristic diagram showing a relationship between solar radiation amount and swing pause direction.

Because the sense of warmth of an occupant is greatly affected by solar radiation, the louver angles at the direction in which swinging is temporarily paused are corrected in correspondence with the solar radiation strength, as shown in the characteristic diagram of FIG. 15A. Also, the louver angles may be corrected in correspondence with the passenger compartment temperature (TR) and the difference between the passenger compartment temperature (TR) and the set temperature (TSET) as the cooling load, as shown in the characteristic diagram of FIG. 15B. However, this correction is not essential.

Also, as shown in FIGS. 17A–17E, when it is possible for solar radiation direction with respect to the vehicle forward direction to be detected, or when it is possible to deduce solar radiation with respect to the forward direction of the vehicle using a navigation system, random swinging may be carried out by making the blowout directions or positions of the driver side air-conditioning zone and the passenger side air-conditioning zone differ in the left-right direction in accordance with solar radiation direction.

Figure 17A:
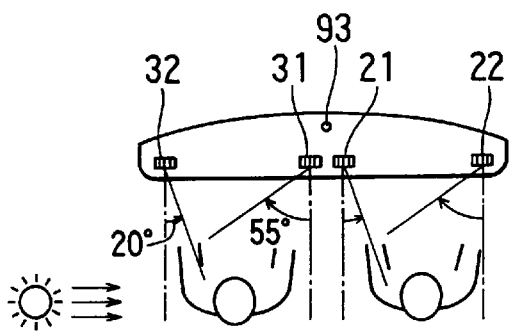
FIGS. 17A–17E illustrate a relationship between solar radiation direction and swing pause direction according to the first preferred embodiment.

For example, when as shown in FIG. 17A the solar radiation direction is across from the left with respect to the forward direction of the vehicle, because solar radiation strikes the left halves of the bodies of the driver side and passenger side occupants, the direction of the center and side louvers 41, 45 of the FACE outlets on the left sides of the occupants is made 20° from the reference position, and the direction of the side and center louvers 41, 45 of the FACE outlets on the right sides of the occupants is made 55° from the reference position. The temporary pause positions are thus set so that conditioned air concentrates on the body portions of the occupants upon which it is estimated that solar radiation is incident.

Figure 17B:
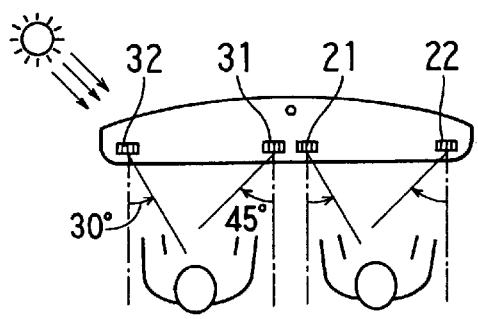
Figure 17C:
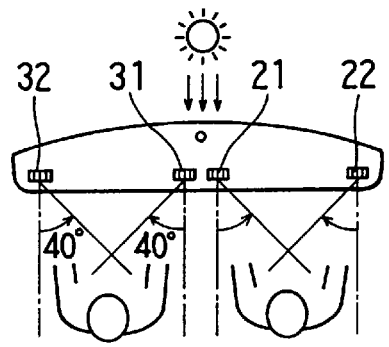
Figure 17D:
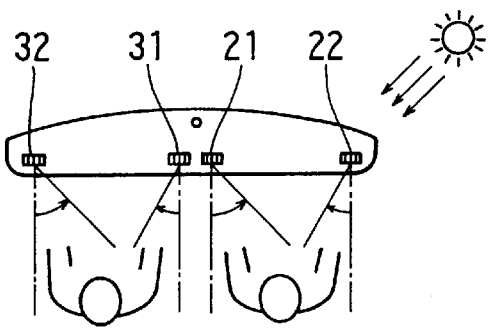
Figure 17E:
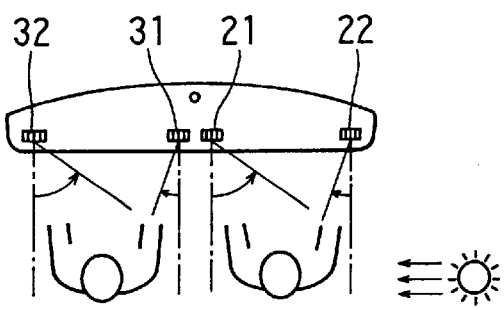

When as shown in FIG. 17B the solar radiation direction is diagonal from the front left with respect to the forward direction of the vehicle, because solar radiation strikes the driver and passenger side occupants diagonally from the left, the direction of the center and side louvers 41, 45 of the FACE outlets on the left sides of the occupants is made 30° from the reference position, and the direction of the side and center louvers 41, 45 of the FACE outlets on the right sides of the occupants is made 45° from the reference position. And when as shown in FIG. 17C the solar radiation direction is directly from the front or directly from the rear with respect to the forward direction of the vehicle, the directions of the center and side louvers 41, 45 of the FACE outlets on the left and right sides of the occupants are both made 40° from the reference position. In the cases shown in FIGS. 17D and 17E, the louver directions are set to the left-right reverse of those of FIGS. 17A and 17B.

Figure 18:
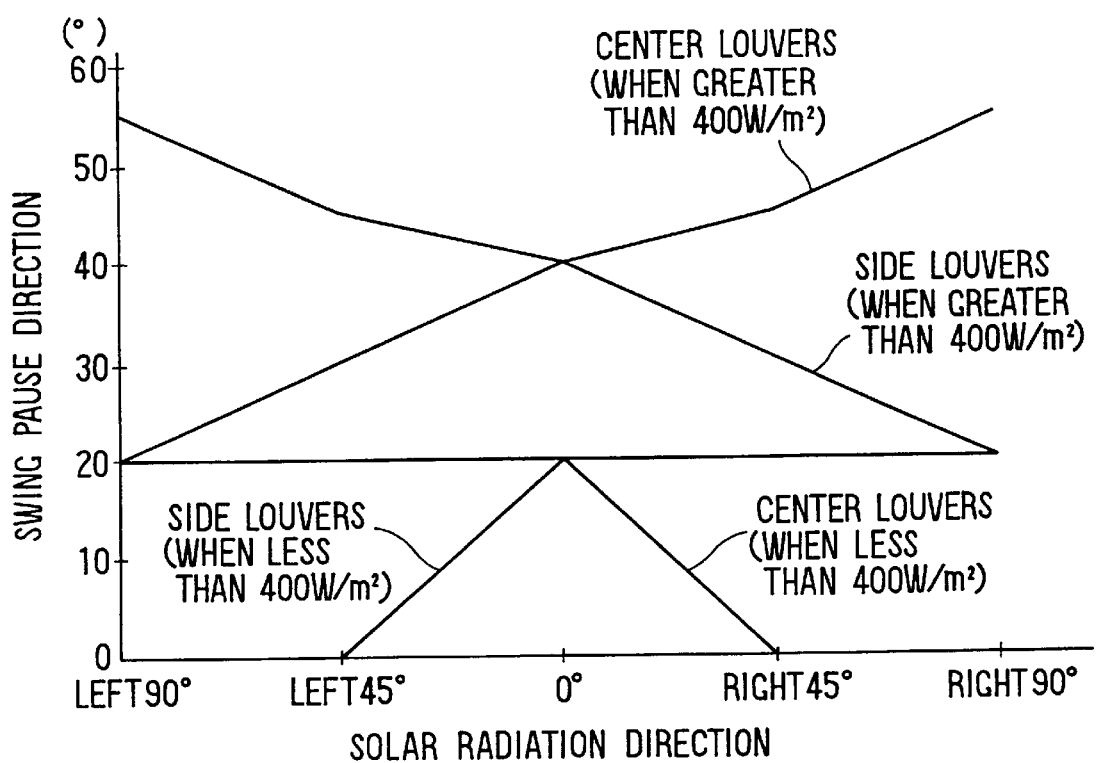
FIG. 18 is a characteristic diagram showing a relationship between solar radiation direction and amount and swing pause direction according to the first preferred embodiment.

A relationship between solar radiation direction and swing pause direction is shown in the characteristic diagram of FIG. 18. As shown in FIG. 18, it is desirable for not only the direction of the sun but also solar radiation strength to be taken into account. If this is done, with respect to weak solar radiation, occupants do not feel a strong draft on their faces, and their comfort is thereby improved.

It is desirable for tuning of the louver angles to be carried out for each FACE outlet, in accordance with the position of the swing grill, the shape of the vehicle, the positions of the faces of occupants, and the seat positions. Also, besides pausing the swinging of the louvers temporarily, a similar effect can be obtained by the louvers being made to move very slowly in the vicinity of a predetermined position until a predetermined control time elapses.

Figure 15B:
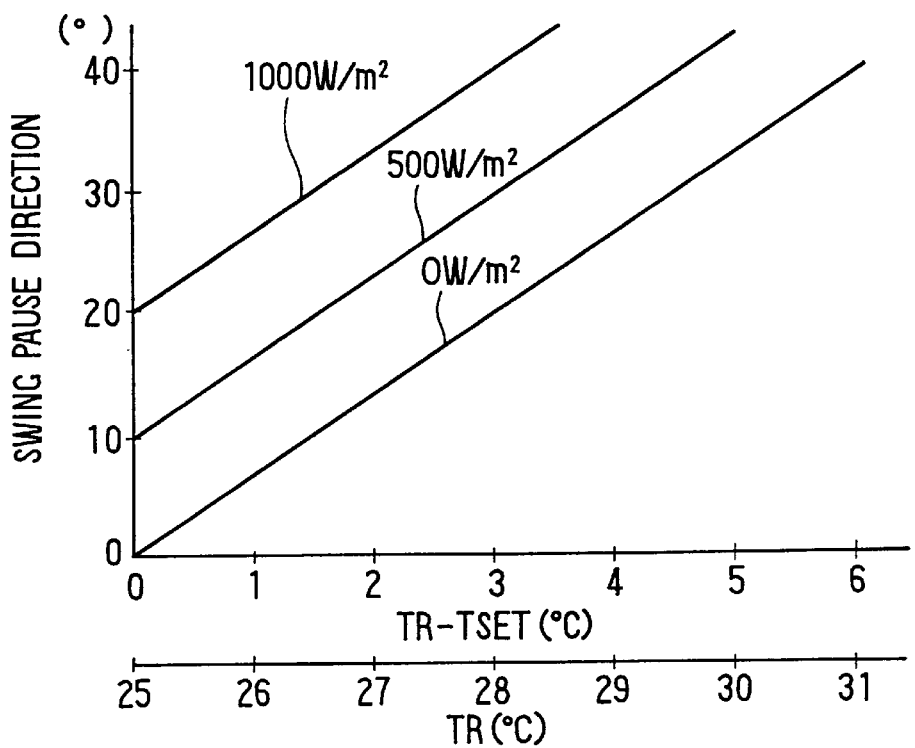
FIG. 15B is a characteristic diagram showing a relationship between swing stop direction, difference between passenger compartment temperature and set temperature, and passenger compartment temperature according to the first preferred embodiment.

Here, the swing pause directions at the driver side and passenger side front seat occupant side swing ends and the swing pause directions at the driver side and passenger side rear seat occupant side swing ends may alternatively be made the directions or positions shown in the characteristic charts FIG. 15A, 15B and FIG. 18 and in the explanatory views FIGS. 19A–19E.

Figure 20:
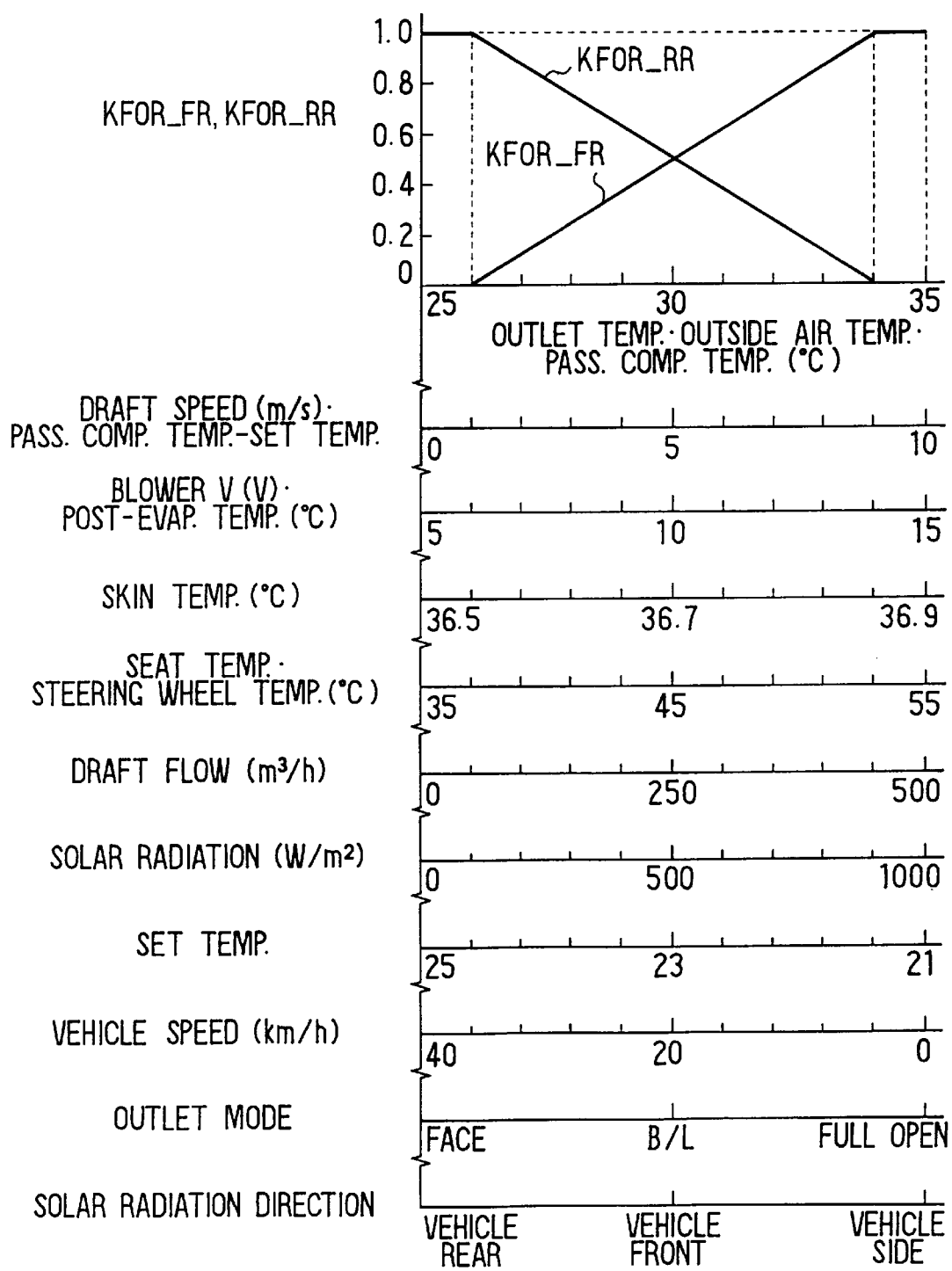
FIG. 20 is a characteristic diagram showing front seat occupant face pause time proportion and rear seat occupant face pause time proportion vs. air-conditioning load factors according to the first preferred embodiment.

During cooling and heating, as shown in the characteristic diagram in FIG. 20, a front seat occupant face direction front seat occupant face pause time proportion (KFOR FR) may be made greater as the cooling load indicators such as the outlet temperature, the outside air temperature, the passenger compartment temperature, the blowout speed, the difference between the passenger compartment temperature and the set temperature, the blower voltage, the post-evaporator temperature, a skin temperature, a seat temperature, a steering wheel temperature, the blower flow, the solar radiation strength and the vehicle speed increase; as the set temperature decreases; as the outlet mode provides less draft flow to the upper bodies of occupants; and as the solar radiation direction raises an occupant's need for cooling.

Conversely, as shown in the characteristic diagram in FIG. 20, a front seat occupant avoiding direction (rear seat occupant face direction) rear seat occupant face pause time proportion (KFOR RR) may be decreased as the cooling load factors decrease.

Figure 21:
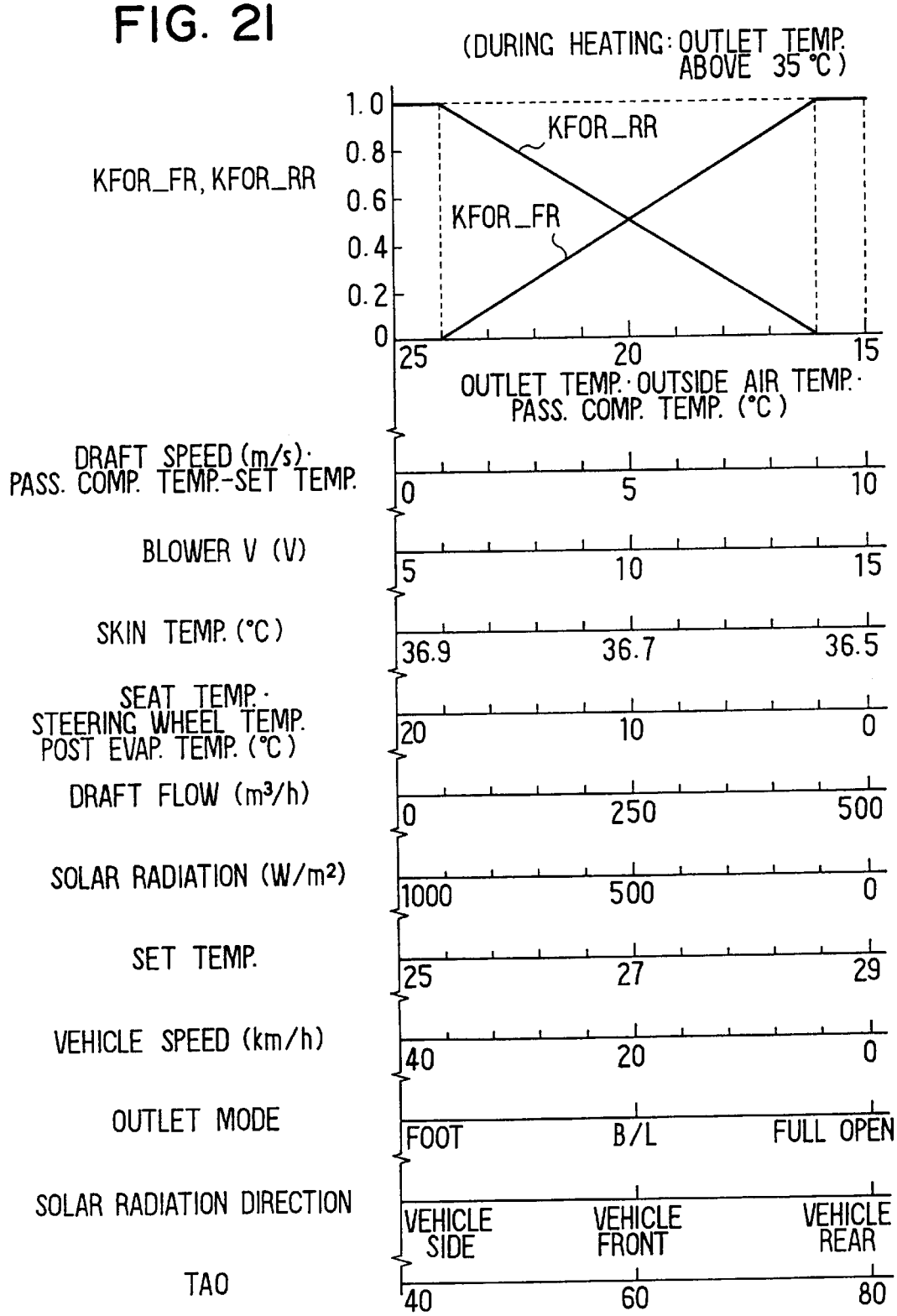
FIG. 21 is a characteristic diagram showing front seat occupant face pause time proportion and rear seat occupant face pause time proportion vs. air-conditioning load factors according to the first preferred embodiment.

During heating (outlet temperature above 35° C.), as shown in the characteristic diagram in FIG. 21, the front seat occupant face direction front seat occupant face pause time proportion (KFOR FR) may be increased as the space-heating load indicators such as the outlet temperature, the outside air temperature, the passenger compartment temperature, the blowout speed, the difference between the passenger compartment temperature and the set temperature, the blower voltage, the post-evaporator temperature, a skin temperature, a seat temperature, a steering wheel temperature, the blower flow, the solar radiation strength, the vehicle speed and the target outlet temperature (TAO) decrease; as the set temperature increases; as the outlet mode is provides less draft flow to the lower bodies of occupants; and as the solar radiation direction decreases an occupant's need for space-heating. Conversely, as shown in the characteristic diagram in FIG. 21, the front seat occupant avoiding direction (rear seat occupant face direction) rear seat occupant face pause time proportion (KFOR RR) may be decreased as the heating load indicators decrease.

Figure 22:
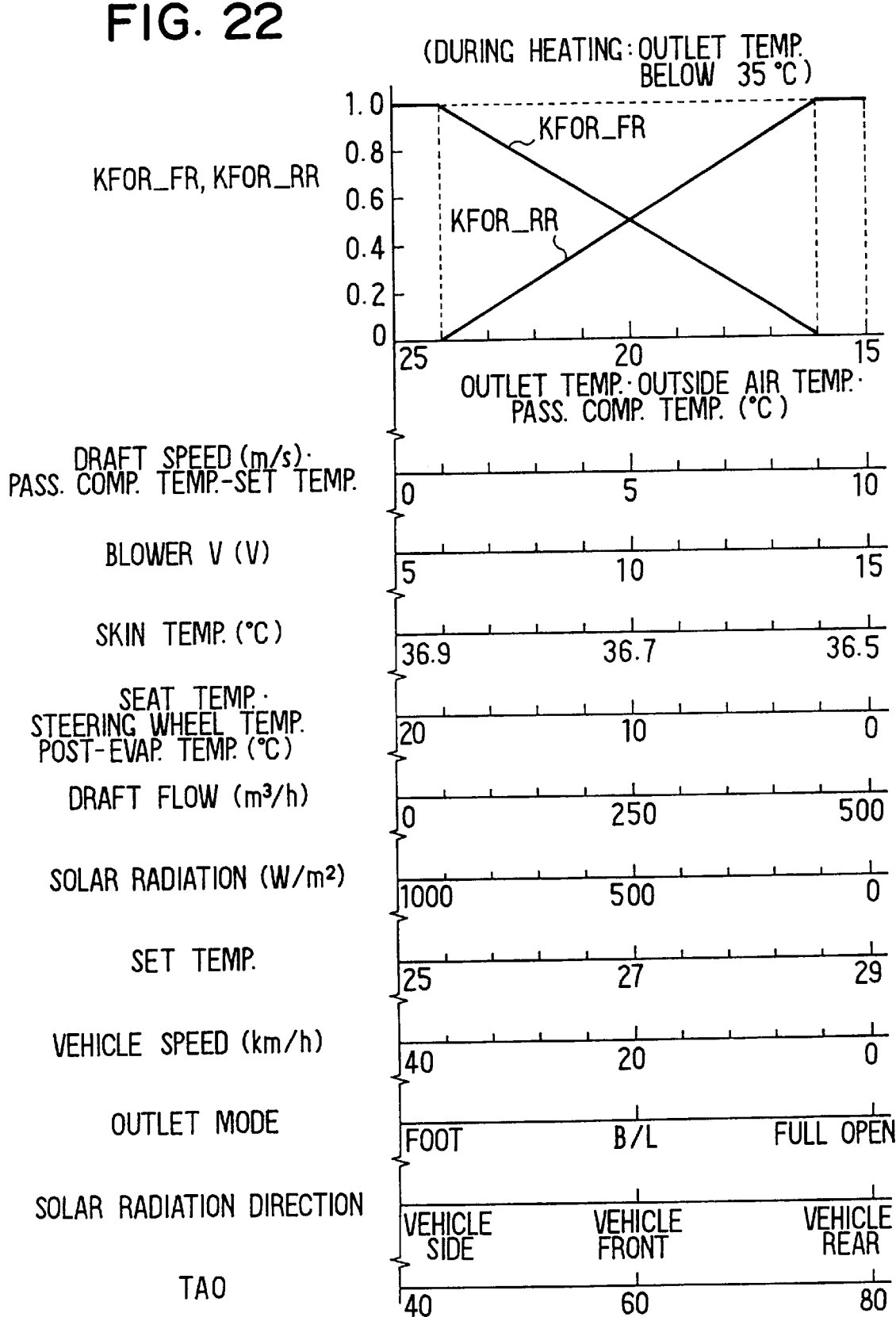
FIG. 22 is a characteristic diagram showing front seat occupant face pause time proportion and rear seat occupant face pause time proportion vs. air-conditioning load factors according to the first preferred embodiment.

During heating (outlet temperature below 35° C.), as shown in the characteristic diagram in FIG. 22, the front seat occupant face direction front seat occupant face pause time proportion (KFOR FR) may be increased as the space-heating load decreases. Conversely, as shown in the characteristic diagram in FIG. 22, the front seat occupant avoiding direction (rear seat occupant face direction) rear seat occupant face pause time proportion (KFOR RR) may be decreased as the heating load factors decrease. Just one of the above controls may be carried out, or alternatively two or more may be carried out in combination.

Operation of the vehicle air-conditioning system of this preferred embodiment will now be described.

When the swing mode switching switches 69, 73 have been set to 'AUTO', if the outlet mode is the FACE mode (or the B/L mode), outside air drawn in through the outside air inlet 7 by the action of the blower 4 is cooled by the evaporator 10 to for example about 4° C. and then enters the first and second air passages 11, 12, and the amount passing through the heater core 13 is adjusted according to the apertures of the driver side and passenger side A/M doors 15, 16, whereby respective conditioned air at optimal temperatures are produced.

Thereafter, the conditioned air is blown through the driver side center FACE outlet 21, the driver side side FACE outlet 22, the passenger side center FACE outlet 31 and the passenger side side FACE outlet 32, at the downstream ends of the first and second air passages 11, 12, into a driver side air-conditioning zone and a passenger side air-conditioning zone. In particular, cool drafts are blown through the driver side center and side FACE outlets 21, 22 toward the upper body of a driver seat occupant and blown through the passenger side center and side FACE outlets 31, 32 toward the upper body of a passenger seat occupant.

At this time, a solar radiation strength TS(Dr) of the driver side air-conditioning zone, a solar radiation strength TS(Pa) of the passenger side air-conditioning zone and a solar radiation direction (TSRL) from which solar radiation is entering the passenger compartment are calculated on the basis of a solar radiation sensor signal from the solar radiation sensor 93 and time constants. When from the results of this calculation it is inferred that solar radiation is striking an occupant of the driver side air-conditioning zone or an occupant of the passenger side air-conditioning zone, as shown in the illustrations FIG. 19A–FIG. 19E, swing position stop directions are determined on the basis of the direction of the solar radiation entering the passenger compartment. Specifically, swinging of the center and side louvers 41 is paused so that the louver directions of the center and side louvers 41 point in the direction of an occupant or in a direction avoiding the occupant.

Figure 19A:
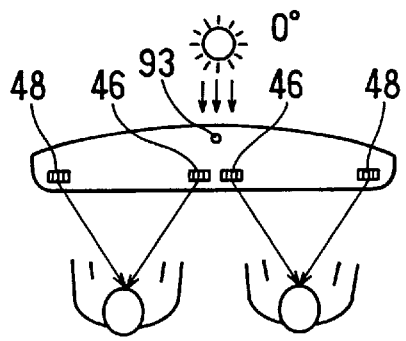
FIGS. 19A–19E are operation illustrations showing a relationship between solar radiation direction and swing pause direction according to the first preferred embodiment.

For example, when as shown in FIG. 19A the solar radiation direction is across from the left with respect to the forward movement direction of the vehicle, because solar radiation strikes the left sides of the driver and passenger side occupants, the direction of the center and side louvers 41 of the FACE outlet on the left side of each occupant is made the left side vicinity of the occupant and the direction of the center and side louvers 41 of the FACE outlet on the right side of each occupant is also made the left side vicinity of the occupant. Swing pause positions are so set that the conditioned air is concentrate blown out on the parts of the occupants on which it is presumed that solar radiation is incident.

Figure 19B:
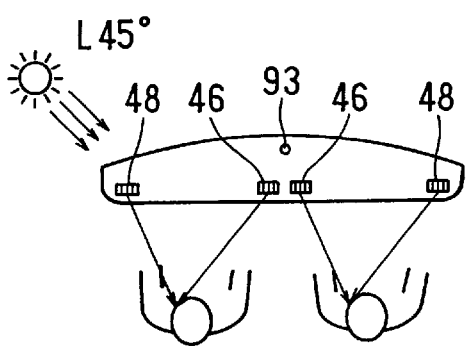
Figure 19C:
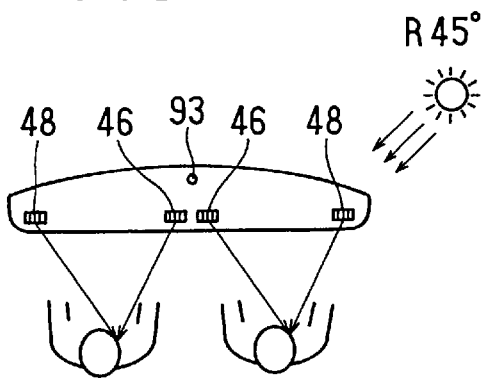
Figure 19D:
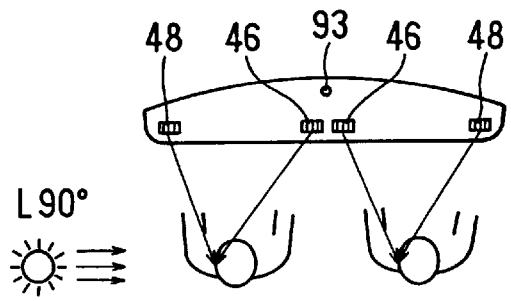
Figure 19E:
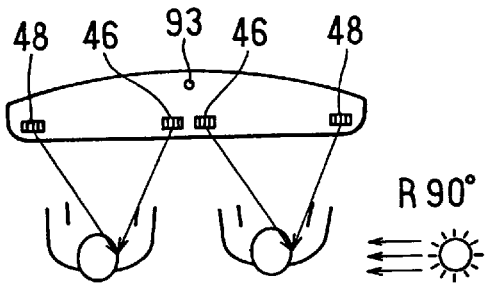

When as shown in FIG. 19B the solar radiation direction is diagonally from the left with respect to the forward movement direction of the vehicle, because solar radiation strikes the driver side and passenger side occupants diagonally from the left, the direction of the side louvers 41 of the FACE outlet on the left side of each occupant is made the left side vicinity of the occupant, and the direction of the side louvers 41 of the FACE outlet on the right side of the occupant is made the left side vicinity of the occupant. When as shown in FIG. 19C the solar radiation direction is directly from the front or directly from the rear with respect to the advance of the vehicle, both the center and side louvers 41 of the FACE outlets on the left and the right of each occupant are directed to the head and chest of the occupant. In the cases shown in FIGS. 19D and 19E the settings are the reverse of those of FIGS. 19A and 19B.

Figure 23:
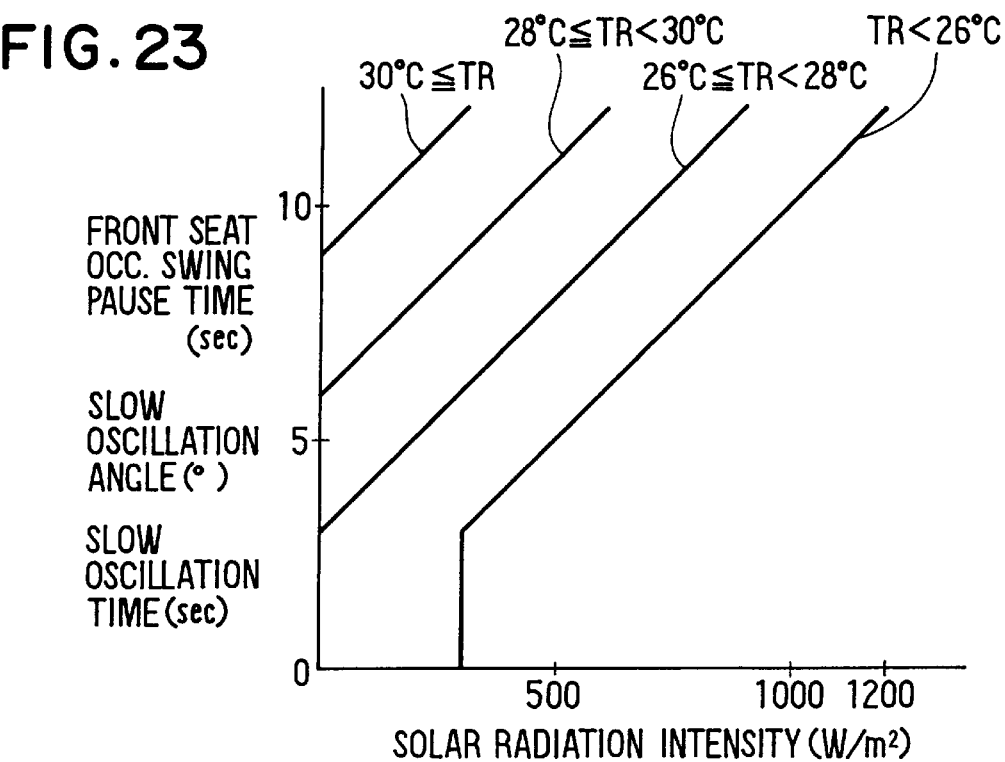
FIG. 23 is a characteristic diagram showing swing pause time at a front seat occupant direction vs. solar radiation amount and passenger compartment temperature according to the first preferred embodiment.
Figure 24:
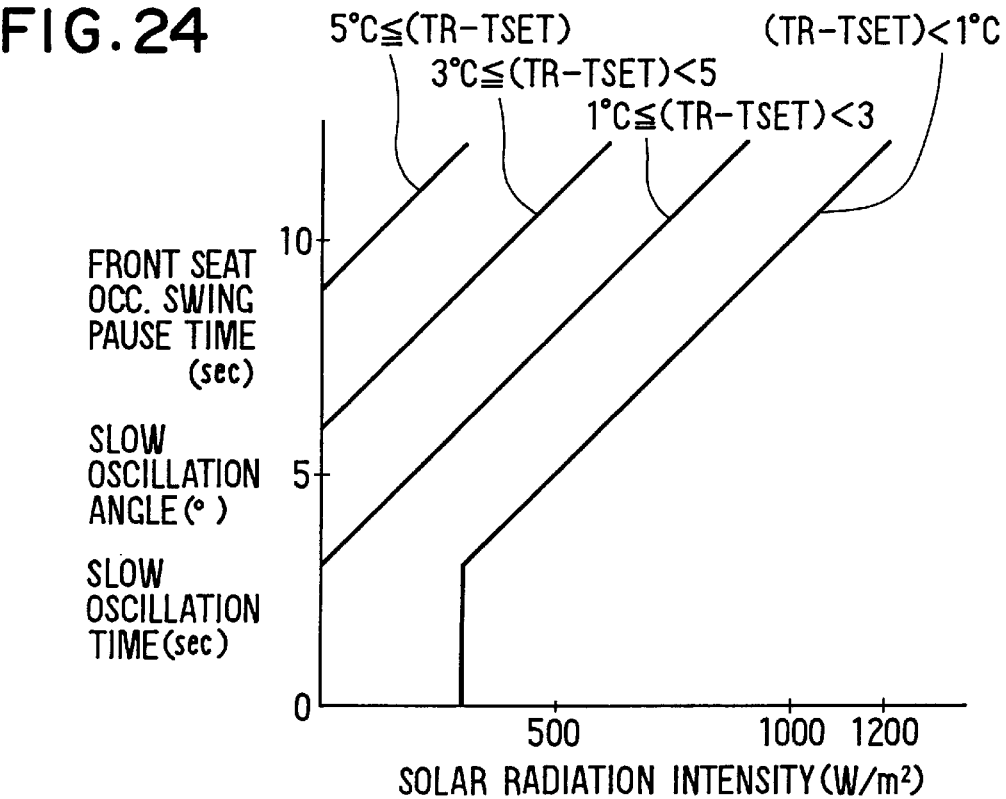
FIG. 24 is a characteristic diagram showing swing pause time at a front seat occupant direction vs. solar radiation amount and passenger compartment temperature and set temperature according to the first preferred embodiment)
Figure 25:
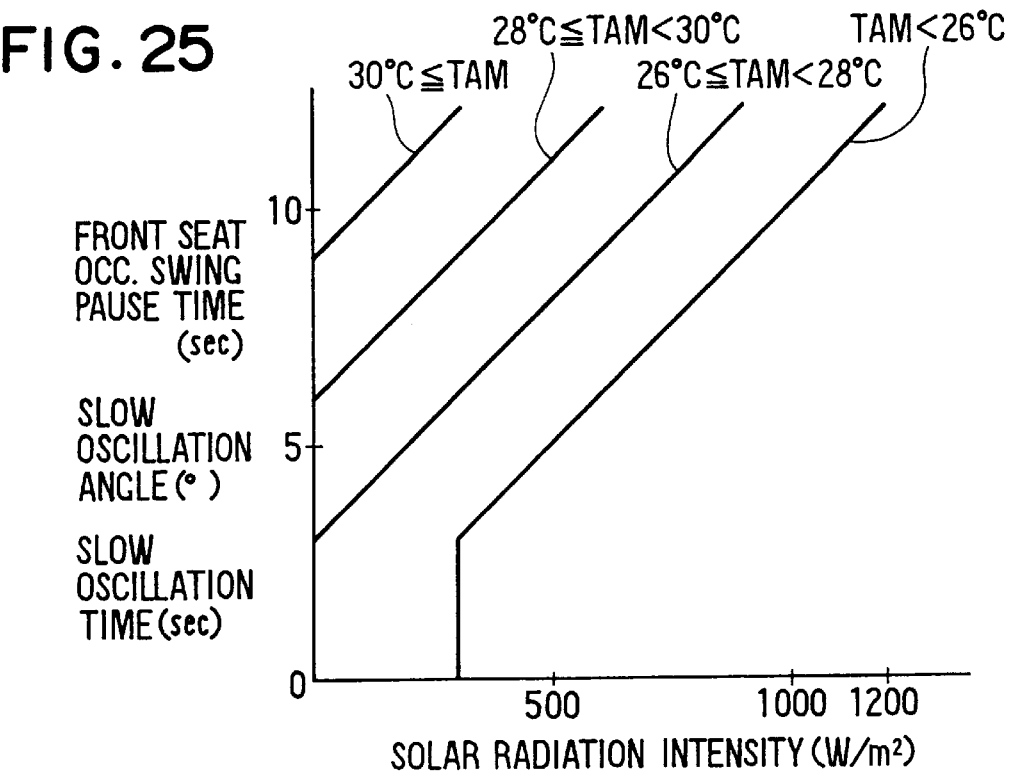
FIG. 25 is a characteristic diagram showing swing pause time at a front seat occupant direction vs. solar radiation amount and outside air temperature according to the first preferred embodiment.

Next, as shown in the characteristic diagrams in FIGS. 23–25, a swing pause time at the front seat occupant direction is obtained from the solar radiation strength and the passenger compartment temperature, a swing pause time at the front seat occupant direction is obtained from the solar radiation and the temperature difference between the passenger compartment temperature and the set temperature, or a swing pause time at the front seat occupant direction is obtained from the solar radiation and the outside air temperature. For instance, as shown in the characteristic diagram in FIG. 23, when the solar radiation is for example 500 (W/m$^2$), if 28(° C.)$\leq$TR<30(° C.) the swing pause time becomes eleven seconds, if 26(° C.)$\leq$TR<28(° C.) the swing pause time becomes eight seconds, and if TR<26(° C.) the swing pause time at the front seat occupant direction becomes five seconds. With the characteristic diagram in FIG. 23, although a swing pause time at the front seat occupant direction has been discussed here, a similar effect can be obtained by changing in accordance with the solar radiation a time for which the swinging louvers oscillate slowly, or an angle (°) over which they oscillate slowly, at the front seat occupant direction.

Alternatively, as shown in the characteristic diagram in FIG. 24, when for example the solar radiation is 500 (W/m$^2$), if 3(° C.)$\leq$TR−TSET<5(° C.) the swing pause time at the front seat occupant direction becomes eleven seconds, if 1(° C.)$\leq$TR−TSET<3(° C.) the swing pause time at the front seat occupant direction becomes eight seconds, and if TR−TSET<1(° C.) the swing pause time at the front seat occupant direction becomes five seconds. Or, as shown in the characteristic diagram in FIG. 25, for example when the solar radiation is 500 (W/m$^2$), if 28(° C.)$\leq$TAM<30(° C.)

the swing pause time at the front seat occupant direction becomes eleven seconds, if 26(° C.)≦TAM<28(° C.) the swing pause time at the front seat occupant direction becomes eight seconds, and if TAM<26(° C.) the swing pause time at the front seat occupant direction becomes five seconds.

Therefore, as also in the characteristic diagrams shown in FIGS. 24 and 25, although a swing pause time at the front seat occupant direction has been discussed here, a similar effect can be obtained by changing in accordance with the solar radiation a time for which the swinging louvers oscillate slowly, or an angle (°) over which they oscillate slowly, at the front seat occupant direction.

Figure 26:
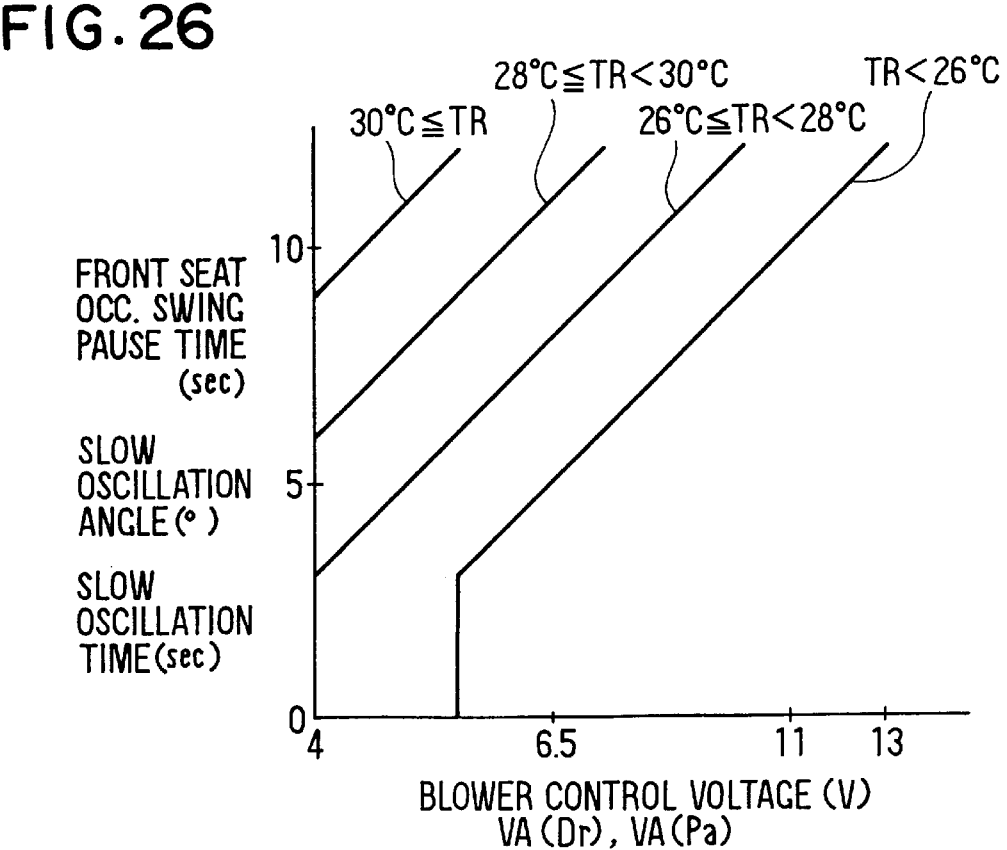
FIG. 26 is a characteristic diagram showing swing pause time at a front seat occupant direction vs. blower control voltage and passenger compartment temperature according to the first preferred embodiment.
Figure 27:
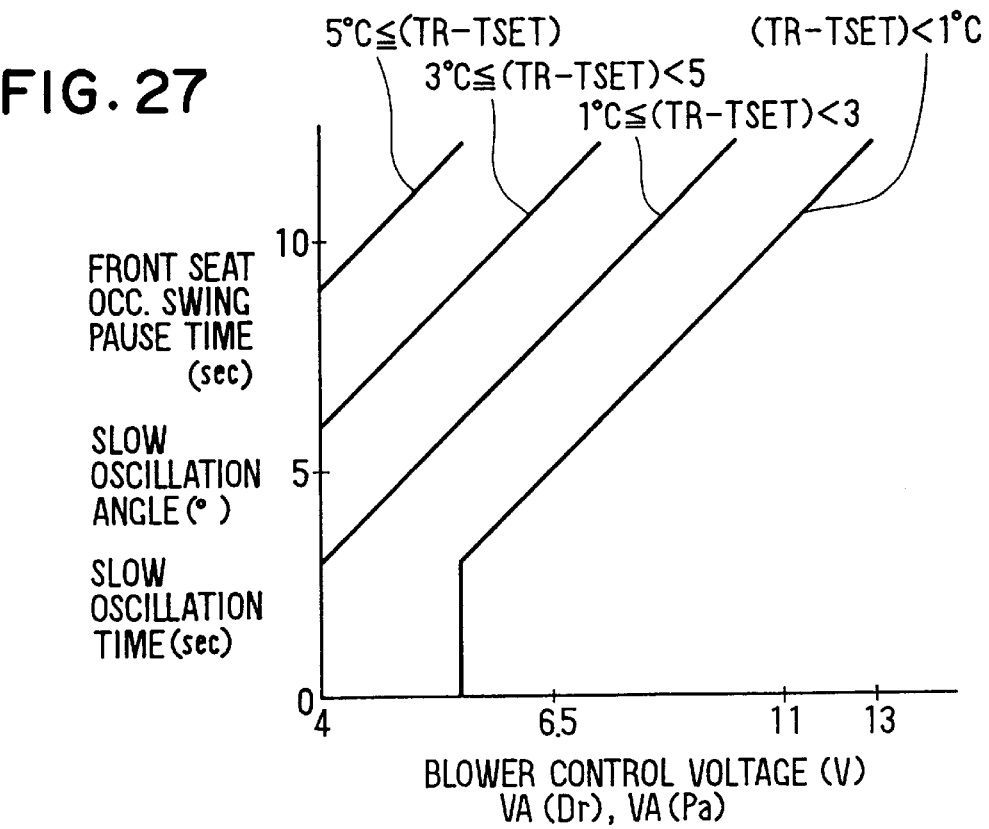
FIG. 27 is a characteristic diagram showing swing pause time at a front seat occupant direction vs. blower control voltage and difference between passenger compartment temperature and set temperature according to the first preferred embodiment.
Figure 28:
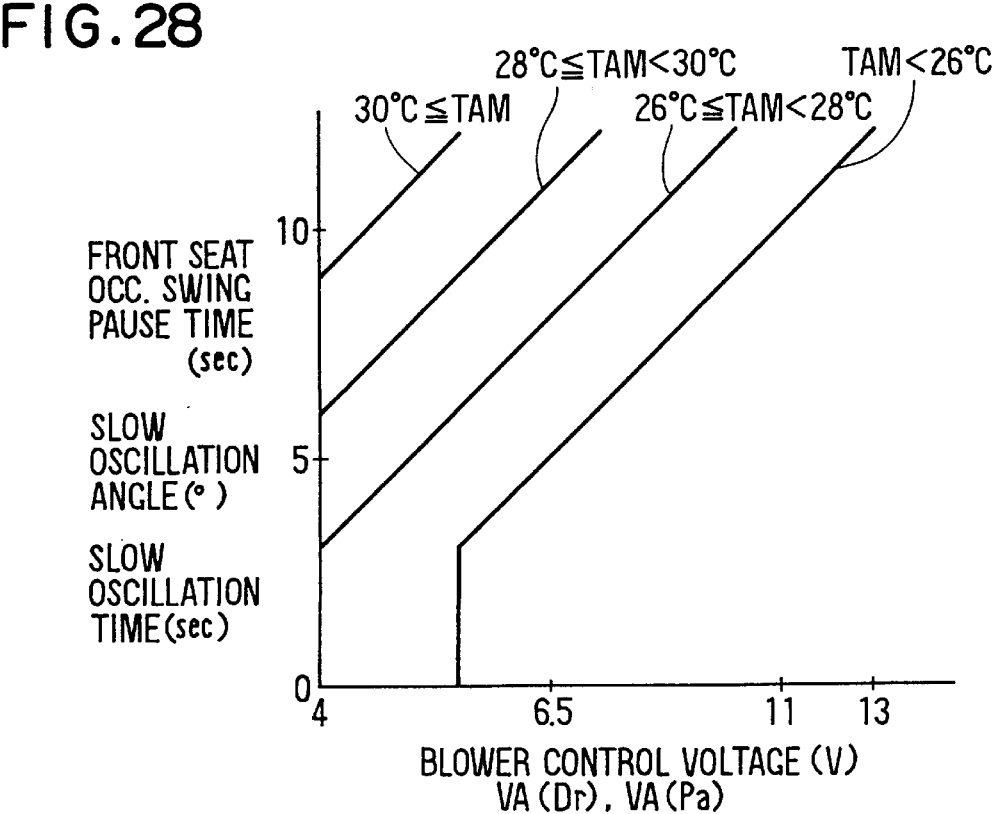
FIG. 28 is a diagram showing swing pause time at a front seat occupant direction vs. blower control voltage and outside air temperature according to the first preferred embodiment.

As shown in the characteristic diagrams FIGS. 26–28, a swing pause time at the front seat occupant direction may alternatively be obtained from the blower control voltage impressed on the blower motor 9 of the blower 4 and the passenger compartment temperature, a swing pause time at the front seat occupant direction may be obtained from the blower flow and the difference between the passenger compartment temperature and the set temperature, or a swing pause time at the front seat occupant direction may be obtained from the blower flow and outside air temperature. For instance, as shown in the characteristic diagram in FIG. 26, when the blower control voltage is for example 6.5 (V), if 28(° C.)≦TR<30(° C.) then the swing pause time at the front seat occupant direction becomes eleven seconds, if 26(° C.)≦TR<28(° C.) then the swing pause time at the front seat occupant direction becomes eight seconds, and if TR<26(° C.) then the swing pause time at the front seat occupant direction becomes five seconds. With this characteristic diagram, although a swing pause time at the front seat occupant direction has been discussed here, a similar effect can be obtained by changing in accordance with the blower control voltage (the blower flow) a time for which the swinging louvers oscillate slowly, or an angle (°) over which they oscillate slowly, at the front seat occupant direction.

Alternatively, as shown in the characteristic diagram in FIG. 27, when for example the blower control voltage is 6.5(V), if 3(° C.)≦TR−TSET<5(° C.) then the swing pause time at the front seat occupant direction becomes eleven seconds, if 1(° C.)≦TR−TSET<3(° C.) then the swing pause time at the front seat occupant direction becomes eight seconds, and if TR−TSET<1(° C.) then the swing pause time at the front seat occupant direction becomes five seconds.

Or, as shown in the characteristic diagram in FIG. 28, for example when the blower control voltage is 6.5(V), if 28(° C.)≦TAM<30(° C.) then the swing pause time at the front seat occupant direction becomes eleven seconds. If 26(° C.)≦TAM<28(° C.) then the swing pause time at the front seat occupant direction becomes eight seconds. If TAM<26(° C.) then the swing pause time at the front seat occupant direction becomes five seconds. As shown by these characteristic diagrams, although a swing pause time at the front seat occupant direction has been discussed, a similar effect can be obtained by changing in accordance with the blower control voltage a time for which the swinging louvers oscillate slowly, or an angle (°) over which they oscillate slowly, at the front seat occupant direction.

As described above, in the vehicle air-conditioning system of this preferred embodiment, for example when it is presumed that solar radiation incident upon a driver side front seat occupant or a passenger side front seat occupant, the predetermined pause for the driver side and passenger side center and side louvers 41, 45 at the front seat occupant direction is automatically set to become longer as the amount of solar increases or as the blower flow increases. Also, this predetermined time is automatically set to increase as the passenger compartment temperature (TR) increases, as the difference between the passenger compartment temperature and the set temperature increases, or as the outside air temperature (TAM) increases.

As shown in FIGS. 19A–19E, pause directions, at which the driver and passenger side center and side louvers 41, 45 are paused at front seat occupant blowout directions, are automatically set in correspondence with the solar radiation direction. When it is presumed that solar radiation is not striking either the driver or passenger side front seat occupant, swinging of the driver side and passenger side center and side louvers 41, 45 is paused at a blowout location (rear seat occupant directions) that avoids the front seat occupants until a predetermined pause time elapses more than when it is presumed that solar radiation is striking either the driver side or the passenger side front seat occupant.

Thus, it is possible for blowout directions of conditioned air to be automatically set to front or rear seat occupant directions both with respect to air-conditioning load factors which change frequently, such as for example when the vehicle enters and leaves tunnels and buildings, the forward direction of the vehicle relative to the solar radiation direction, and variation in the solar radiation sensor signal output from the solar radiation sensor 93, and with respect to air-conditioning load factors which change gradually, such as the passenger compartment temperature decreasing during air-conditioning.

Consequently, it is possible for the feeling of comfort of driver side or passenger side front seat occupants or passenger side and driver side rear seat occupants to be improved without the need for complicated and troublesome manual operations, such as the need to manually direct or the need to manually initiate a pause time selection switch when additional cooling is desired.

As the air-conditioning load detecting device for detecting the air-conditioning load inside the passenger compartment, besides the above, the set temperature, the outlet mode, the difference between the set temperature and the passenger compartment temperature, the passenger compartment temperature, the outside air temperature, the post-evaporator temperature, the cooling water temperature, the vehicle speed, the blower flow or the number of passengers are also conceivable as air-conditioning load indicators, and sensors for detecting these values and temperature setting devices for setting temperatures can also be used as air-conditioning load detecting devices.

Effects similar to those described above can also be achieved by the pause time at the front seat occupant direction being set longer the larger the air-conditioning load is when an air-conditioning load detected by any of these air-conditioning load detecting devices is above a predetermined value. When an air-conditioning load detected by any air-conditioning load detecting device is below a predetermined value, by the pause time in a direction avoiding the front seat occupant being set shorter than when the air-conditioning load is above the predetermined value the smaller the air-conditioning load is, the overcooling of occupants can be prevented.

Other methods of automatic swing control of the driver side and passenger side center louvers (and driver side and passenger side side louvers) 41, (45) will now be explained on the basis of the timing diagrams in FIGS. 29 and 30 and the characteristic diagrams in FIGS. 31–44.

Figure 29:
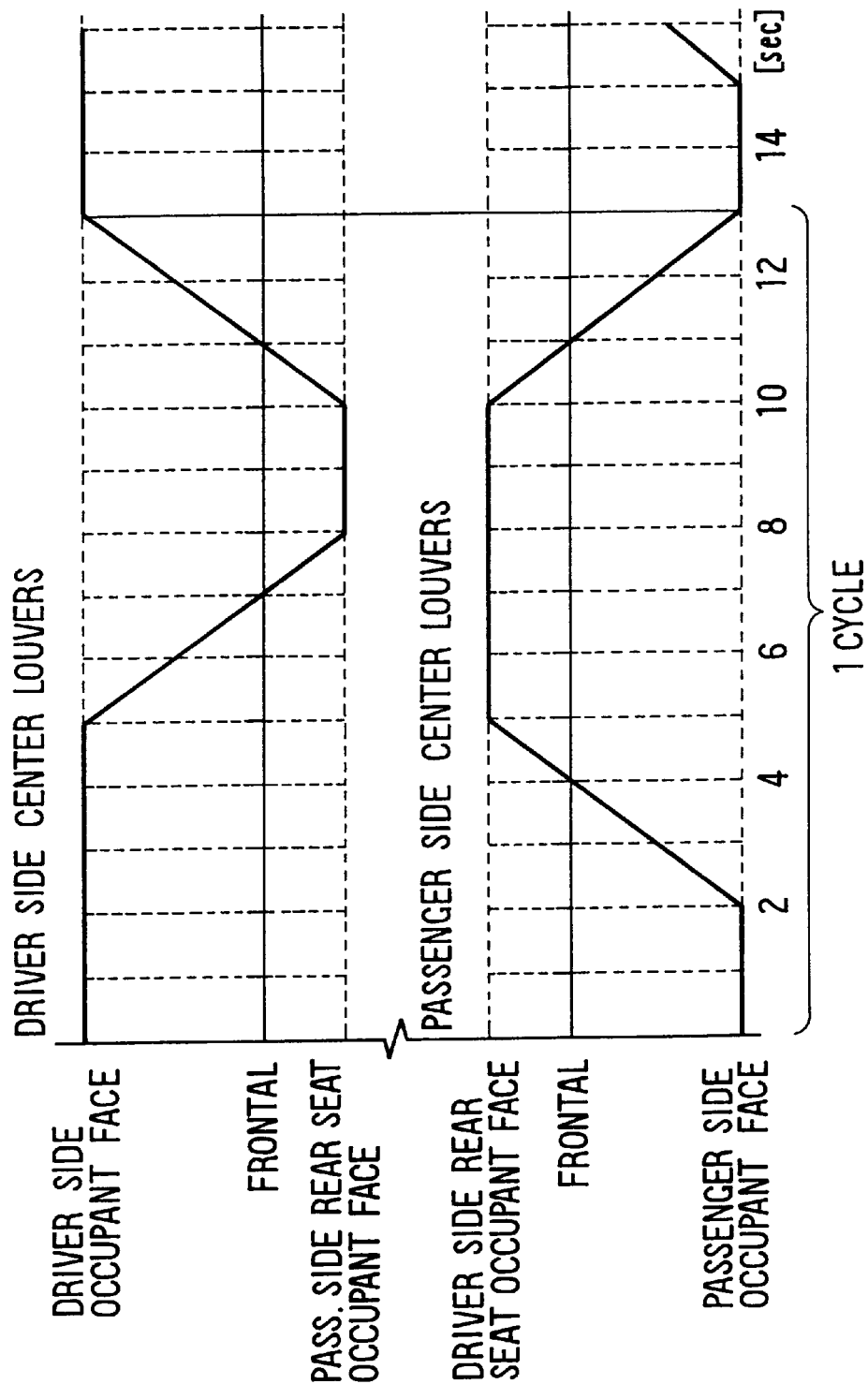
FIG. 29 is a timing diagram showing a driver side and passenger side center louver control method of when the timing of reaching a closest occupant side is synchronized according to the first preferred embodiment.

As shown in FIG. 29, even if the driver side air-conditioning load is greater than the passenger side air-conditioning load, control may be so carried out that the timing with which the driver side center louvers 41, (45) reach the driver side front seat occupant face direction from the passenger side rear seat occupant face direction via the frontal direction is the same as the timing with which the passenger side center louvers 41, (45) reach the passenger side front seat occupant face direction from the driver side rear seat occupant face direction via the frontal direction. When this is done, notwithstanding that the driver side air-conditioning load and the passenger side air-conditioning load are different, because the movements of the driver side and passenger side center louvers 41, (45) are synchronous, overall system operation is improved.

Figure 30:
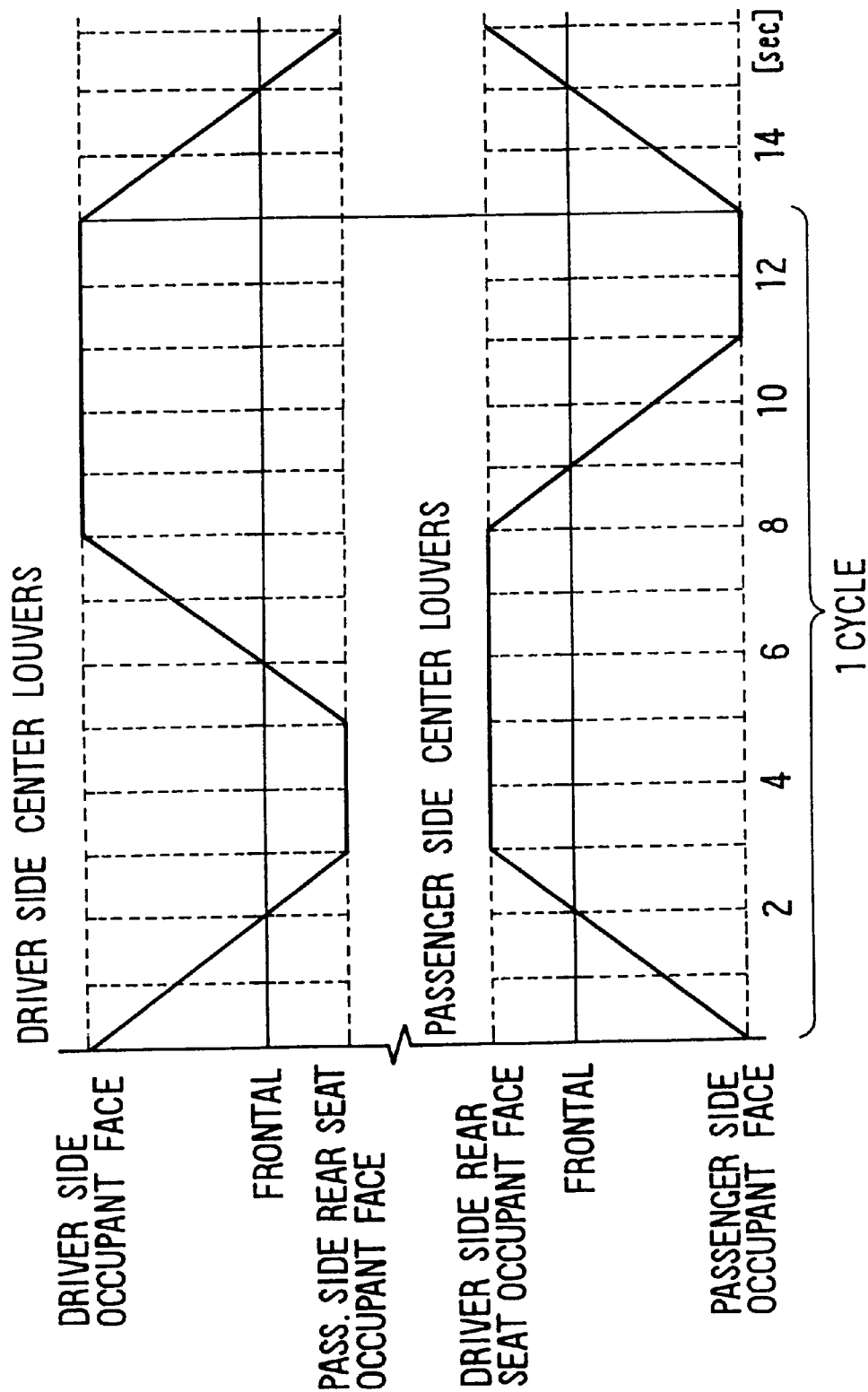
FIG. 30 is a timing diagram showing a driver side and passenger side center louver control method of when the timing of reaching a most adjacent air-conditioning zone side is synchronized according to the first preferred embodiment.

FIG. 30 is a timing diagram showing a control method of when the timing with which the driver side and passenger side center louvers 41, (45) respectively swing to the side of the other air-conditioning zone most adjacent to them is made the same, and again shows the control method as of when for example the driver side air-conditioning load>the passenger side air-conditioning load.

As shown in FIG. 30, control may be carried out so that even if the driver side air-conditioning load is greater than the passenger side air-conditioning load, the timing with which the driver side center louvers 41, (45) reach the driver side front seat occupant face direction from the passenger side rear seat occupant face direction via the frontal direction is the same as the timing with which the passenger side center louvers 41, (45) reach the side of the adjacent other air-conditioning zone. When this is done, notwithstanding that the driver side air-conditioning load and the passenger side air-conditioning load are different, because the movements of the driver side and passenger side center louvers 41, (45) are synchronous, system operation is improved. For example, at times of uneven solar radiation, after correction increasing the swing pause time at the occupant side swing end on the side of the swing range of the driver side center louvers 41, (45) where there was solar radiation has been carried out, when a condition in which frontal solar radiation or no solar radiation is resumed, the swing movements on the driver side and passenger side (left and right seats) do not become asynchronous, thereby improving overall system performance.

In a vehicle with left-right independent temperature control, at a time of left-right independent temperature control of a driver side air-conditioning zone and a passenger side air-conditioning zone, if the passenger side center louvers 41, (45) swing most to the driver side front seat occupant side when the driver side center louvers 41, (45) are pointing most in the direction of the driver side front seat occupant, the left side of the driver side front seat occupant is very easily exposed to the influence of the set temperature of the passenger side air-conditioning zone. However, when the timing with which the driver side center louvers 41, (45) reach the driver side front seat occupant face direction and the timing with which the passenger side center louvers 41, (45) reach the adjacent driver side air-conditioning zone side are synchronized, as described above, by the conditioned air from the passenger side center FACE outlet 31 being cut by an air curtain formed by the conditioned air from the driver side center FACE outlet 21, left-right temperature control independence can be maintained.

Figure 31A:
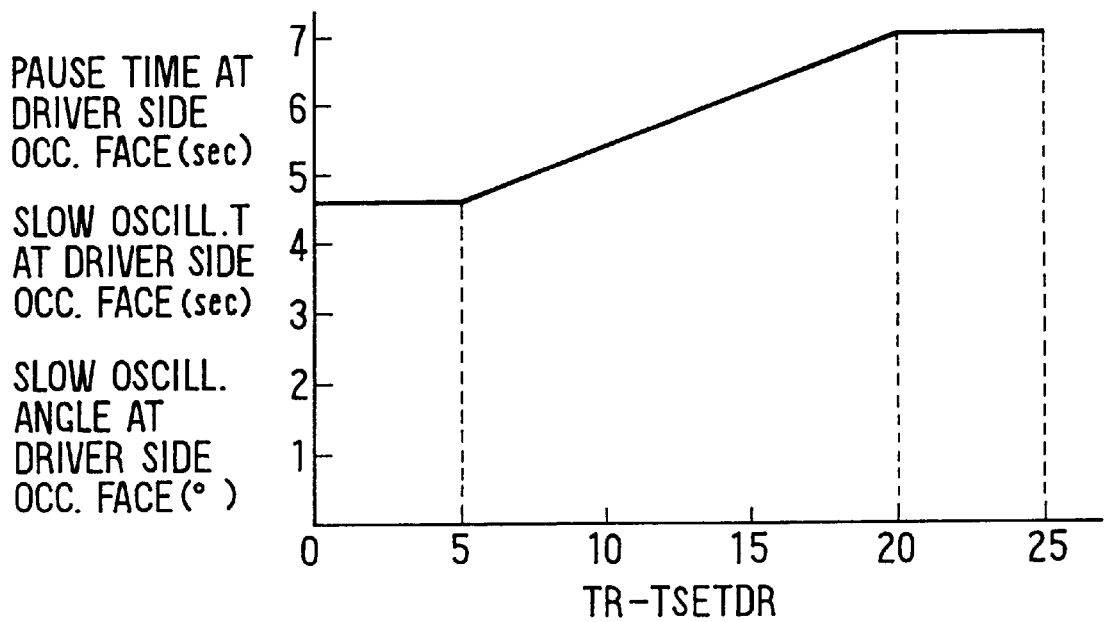
FIG. 31A is a characteristic diagram showing driver side occupant face pause time vs. difference between passenger compartment temperature and set temperature.
Figure 31B:
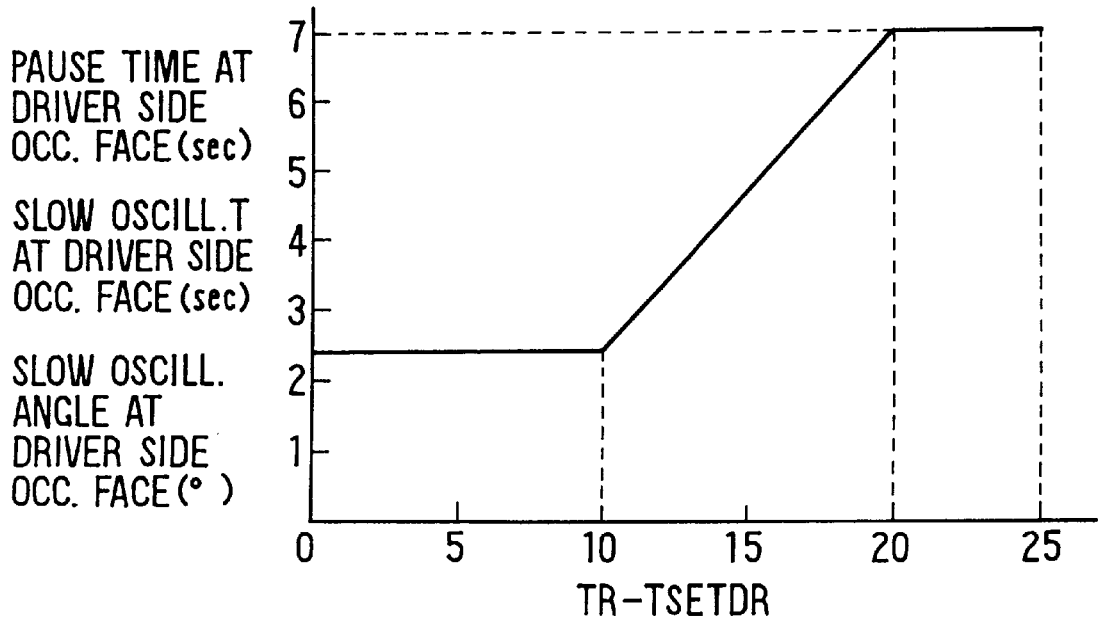
FIG. 31B is a characteristic diagram showing passenger side occupant face pause time vs. difference between passenger compartment temperature and set temperature, according to the first preferred embodiment.

FIG. 31A is a characteristic diagram showing a relationship between the difference between the passenger compartment temperature and the set temperature and the driver side occupant face pause time, and FIG. 31B is a characteristic diagram showing a relationship between the difference between the passenger compartment temperature and the set temperature and the passenger side occupant face pause time. An example wherein the difference between the passenger compartment temperature in the initial stage of air-conditioning and the set temperature is below 25° is shown.

When the solar radiation left-right ratio (H) is 0.6 and it is inferred that solar radiation is striking the driver side, when the difference between the initial passenger compartment temperature and the set temperature (TR−TSETDR) is 20°, the driver side occupant face pause time may be set longer than the passenger side occupant face pause time. Although in FIGS. 31A and 31B driver side and passenger side occupant face pause times are explained, similar effects can be obtained by a time for which the swinging louvers oscillate slowly, or an angle (°) over which they oscillate slowly, by the driver side and passenger side occupant face directions being changed in accordance with the difference between the passenger compartment temperature and the set temperature.

Figure 32A:
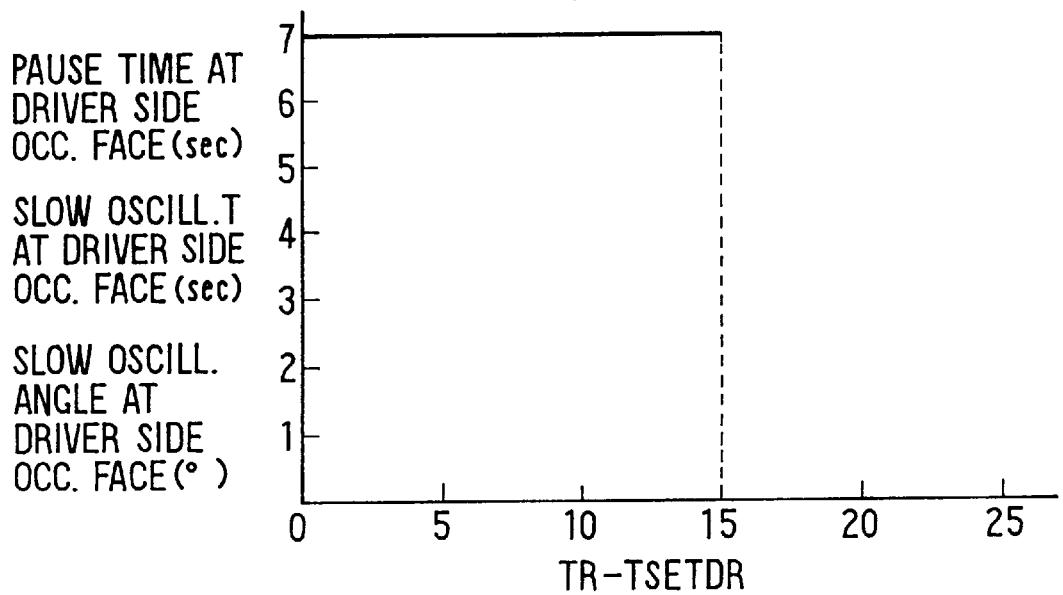
FIG. 32A is a characteristic diagram showing driver side occupant face pause time vs. difference between passenger compartment temperature and set temperature.
Figure 32B:
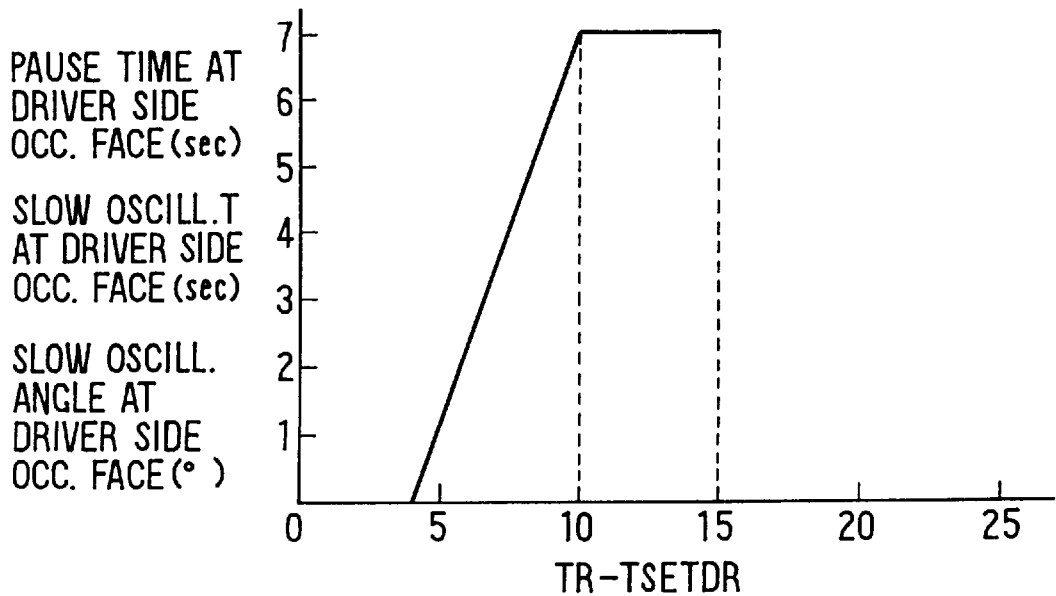
FIG. 32B is a characteristic diagram showing passenger side occupant face pause time vs. difference between passenger compartment temperature and set temperature, according to the first preferred embodiment.

FIG. 32A shows a relationship between the difference between the passenger compartment temperature and the set temperature and the driver side occupant face pause time, and FIG. 32B shows a relationship between the difference between the passenger compartment temperature and the set temperature and the passenger side occupant face pause time. An example wherein the difference between the passenger compartment temperature in the initial stage of air-conditioning and the set temperature is below 15° is shown.

When the solar radiation left-right ratio (H) is 0.6 and it is inferred that solar radiation is striking the driver side, when the difference between the initial passenger compartment temperature and the set temperature (TR−TSETDR) is 20°, the driver side occupant face pause time may be set longer than the passenger side occupant face pause time. Although in FIGS. 32A and 32B driver side and passenger side occupant face pause times are explained, similar effects can be obtained by a time for which the swinging louvers oscillate slowly, or an angle (°) over which they oscillate slowly, by the driver and passenger side occupant face directions being changed in accordance with the difference between the passenger compartment temperature and the set temperature.

Figure 33:
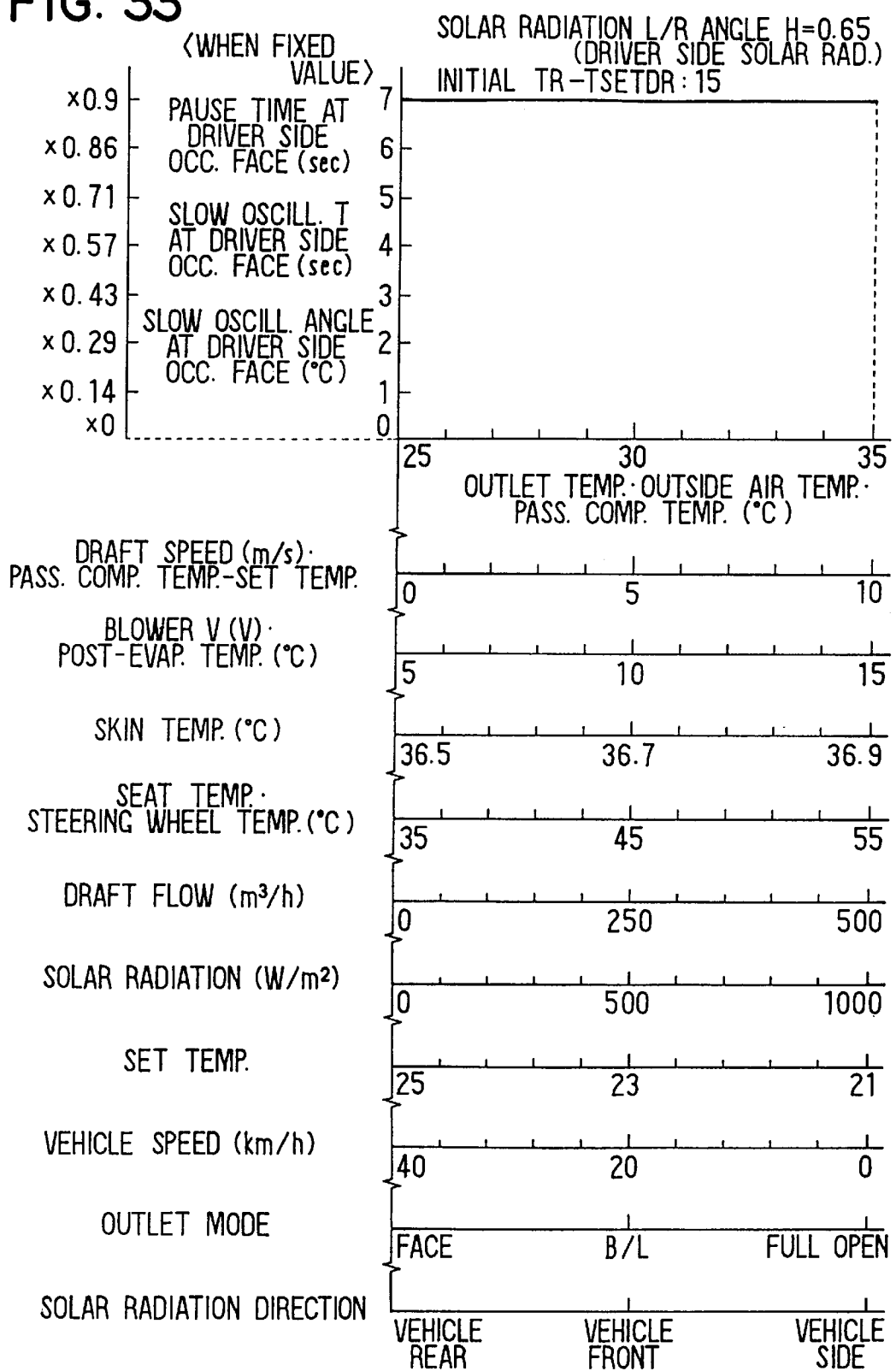
FIG. 33 is a characteristic diagram showing driver side occupant face pause time vs. air-conditioning load factors according to the first preferred embodiment.

In a control example of the kind shown in FIG. 33, during cooling, when the solar radiation left-right ratio (H) is 0.65 (driver side solar radiation) and the difference between the initial passenger compartment temperature and the set temperature (TR−TSETDR) is 15°, in the case of a fixed value of a driver side (front seat) occupant face pause time in the swing of the driver side center louvers 41, (45) or a time over which the louvers oscillate slowly at the driver side (front seat) occupant face or an angle (°) over which they oscillate slowly at the driver side (front seat) occupant face, or in a case wherein a fixed value of a random time is corrected (a correction coefficient to be multiplied by a fixed value), it may be made longer or larger for the passenger side (front seat) occupant face direction. For example it may be fixed at seven seconds or (×1.0).

Figure 34:
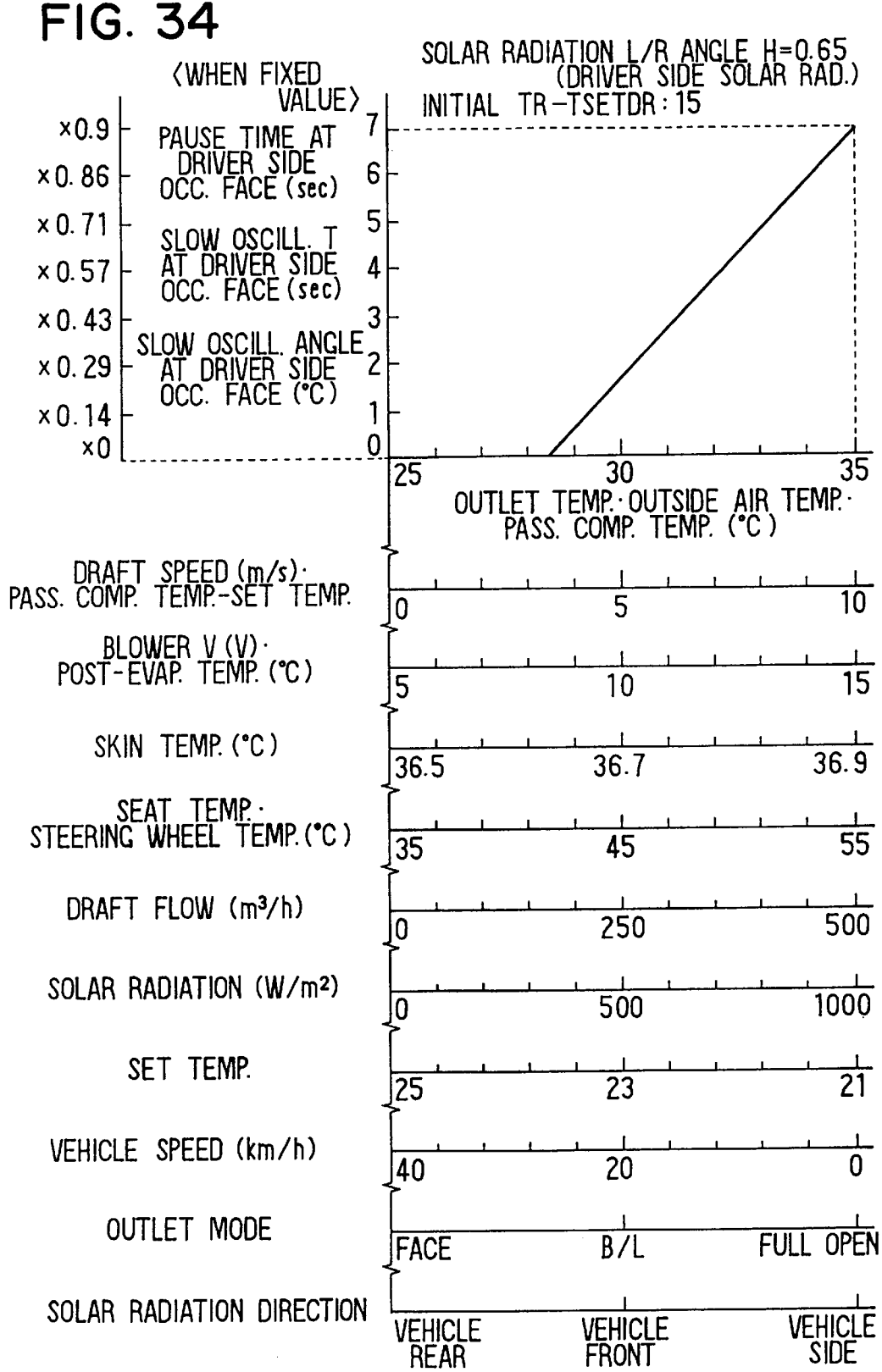
FIG. 34 is a characteristic diagram showing passenger side occupant face pause time vs. air-conditioning load factors according to the first preferred embodiment.

In a control example of the kind shown in FIG. 34, in the case of a fixed value of a passenger side (front seat) occupant face pause time in the swing of the passenger side center louvers 41, (45) or a time over which the louvers oscillate slowly at the passenger side (front seat) occupant face or an angle (°) over which they oscillate slowly at the passenger side (front seat) occupant face, or in a case wherein a fixed value of a random time is corrected (a correction coefficient to be multiplied by a fixed value), it may be made longer or larger corresponding to the amount of increase in the cooling load.

Figure 35:
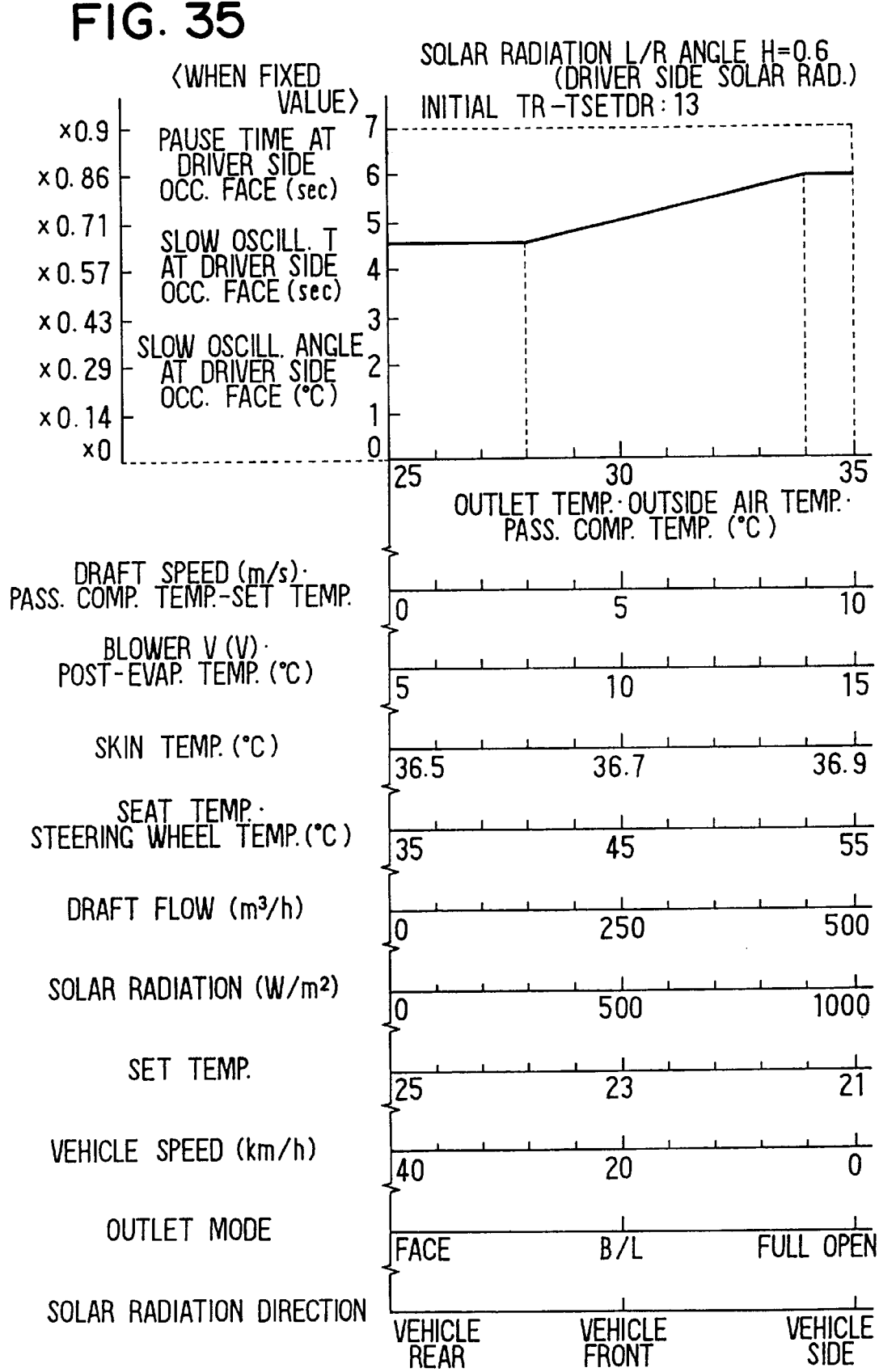
FIG. 35 is a characteristic diagram showing driver side occupant face pause time vs. air-conditioning load factors according to the first preferred embodiment.

In a control example of the kind shown in FIG. 35, during cooling, when the solar radiation left-right ratio (H) is 0.6 (driver side solar radiation) and the difference between the initial passenger compartment temperature and the set temperature (TR−TSETDR) is 13°, in the case of a fixed value of a driver side (front seat) occupant face pause time in the swing of the driver side center louvers 41, (45) or a time over which the louvers oscillate slowly at the driver side (front seat) occupant face or an angle (°) over which they oscillate slowly at the driver side (front seat) occupant face, or in a case wherein a fixed value of a random time is corrected (a correction coefficient to be multiplied by a fixed value), it may be made longer or larger than for the passenger side (front seat) occupant face direction corresponding to the amount of increase in the cooling load.

Figure 36:
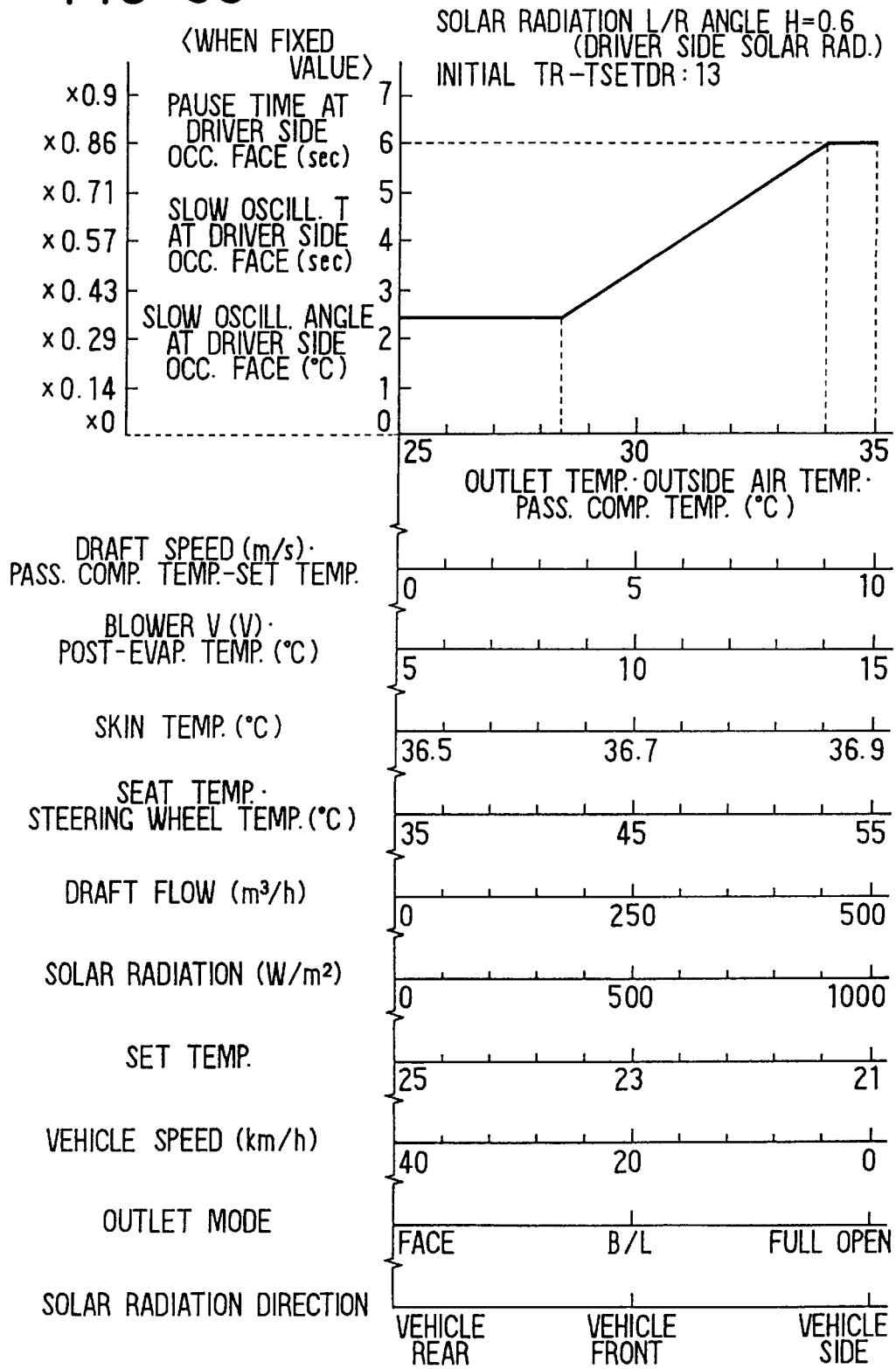
FIG. 36 is a characteristic diagram showing passenger side occupant face pause time vs. air-conditioning load factors according to the first preferred embodiment.

In a control example of the kind shown in FIG. 36, at this time, in the case of a fixed value of a passenger side (front seat) occupant face pause time in the swing of the passenger side center louvers 41, (45) or a time over which the louvers oscillate slowly at the passenger side (front seat) occupant face or an angle (°) over which they oscillate slowly at the passenger side (front seat) occupant face, or in a case wherein a fixed value of a random time is corrected (a correction coefficient to be multiplied by a fixed value), it may be made longer or larger corresponding to an increase in the cooling load.

Figure 37:
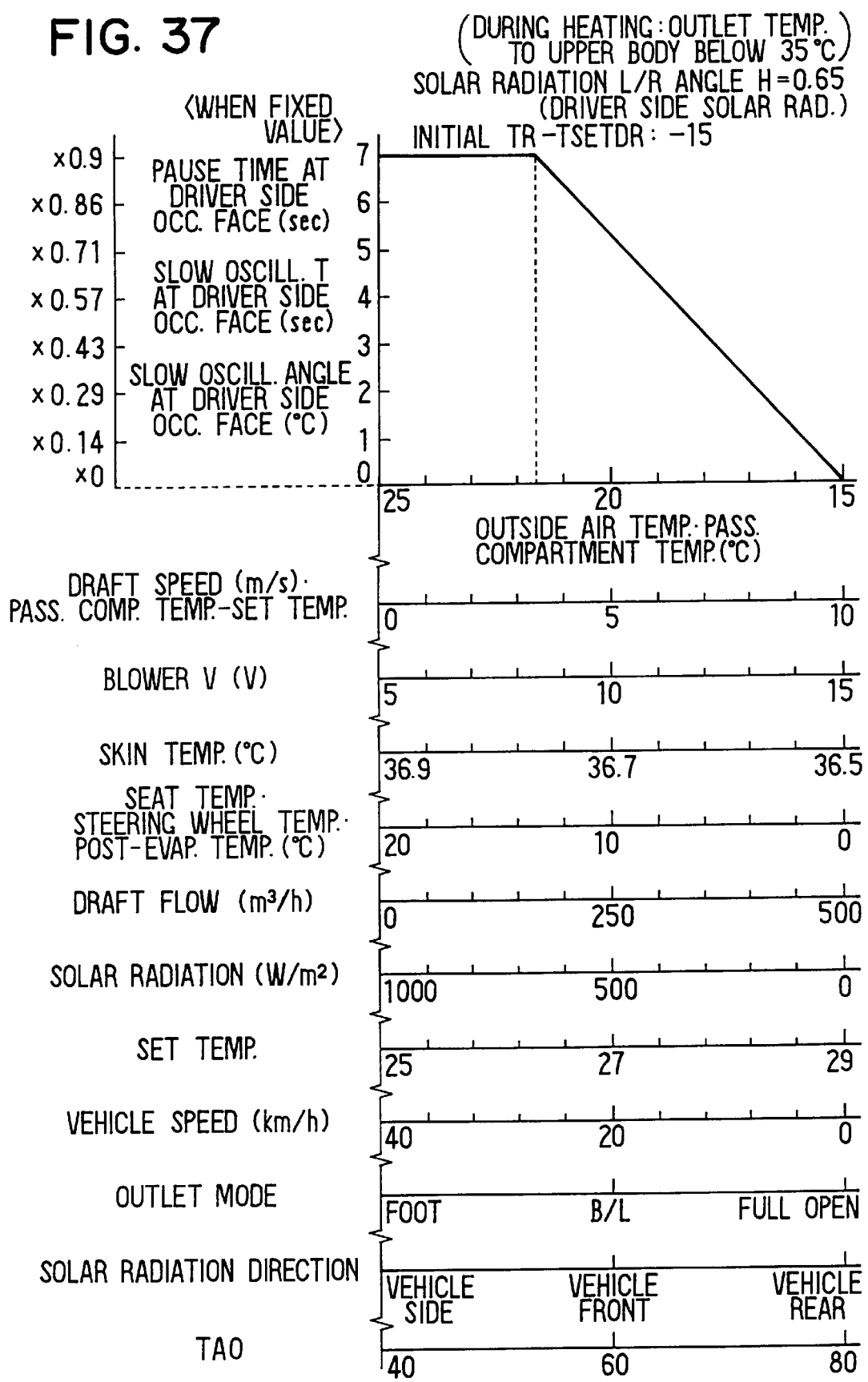
FIG. 37 is a characteristic diagram showing driver side occupant face pause time vs. air-conditioning load factors according to the first preferred embodiment.

In a control example of the kind shown in FIG. 37, during heating (with the outlet temperature to occupant upper bodies being below 35° C.), when the solar radiation left-right ratio (H) is 0.65 (driver side solar radiation) and the difference between the initial passenger compartment temperature and the set temperature (TR−TSETDR) is −15°, in the case of a fixed value of a driver side (front seat) occupant face pause time in the swing of the driver side center louvers 41, (45) or a time over which the louvers oscillate slowly at the driver side (front seat) occupant face or an angle (°) over which they oscillate slowly at the driver side (front seat) occupant face, or in a case wherein a fixed value of a random time is corrected (a correction coefficient to be multiplied by a fixed value), it may be made shorter or smaller than for the passenger side (front seat) occupant face direction corresponding to the amount of increase in the heating load.

Figure 38:
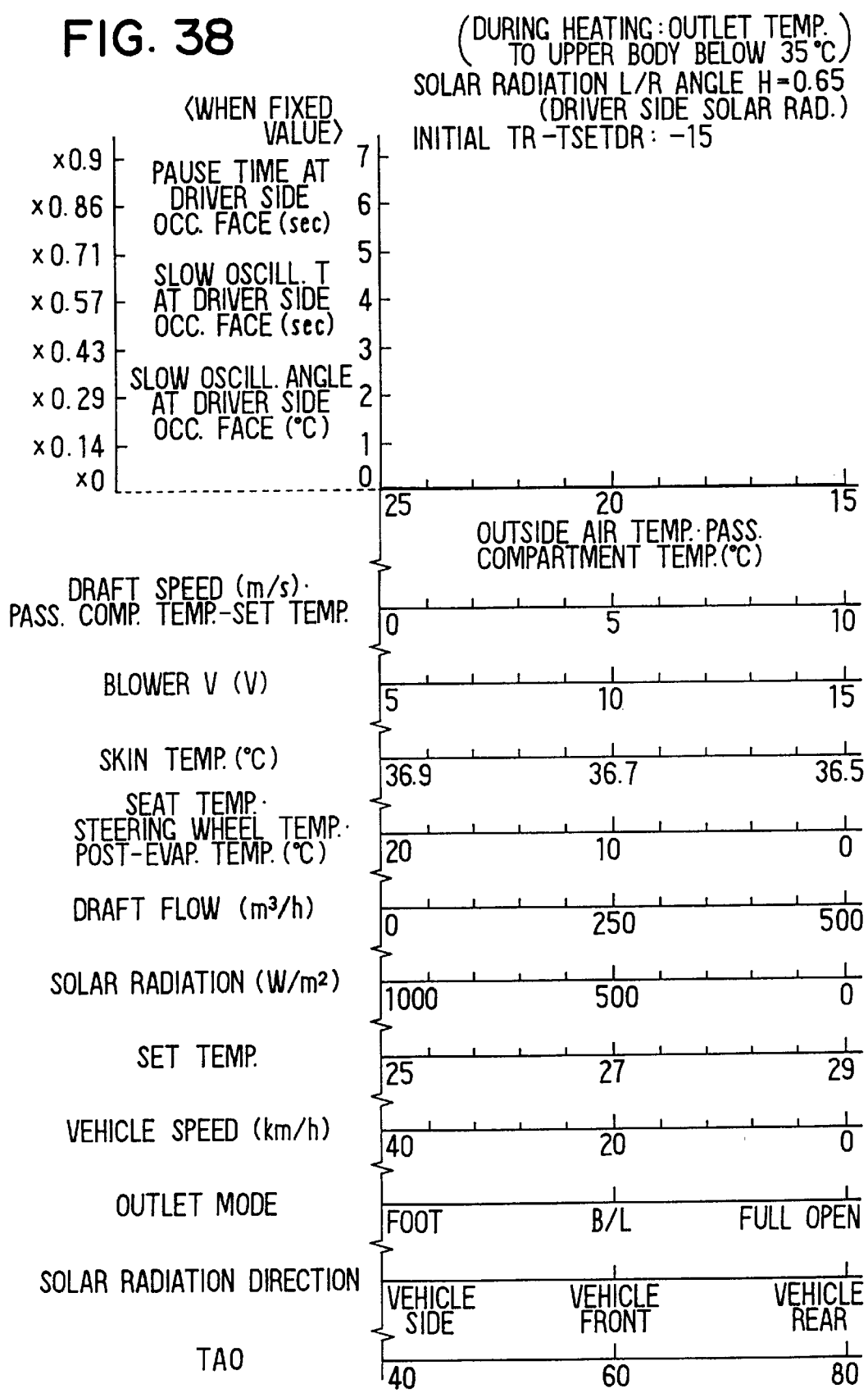
FIG. 38 is a characteristic diagram showing passenger side occupant face pause time vs. air-conditioning load factors according to the first preferred embodiment.

In a control example of the kind shown in FIG. 38, at this time, in the case of a fixed value of a passenger side (front seat) occupant face pause time in the swing of the passenger side center louvers 41, (45) or a time over which the louvers oscillate slowly at the passenger side (front seat) occupant face or an angle (°) over which they oscillate slowly at the passenger side (front seat) occupant face, or in a case wherein a fixed value of a random time is corrected, it may be fixed at zero seconds or (×0).

Figure 39:
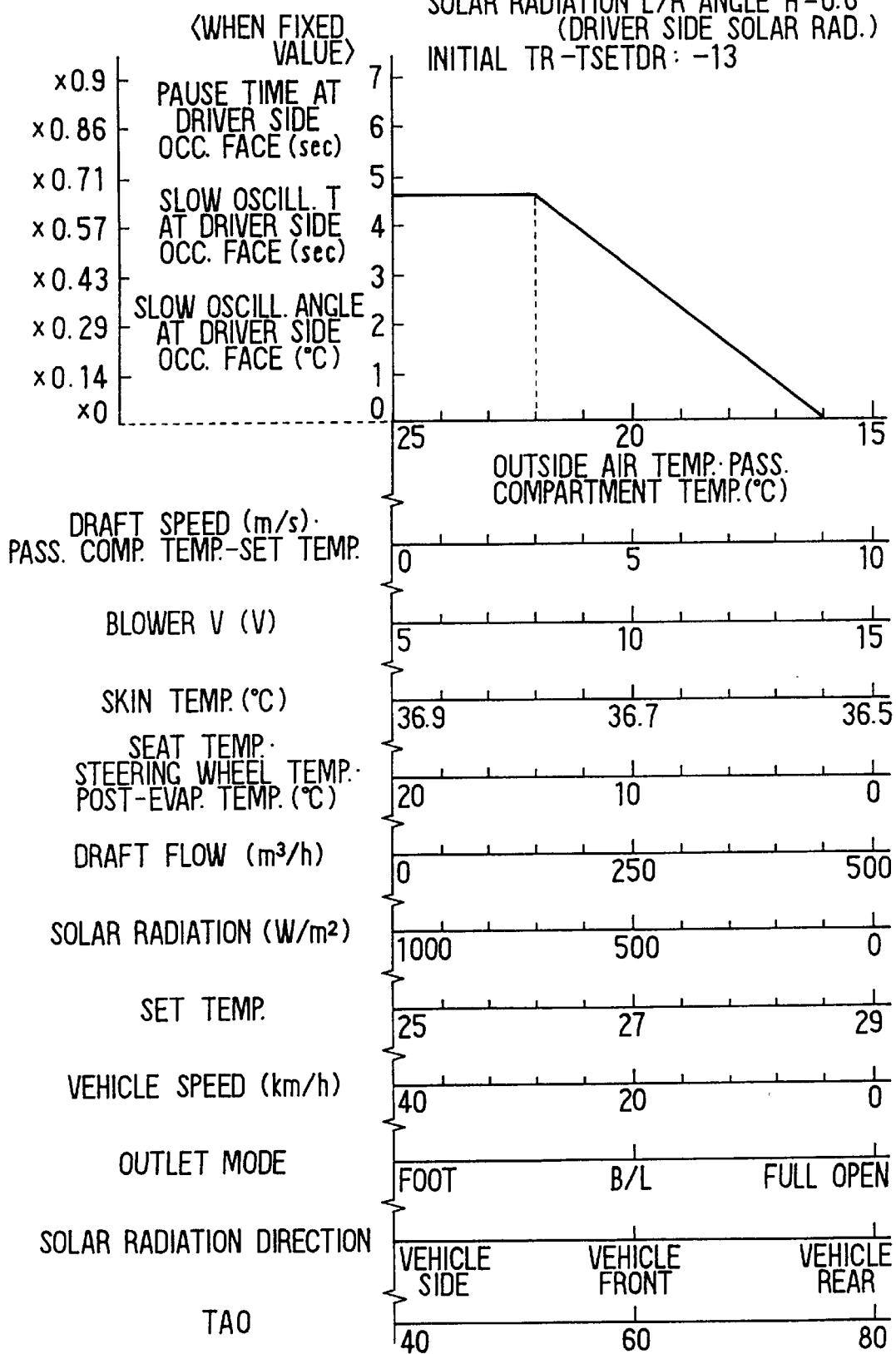
FIG. 39 is a characteristic diagram showing driver side occupant face pause time vs. air-conditioning load factors according to the first preferred embodiment.

In a control example of the kind shown in FIG. 39, during heating (with the outlet temperature to occupant upper bodies being below 35° C.), when the solar radiation left-right ratio (H) is 0.6 (driver side solar radiation) and the difference between the initial passenger compartment temperature and the set temperature (TR−TSETDR) is −13°, in the case of a fixed value of a driver side (front seat) occupant face pause time in the swing of the driver side center louvers 41, (45) or a time over which the louvers oscillate slowly at the driver side (front seat) occupant face or an angle (°) over which they oscillate slowly at the driver side (front seat) occupant face, or in a case wherein a fixed value of a random time is corrected (a correction coefficient to be multiplied by a fixed value), it may be made shorter or smaller than for the passenger side (front seat) occupant face direction corresponding to the amount of increase in the heating load.

Figure 40:
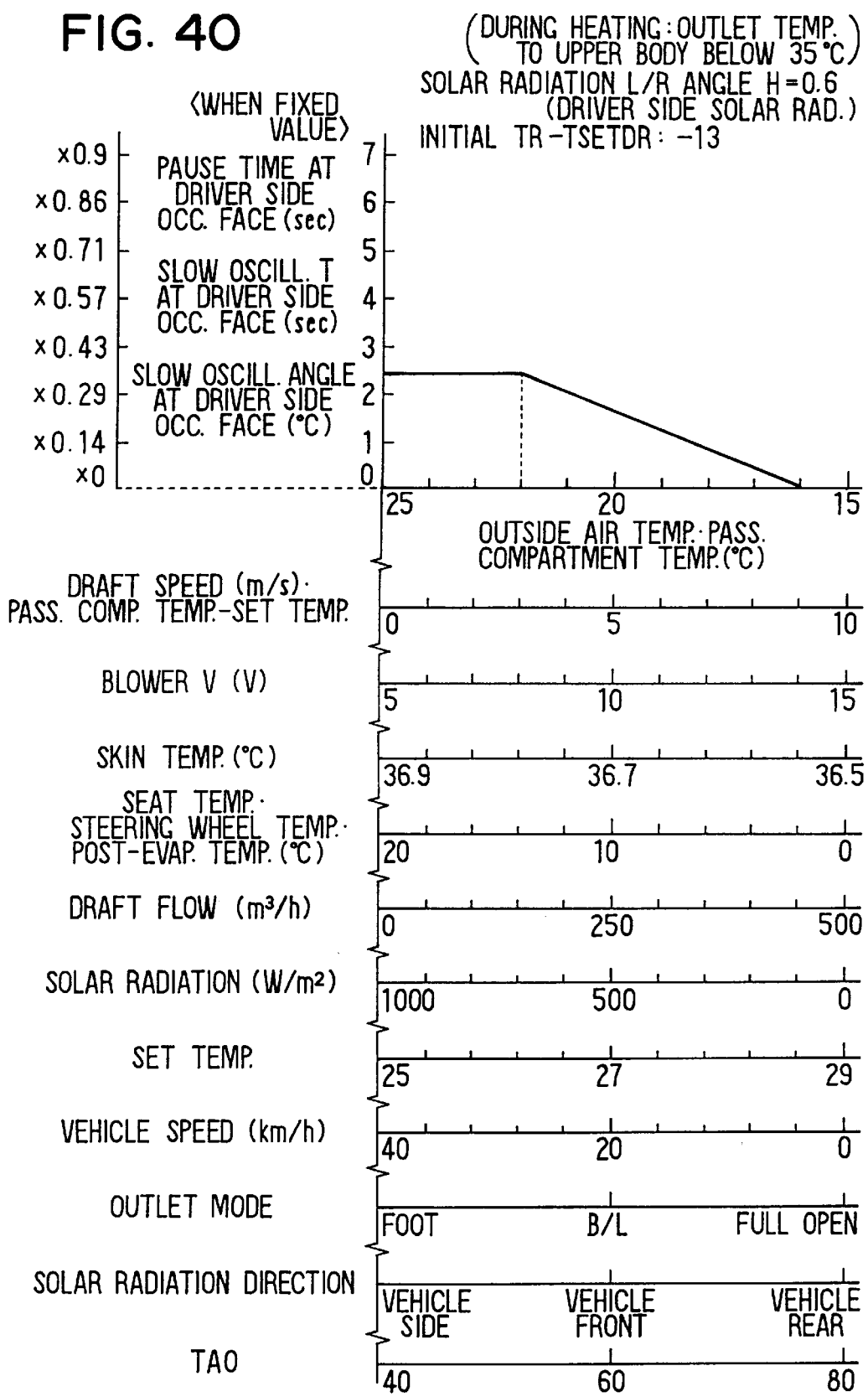
FIG. 40 is a characteristic diagram showing passenger side occupant face pause time vs. air-conditioning load factors according to the first preferred embodiment.

In a control example of the kind shown in FIG. 40, at this time, in the case of a fixed value of a passenger side (front seat) occupant face pause time in the swing of the passenger side center louvers 41, (45) or a time over which the louvers oscillate slowly at the passenger side (front seat) occupant face or an angle (°) over which they oscillate slowly at the passenger side (front seat) occupant face, or in a case wherein a fixed value of a random time is corrected, it may be made shorter or smaller corresponding to the increase in the heating load.

Figure 41:
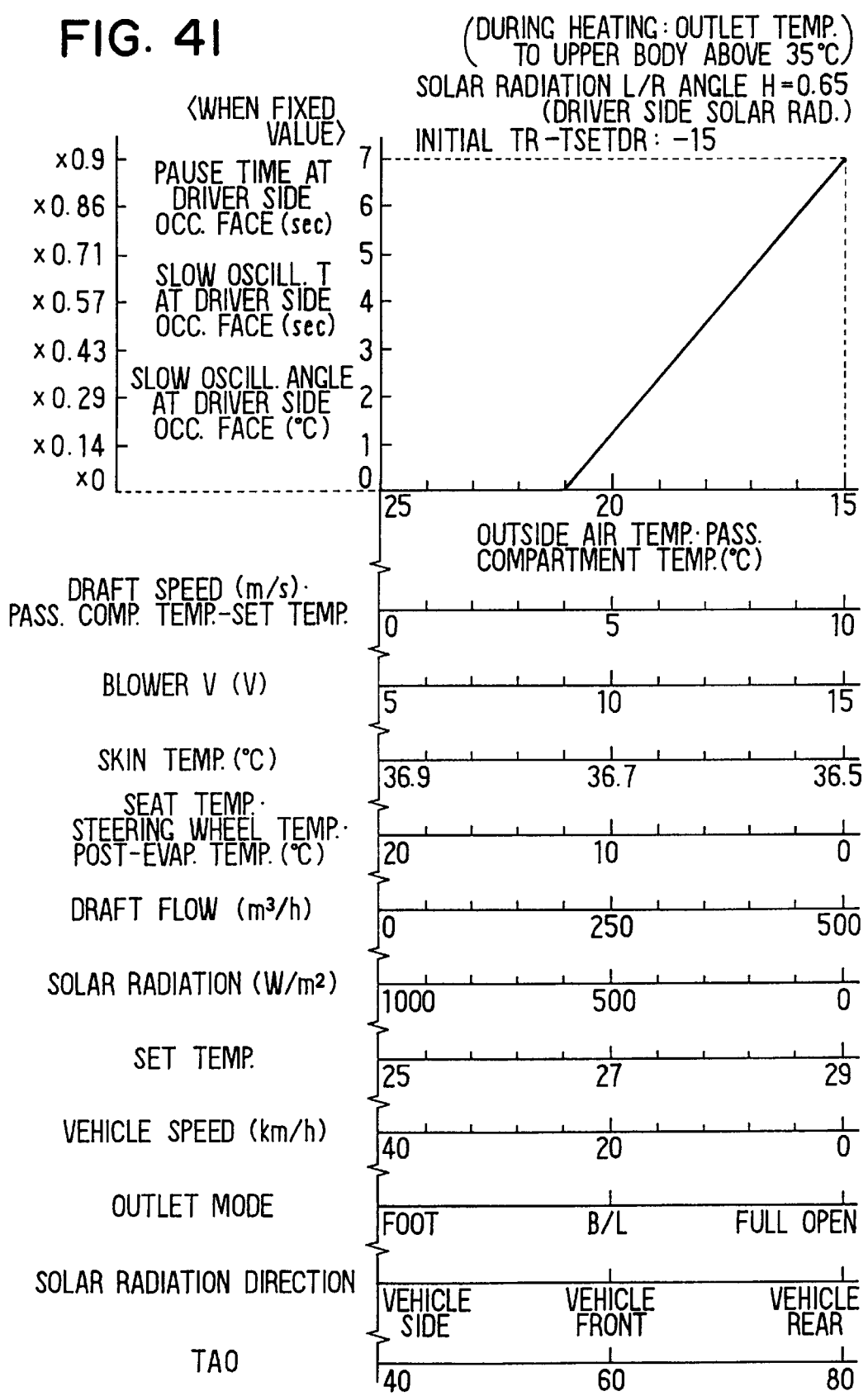
FIG. 41 is a characteristic diagram showing driver side occupant face pause time vs. air-conditioning load factors according to the first preferred embodiment.

In a control example of the kind shown in FIG. 41, during heating (with the outlet temperature to occupant upper bodies being above 35° C.), when the solar radiation left-right ratio (H) is 0.65 (driver side solar radiation) and the difference between the initial passenger compartment temperature and the set temperature (TR−TSETDR) is −15°, in the case of a fixed value of a driver side (front seat) occupant face pause time in the swing of the driver side center louvers 41, (45) or a time over which the louvers oscillate slowly at the driver side (front seat) occupant face or an angle (°) over which they oscillate slowly at the driver side (front seat) occupant face, or in a case wherein a fixed value of a random time is corrected, it may be made shorter or smaller than for the passenger side (front seat) occupant face direction corresponding to the amount of increase in the heating load.

Figure 42:
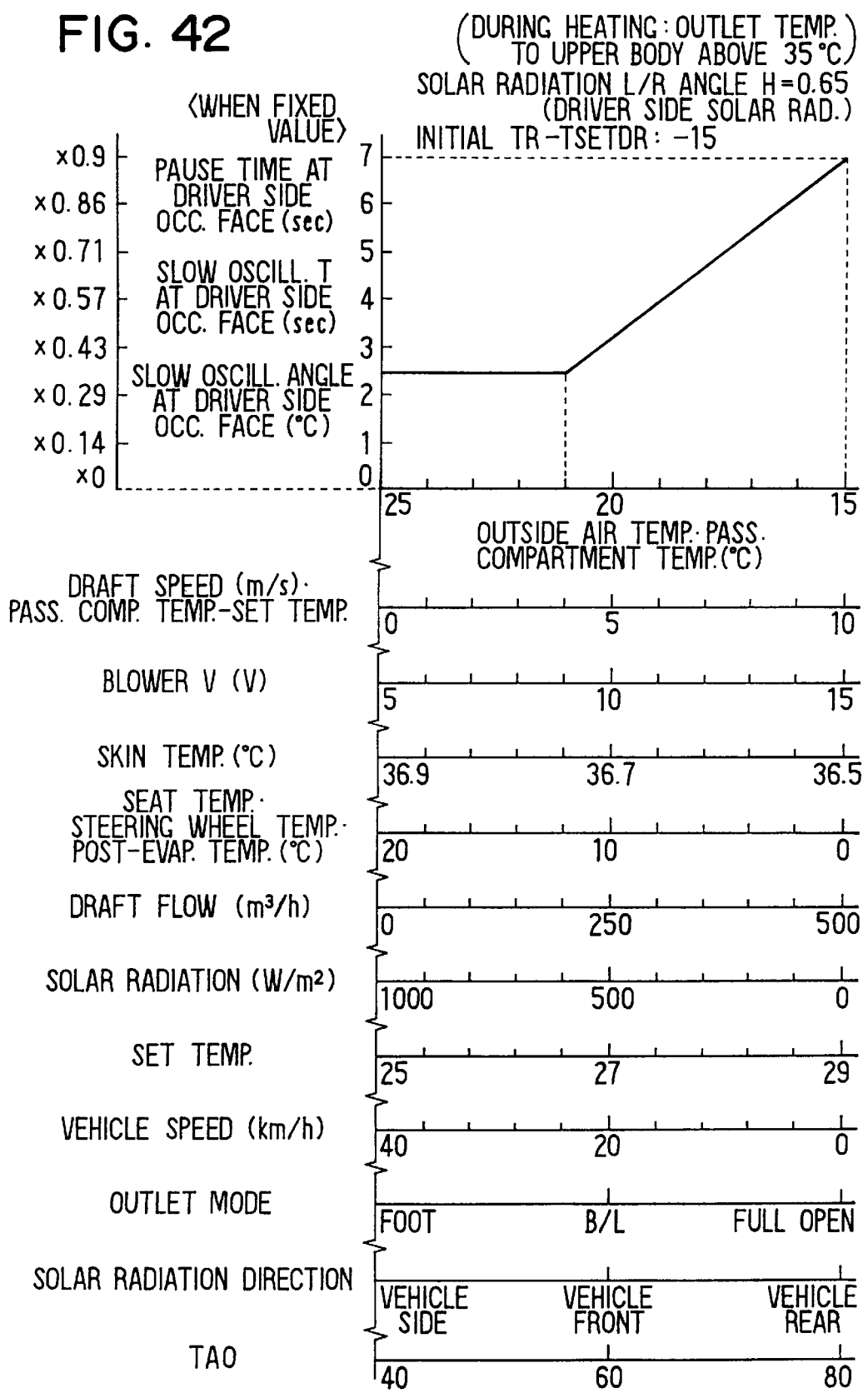
FIG. 42 is a characteristic diagram showing passenger side occupant face pause time vs. air-conditioning load factors according to the first preferred embodiment.

In a control example of the kind shown in FIG. 42, at this time, in the case of a fixed value of a passenger side (front seat) occupant face pause time in the swing of the passenger side center louvers 41, (45) or a time over which the louvers oscillate slowly at the passenger side (front seat) occupant face or an angle (°) over which they oscillate slowly at the passenger side (front seat) occupant face, or in a case wherein a fixed value of a random time is corrected (a correction coefficient to be multiplied by a fixed value), it may be made shorter or smaller corresponding to the amount of increase in the heating load.

Figure 43:
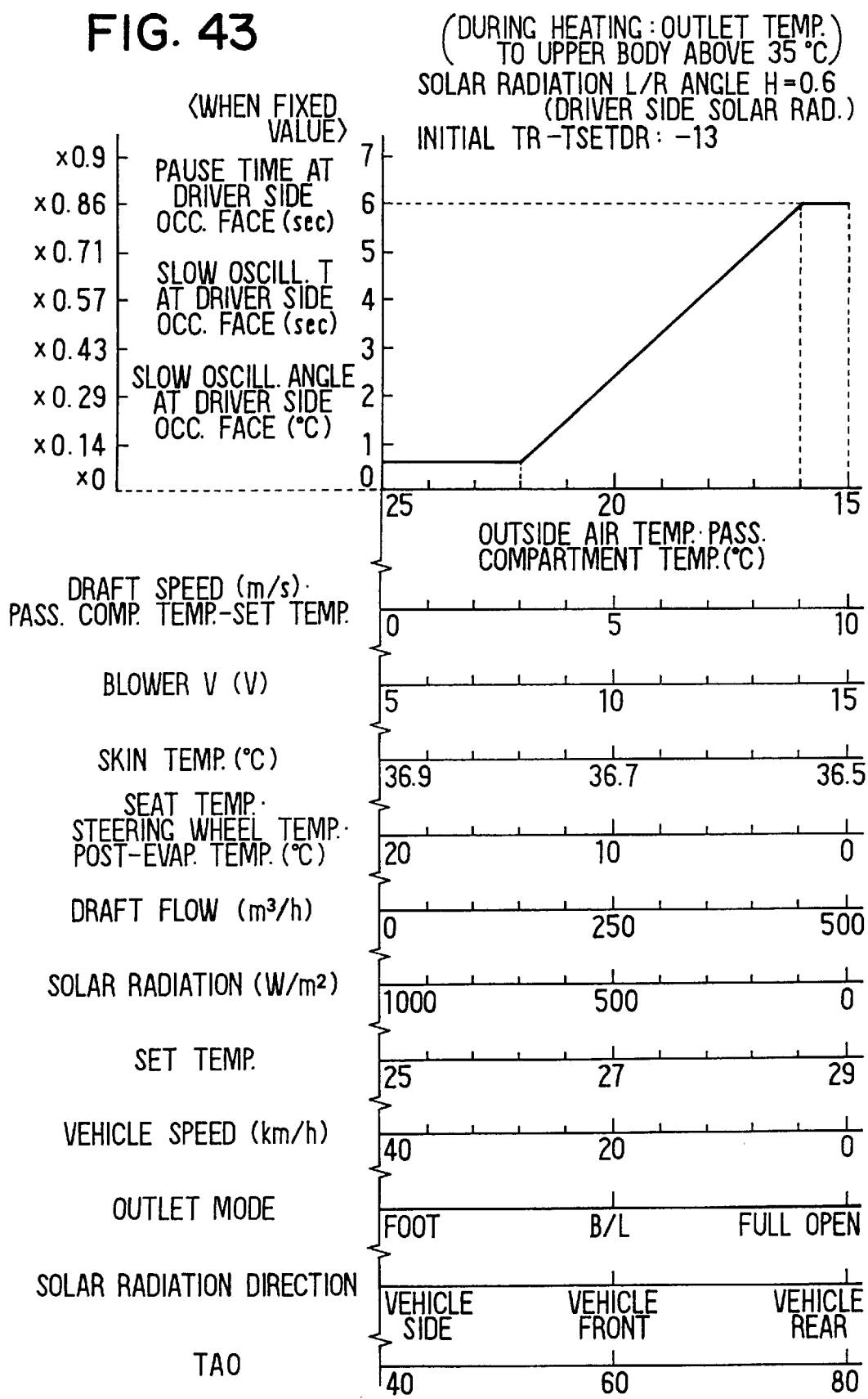
FIG. 43 is a characteristic diagram showing driver side occupant face pause time vs. air-conditioning load factors according to the first preferred embodiment.

In a control example of the kind shown in FIG. 43, during heating (with the outlet temperature to occupant upper bodies being above 35° C.), when the solar radiation left-right ratio (H) is 0.65 (driver side solar radiation) and the difference between the initial passenger compartment temperature and the set temperature (TR−TSETDR) is −13°, in the case of a fixed value of a driver side (front seat) occupant face pause time in the swing of the driver side center louvers 41, (45) or a time over which the louvers oscillate slowly at the driver side (front seat) occupant face or an angle (°) over which they oscillate slowly at the driver side (front seat) occupant face, or in a case wherein a fixed value of a random time is corrected (a correction coefficient to be multiplied by a fixed value), it may be made shorter or smaller than for the passenger side (front seat) occupant face direction corresponding to the amount of increase in the heating load.

Figure 44:
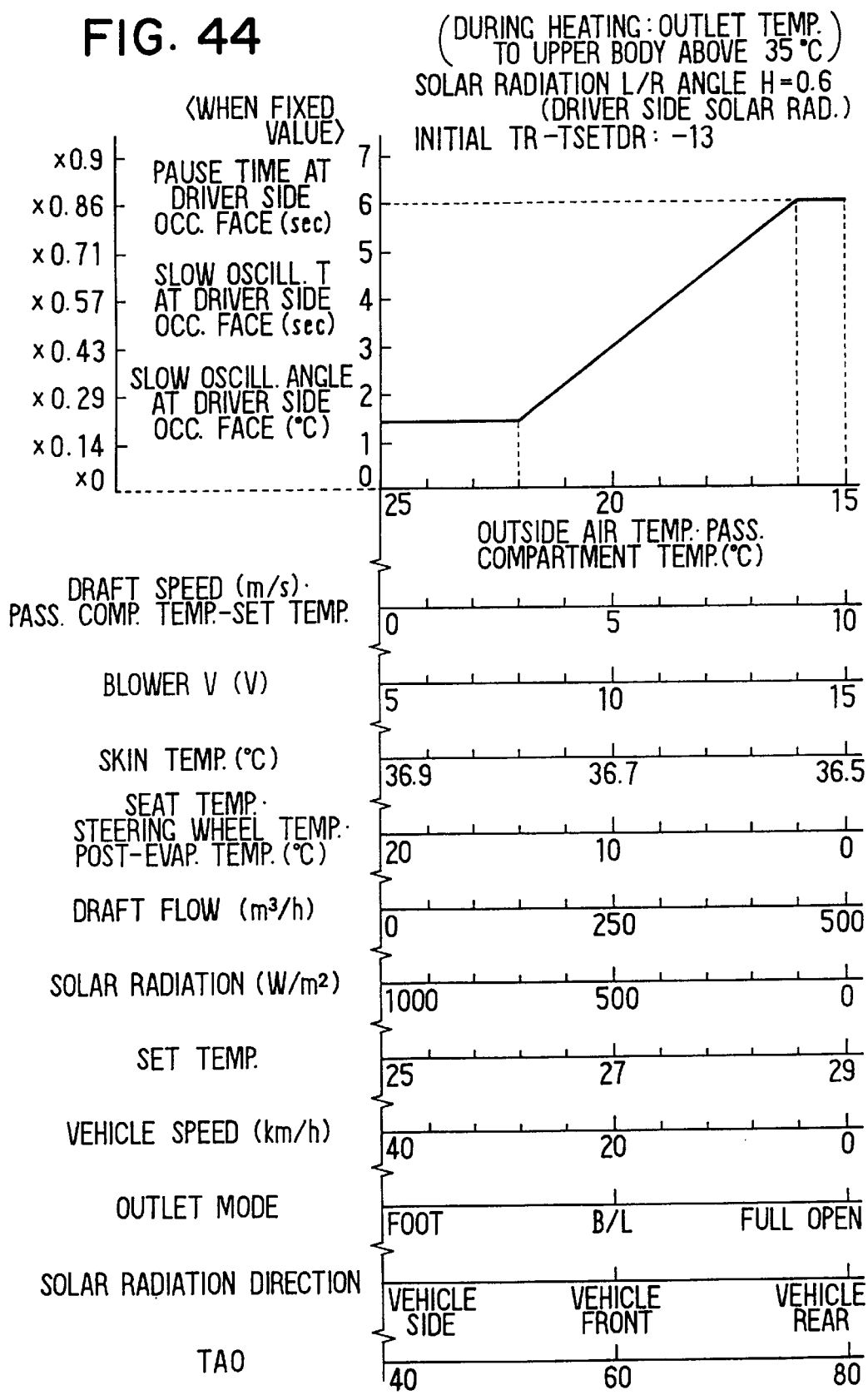
FIG. 44 is a characteristic diagram showing passenger side occupant face pause time vs. air-conditioning load factors according to the first preferred embodiment.

In a control example of the kind shown in FIG. 44, at this time, in the case of a fixed value of a passenger side (front seat) occupant face pause time in the swing of the passenger side center louvers 41, (45) or a time over which the louvers oscillate slowly at the passenger side (front seat) occupant face or an angle (°) over which they oscillate slowly at the passenger side (front seat) occupant face, or in a case wherein a fixed value of a random time is corrected (a correction coefficient to be multiplied by a fixed value), it may be made shorter or smaller corresponding to the increase in the heating load.

Second Preferred Embodiment

Figure 45A:
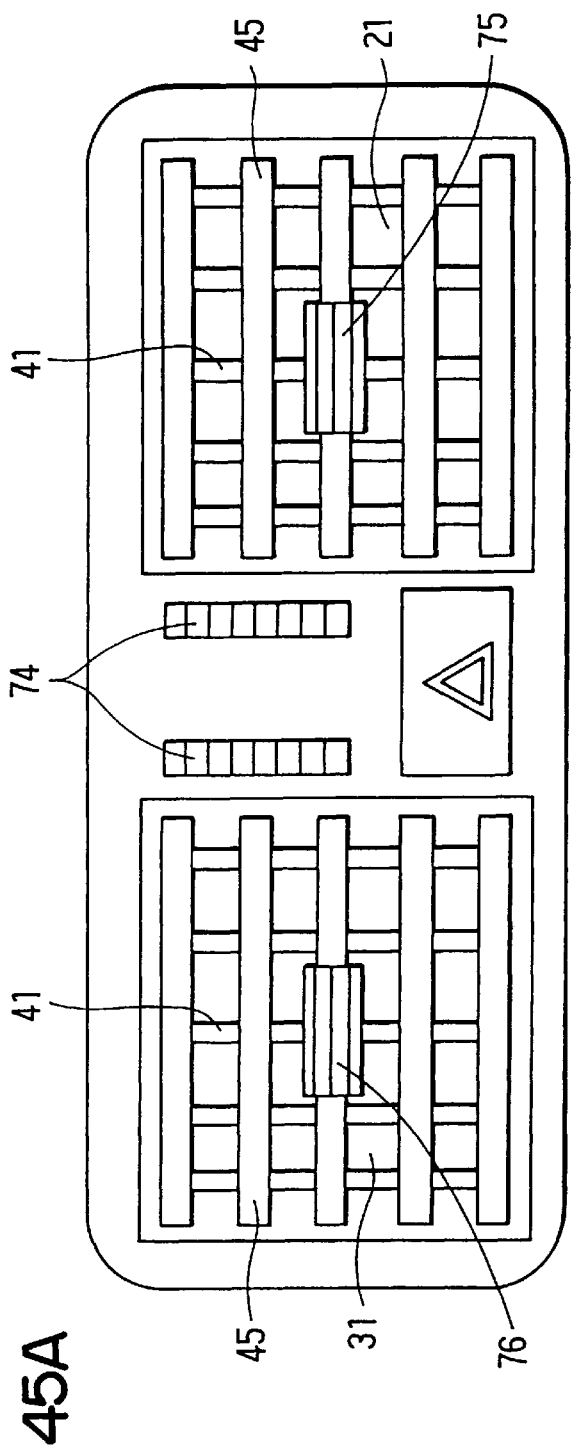
FIG. 45 is a front view of an air-conditioning operating panel according to a second preferred embodiment of the present invention.
Figure 45B:
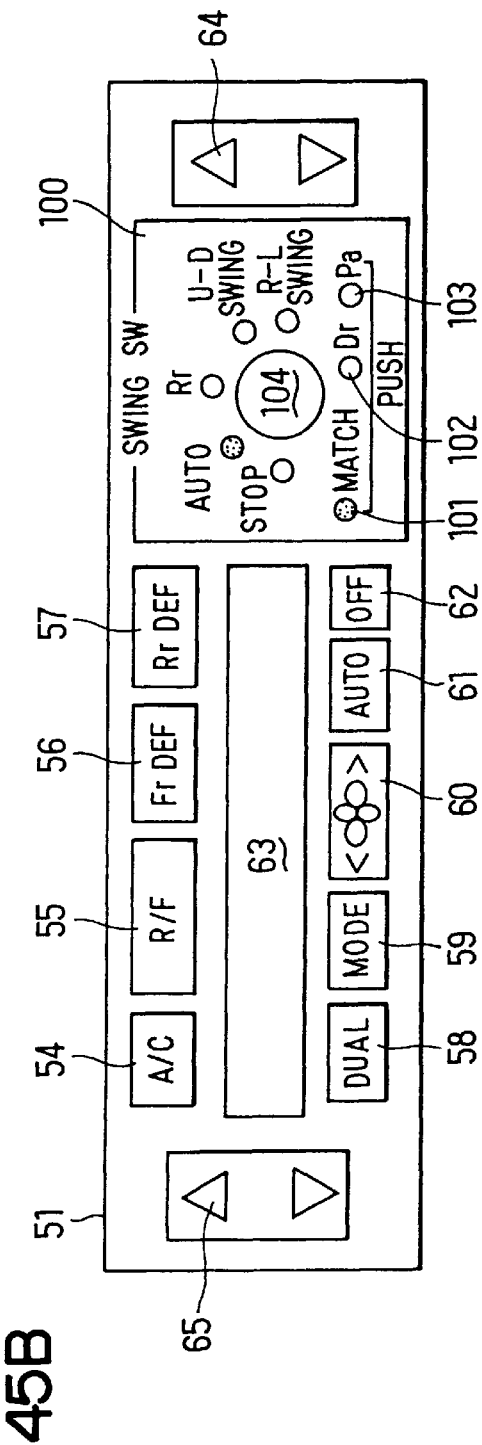

FIG. 45 is a view showing an air-conditioning operating panel of a second preferred embodiment of the present invention. In this preferred embodiment, a louver control (SWING SW) panel 100 for controlling the blowout state of conditioned air blown from the FACE outlets 21, 22, 31, 32 (the swing states of the center and side louvers 41, 45) in the driver side air-conditioning zone, and the passenger side air-conditioning zone is provided integrally with the air-conditioning operating panel 51. This louver control panel 100 is made up of a MATCH switch 101, a Dr switch 102, a Pa switch 103 and a swing mode switching switch 104. The swing mode switching switch 104, like the swing mode switching switches 69, 73 of the first preferred embodiment, is a rotary switch having the switching positions of 'STOP' (stop swing), 'AUTO' (auto swing), 'Rr', 'U-D SWING' (up-down direction swing), and 'R-L SWING' (left-right direction swing).

The MATCH switch 101, the Dr switch 102 and the Pa switch 103 are push switches having a normal position (OFF) and a pushed-in position (ON). When the MATCH switch 101 is turned ON, it generates an output causing at least one or the other of the driver side and passenger side center and side louvers 41, 45 to oscillate. When the Dr switch 102 is turned ON, it generates an output causing at least one or the other of the driver side center and side louvers 41, 45 to oscillate. When the Pa switch 103 is turned ON, it generates an output causing at least one or the other of the passenger side center and side louvers 41, 45 to swing.

Third Preferred Embodiment

Figure 46:
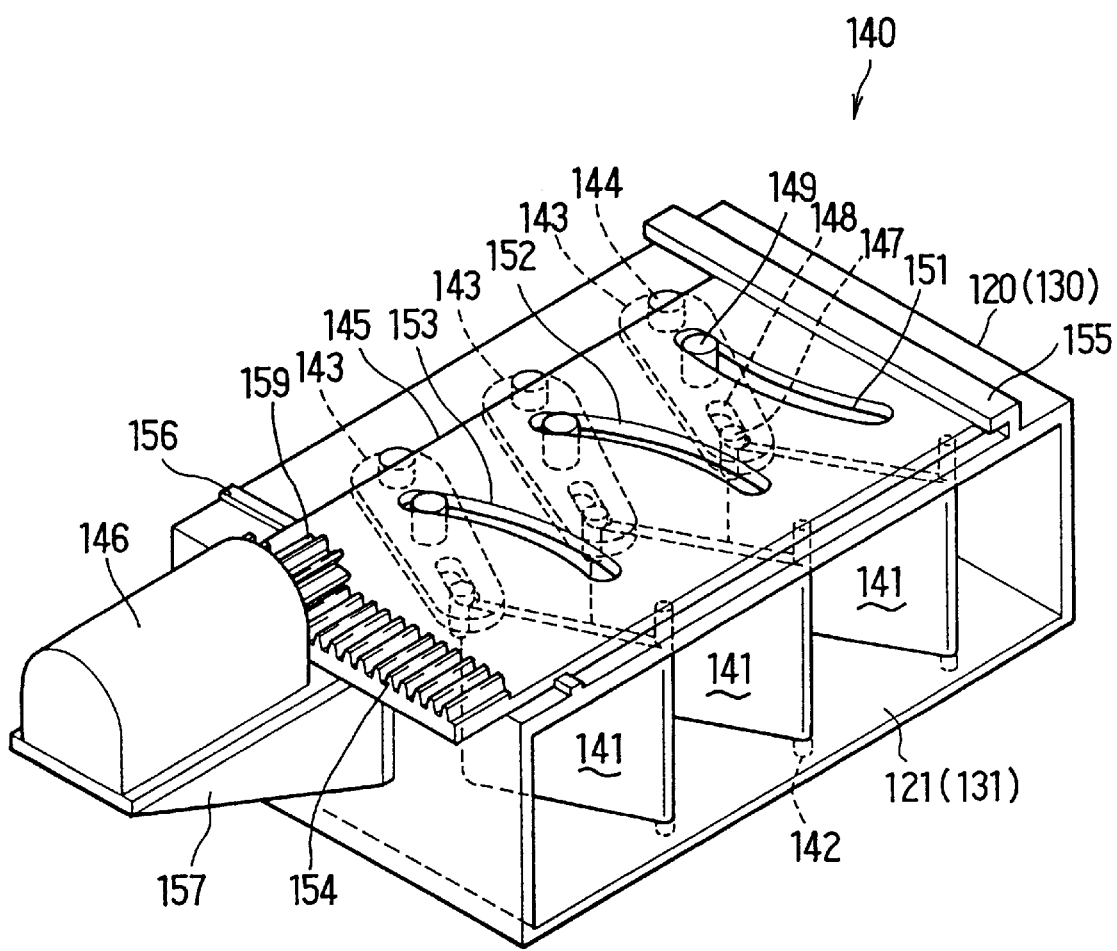
FIG. 46 is a perspective view showing the construction of a louver left-right direction oscillating mechanism according to a third preferred embodiment of the present invention.

FIGS. 46 and 47 show a third preferred embodiment of the invention. A louver left-right direction oscillating mechanism 140 of this preferred embodiment is disposed in each of concentration/dispersion swing grills 120, 130 forming center and side FACE outlets 121, 131. This louver left-right direction oscillating mechanism 140 is made up of a plurality of (in this example, first through third) louvers 141 rotatably mounted in the left-right direction in the concentration/dispersion swing grills 120, 130, a plurality of (in this example, first through third) link plates 143 for making these first through third louvers 141 swing about pivotal support points 142 thereof in the left-right direction over a predetermined swing range, a flat plate 145 for rotating these first through third link plates 143 about pivotal support points 144 thereof, and a louver motor 146 to serve as louver driving means (an actuator) for making this flat plate 145 move back and forth in the front-rear direction of the vehicle.

In each of the first through third link plates 143 is formed an oval mating hole 148 which mates with a cylindrical pin 147 provided on the top end face of each of the first through third louvers 141. The flat plate 145 is provided with first through third mating holes 151–153 for mating with cylindrical pins 149 provided on the upper faces of the link plates 143, and a rack 154 formed on the louver motor 146 end of its upper face. The order of formation of the first through third mating holes 151–153 is opposite in the concentration/dispersion swing grill 130 from that which it is in the concentration/dispersion swing grill 120. The flat plate 145 is guided by a guide 155 and a rail 156 provided on an outer face of the respective concentration/dispersion swing grill 120 or 130 and is slidable in the front-rear direction of the vehicle on that outer face. The louver motor 146 is mounted on a mounting bracket 157 attached to another outer face of the concentration/dispersion swing grill 120, 130. A pinion 159 mating with the rack 154 is fitted to the output shaft of the louver motor 146.

Figure 47A:
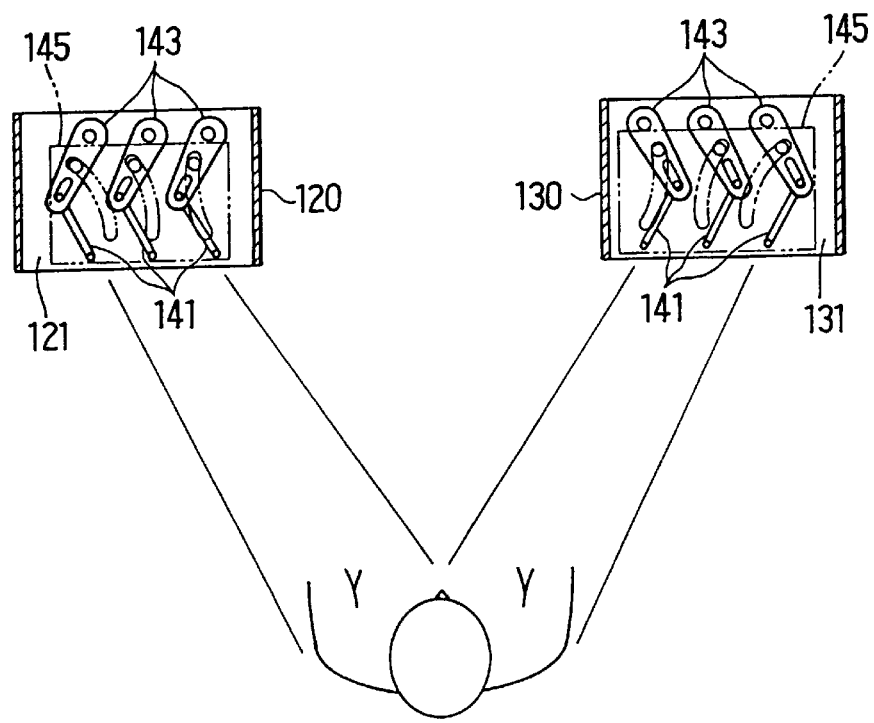
FIG. 47A is an explanatory view showing a blowout state from concentration/dispersion swing grills in a spot blowout mode.

In this preferred embodiment, when the louver motors 146 are operated in a forward rotation direction, the flat plates 145 are brought to their most rearward positions (nearest to the occupant) on the outer faces of the concentration/dispersion swing grills 120 and 130, as shown in FIG. 47A. Then, the first through third louvers 141 point in the direction of the occupant, and a spot blowout mode wherein conditioned air blown from the concentration/dispersion swing grills 120, 130 is blown locally onto the head and chest of the occupant in the air-conditioning zone is thereby set.

Figure 47B:
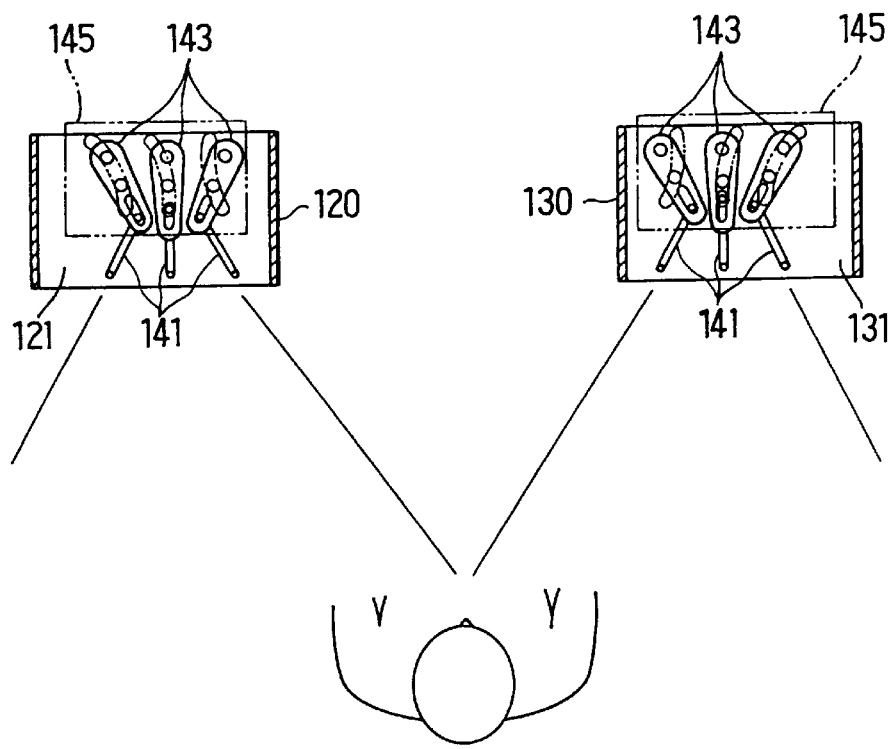
FIG. 47B is an explanatory view showing a blowout state from concentration-dispersion swing grills in a wide blowout mode according to the third preferred embodiment.

When the louver motors 146 are operated in the opposite direction, the flat plates 145 are brought to their most forward positions (farthest from the occupant) on the outer faces of the concentration/dispersion swing grills 120, 130, as shown in FIG. 47B. As a result, the first louvers 141 point in directions avoiding the occupant, the second louvers 141 point in a central direction, and the third louvers 141 point in the direction of the occupant, and a wide outlet mode wherein conditioned air blown from the concentration/dispersion swing grills 120, 130 are blown dispersedly into the air-conditioning zone is thus set. By forward and reverse rotation of the louver motors 146 being repeated, the first through third louvers 141 are made to oscillate (swing) about their pivotal support points.

In this preferred embodiment, as the passenger compartment temperature (TR) increases, the first through third louvers 141 are paused for a longer period of time, or move slowly, with the conditioned air blown from the concentration/dispersion swing grills 120, 130 thereby being concentrated on the head and chest of the occupant in the air-conditioning zone. When solar radiation is incident from the right of the occupant, that is, when solar radiation is incident upon the right side of the occupant, the first through third louvers 141 of the right side concentration/dispersion swing grill 130 stop or move slowly to blow conditioned air in a more concentrated state to the head and chest of the occupant, more than the first through third louvers 141 of the left side concentration/dispersion swing grill 120.

Conversely, when solar radiation is incident from the left of the occupant, that is, when solar radiation is striking the left side of the occupant, the first through third louvers 141 of the left side concentration/dispersion swing grill 120 stop or move slowly to blow conditioned air more in a concentrated state to the head and chest of the occupant, more than the first through third louvers 141 of the right side concentration/dispersion swing grill 130.

Fourth Preferred Embodiment

Figure 48A:
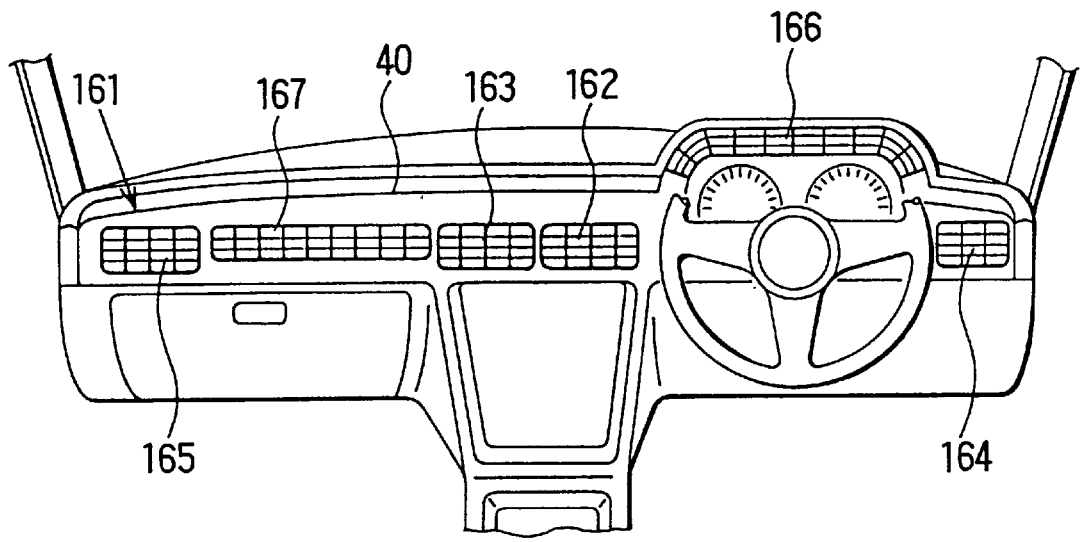
FIG. 48A is a front view of a vehicle instrument panel.
Figure 48B:
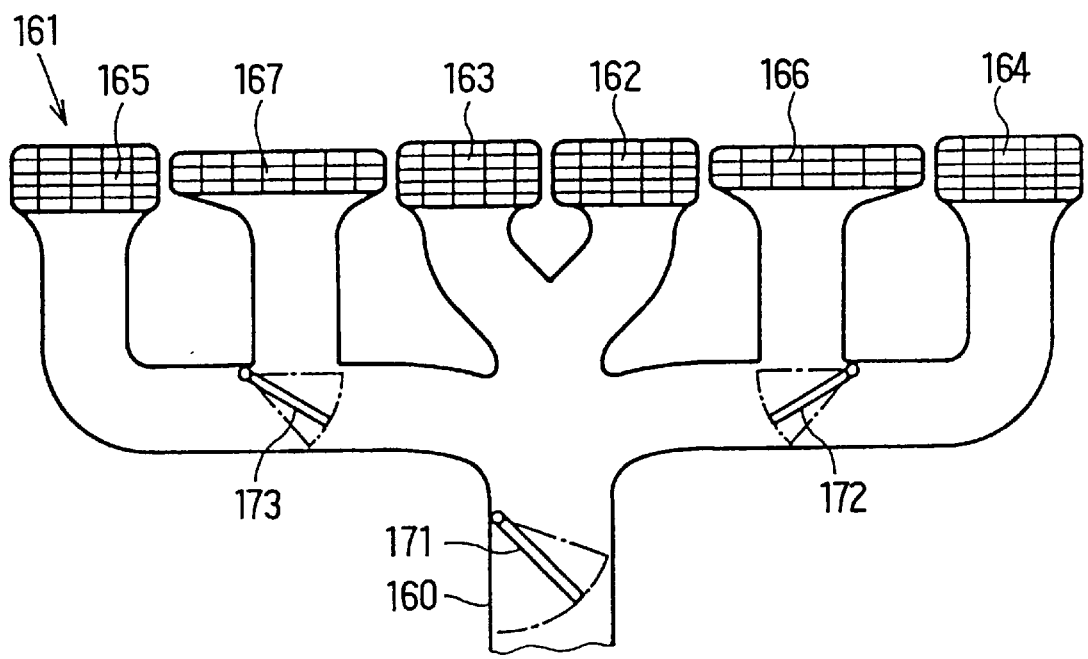
FIG. 48B is a schematic view of a face duct of an air-conditioning unit according to a fourth preferred embodiment of the present invention.

FIG. 48A is a view of a vehicle instrument panel and FIG. 48B a view of a face duct of an air-conditioning unit of a fourth preferred embodiment of the invention. In this preferred embodiment, the partition plate 14 in the air-conditioning duct 2 of the first preferred embodiment is dispensed with. As the front seat FACE outlets, a wide flow FACE outlet 161 opening at the downstream end of a face duct 160 connected to the downstream end of the air-conditioning duct 2 is provided. The wide flow FACE outlet 161 is made up of driver side and passenger side center FACE outlets 162, 163 opening in the middle of the instrument panel 40, driver side and passenger side side FACE outlets 164, 165 opening at the ends of the instrument panel 40, i.e. near the side windows of the vehicle, and driver side and passenger side middle FACE outlets 166, 167 opening between these other FACE outlets. A plurality of louvers for changing the blowout direction of a respective conditioned air when manually operated by an occupant are provided in each of the FACE outlets 162–167.

A FACE door 171 for opening and closing the FACE outlets 162 through 167, a driver side middle FACE door 172 for opening and closing the driver side side and middle FACE outlets 164, 166, and a passenger side middle FACE door 173 for opening and closing the passenger side side and middle FACE outlets 165, 167 are each pivotally mounted in the face duct 160. The driver side and passenger side middle FACE doors 172, 173 correspond to the blowout state changing device of the present invention. According to the respective apertures, the doors change blowout states of conditioned air blown into respective air-conditioning zones from Dr, the driver side and passenger side side FACE outlets 164, 165, Dr and the driver side and passenger side middle FACE outlets 166, 167 (for example between a wide outlet mode and a spot outlet mode).

In this preferred embodiment, the FACE door 171 is moved to its open side by an actuator such as a servo motor and the driver side and passenger side middle FACE doors 172, 173 are moved to their closed sides by actuators such as servo motors. As a result, the driver side and passenger side center FACE outlets 162, 163 and the driver side and passenger side side FACE outlets 164, 165 are opened and the driver side and passenger side middle FACE outlets 166, 167 are closed and the open area of the wide flow FACE outlet 161 is reduced. As a result, the blowout range of conditioned air blown from the wide flow FACE outlet 161 is reduced, and conditioned air is blown locally toward the heads and chests of air-conditioning zone occupants.

Alternatively, the FACE door 171 is moved to its open side and the driver side and passenger side middle FACE doors 172, 173 are moved to intermediate positions. As a result, the driver side and passenger side center FACE outlets 162, 163, the driver side and passenger side side FACE outlets 164, 165 and the driver side and passenger side middle FACE outlets 166, 167 are opened, and the open area of the wide flow FACE outlet 161 is increased. Therefore, the blowout range of conditioned air blown from the wide flow FACE outlet 161 is increased, and conditioned air is blown dispersedly into the air-conditioning zones.

A FACE door may also be provided in the face duct 160 and still finer variable control of flow distribution carried out, or one or two partition plates may be provided in the air-conditioning duct 2 and the face duct 160, and a blower provided in each air passage and the flow distribution to occupants of driver side and passenger side air-conditioning zones varied by the delivery flows of the blowers being changed.

Fifth Preferred Embodiment

Figure 49:
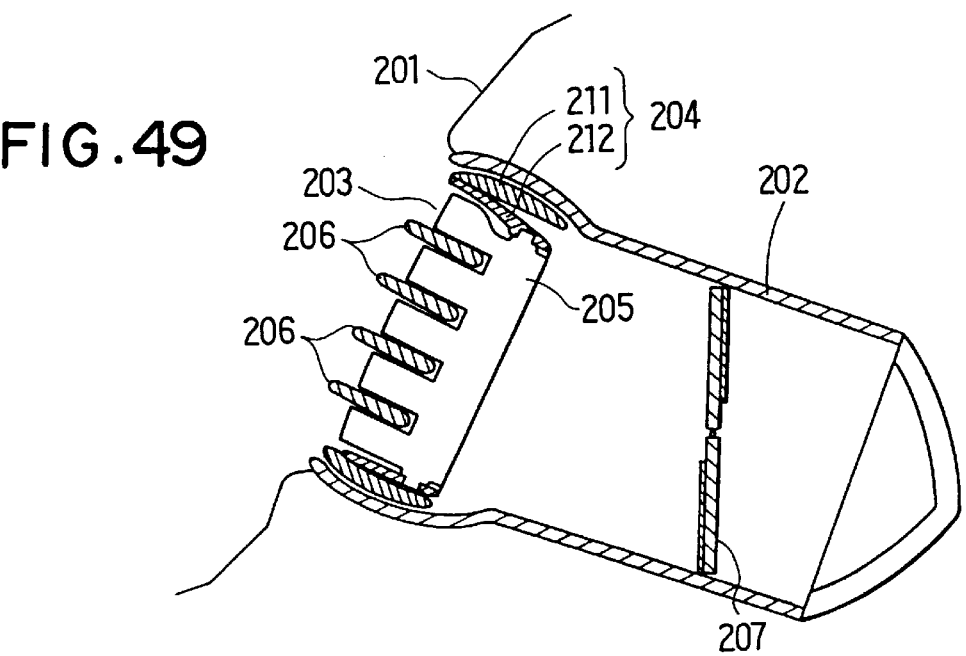
FIG. 49 is a sectional view of a drum ventilator for a vehicle in accordance with a fifth preferred embodiment of the present invention.

FIG. 49 is a sectional view of a drum ventilator for a vehicle of a fifth preferred embodiment of the invention. In this drum ventilator, a cylindrical case 202 connecting with a face duct of air-conditioning duct is mounted in a vehicle instrument panel 201, forming a FACE outlet 203 inside. A cylindrical flow-directing drum 204 is rotatably mounted in a downstream end of the case 202.

In this flow-directing drum 204, vertical louvers 205 are pivotally supported in the left-right direction and cross louvers 206 are provided to form a grill in combination with these vertical louvers 205. A damper 207 for adjusting the flow of conditioned air blown from the FACE outlet 203 is rotatably mounted in the upstream end of the case 202. The vertical louvers 205 and the cross louvers 206, in the same way as in the first preferred embodiment, are oscillated by actuators such as louver motors by way of a link mechanism (not shown). Here, the flow-directing drum 204 of this preferred embodiment is made up of a cylindrical first drum 211 rotatably mounted in the front end of the case 202, and a cylindrical second drum 212 built into the first drum 211.

In this preferred embodiment, to change the blowout direction of the conditioned air, it is only necessary to change the orientation of the front opening of the second drum 212. For example, if as shown in FIG. 49 the center axes of the case 202, the first drum 211 and the second drum 212 are substantially aligned, the blowout direction of the conditioned air is diagonally upward, and the conditioned air is blown locally toward the head of an air-conditioning zone occupant. If on the other hand the first drum 211 and the second drum 212 are turned counterclockwise with respect to the center axis of the case 202, the blowout direction of the conditioned air is downward, and the conditioned air is blown locally at the chest vicinity of the air-conditioning zone occupant.

Sixth Preferred Embodiment

Figure 50A:
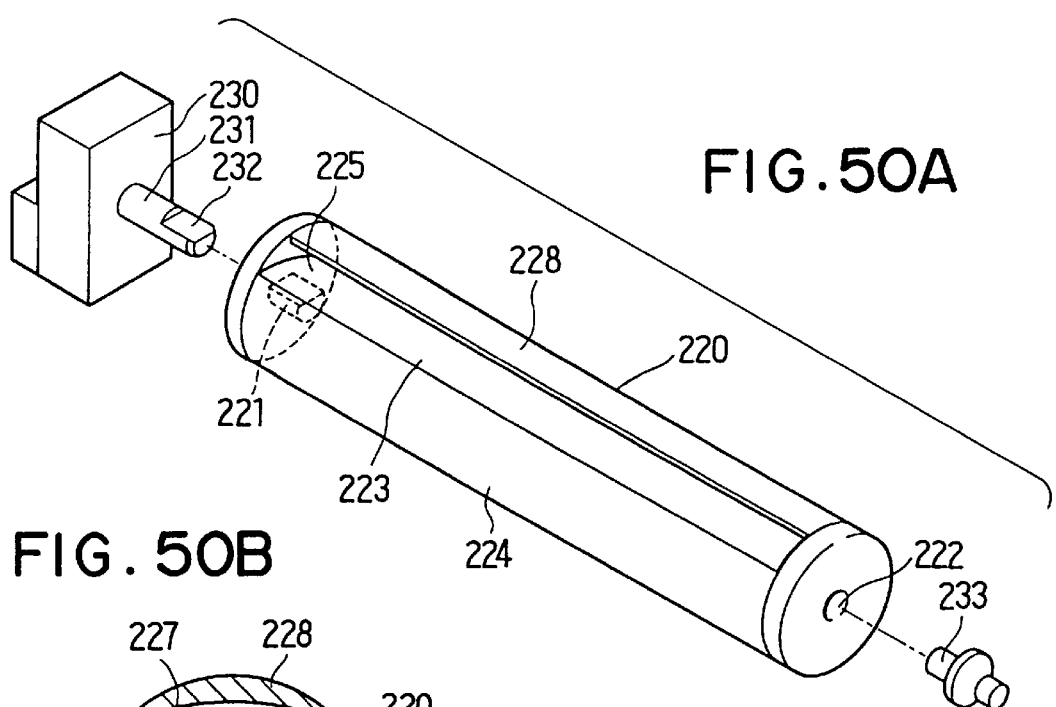
FIG. 50A is a perspective view showing an air blowout louver and FIG. 50B is a sectional view of the air blowout louver according to a sixth preferred embodiment of the present invention.
Figure 50B:
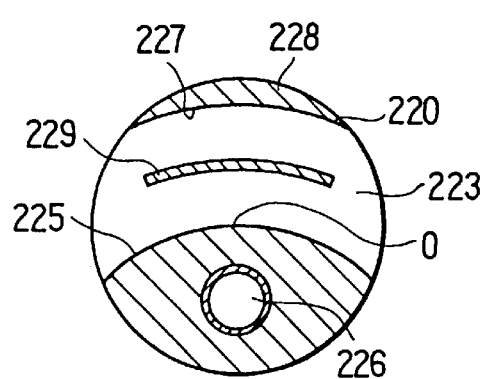

FIGS. 50A and 50B show an air outlet louver of a sixth preferred embodiment of the present invention. The air outlet louver 220 of this preferred embodiment is made for example of plastic and has the shape of a long, narrow cylinder. A cross-sectionally D-shaped mating hole 221 is provided in one end face, and a fitting hole 222 is provided in the other end face. In a position off the rotational axis O of the air outlet louver 220, an air passage 223 is provided extending in the axial direction of the air outlet louver 220, and in a position on the opposite side of the rotational axis O from the air passage 223, a blocked part 224 also extends in the axial direction. The blocked part 224 has a convex arcuate face 225 passing through the rotational axis O, and is formed solid between this convex arcuate face 225 and a part of the outside face of the air outlet louver 220, and a hollow 226 is formed extending in the axial direction in the middle of this blocked part 224. The air outlet louver 220 has a concave arcuate face 227 having the same center of curvature as the convex arcuate face 225; a fin 228 is formed by this concave arcuate face 227 and a part of the outside face of the air outlet louver 220, and an arcuate air passage 223 of a fixed width is formed between the convex arcuate face 225 and the concave arcuate face 227. Also, an arcuate flow-straightening fin 229 is provided in the middle of this air passage 223 in a widthwise direction.

This air outlet louver 220 is received in a long, narrow rectangular air outlet (not shown) opening at the downstream end of an air blowout duct. A cross-sectionally D-shaped mating stump 232 formed on a rotating shaft 231 of a motor 230 mates with the mating hole 221 of the air outlet louver 220. A bearing pin 233 projecting from a side wall of the air blowout duct is rotatably fitted in the fitting hole 222. Thus the air outlet louver 220 is supported at two points by the rotating shaft 231 of the motor 230 and the bearing pin 233 and can oscillate up and down about its rotational axis O and thereby change the blowout direction of conditioned air blown out from the air outlet.

Seventh Preferred Embodiment

Figure 52:
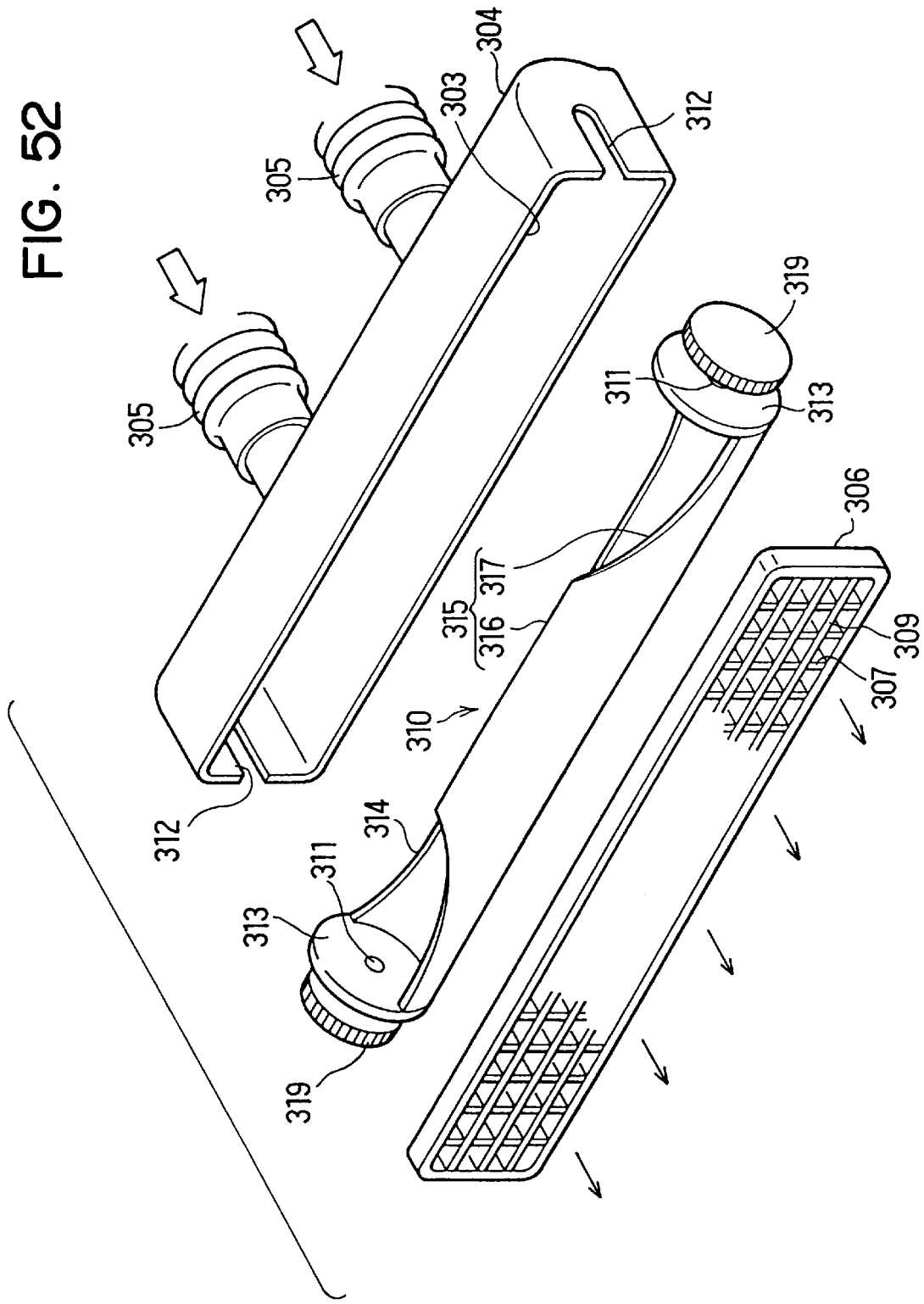
FIG. 52 is an exploded perspective view showing a blowout duct, a supporting frame and a rotary valve according to a seventh preferred embodiment of the present invention.

FIGS. 51–54C show a seventh preferred embodiment of the present invention. FIG. 51 is a front view of an instrument panel, and FIG. 52 is an exploded perspective view showing a blowout duct, a supporting frame and a rotary valve.

In this preferred embodiment, an air-conditioning unit 302 for air-conditioning the vehicle passenger compartment is installed behind a vehicle instrument panel 301. One blowout duct 304 forming a cross-sectionally inverted square "c" shape straight air outlet 303 in the width direction of the car, is mounted in the front face of the instrument panel 301. Air ducts 305 for guiding conditioned air from the air-conditioning unit 302 to the air outlet 303 are connected to the rear side of the blowout duct 304.

A louver support frame 306 is attached to the front of the blowout duct 304, and vertical louvers 307 and cross louvers 309 for changing the blowout direction of conditioned air blown into an air-conditioning zone of the passenger compartment from the air outlet 303 are provided in the form of a grill in this louver support frame 306. A rotary valve 310 for changing the aperture of the air outlet 303 and thereby changing the flow of the conditioned air is mounted on the upstream side of the frame 306.

The rotary valve 310 has support shafts 311 rotatably supported in slits 312 formed in the blowout duct 304. The rotary valve 310 roughly has the shape of a half-cylinder having end walls 313; a rear (upstream) edge 314 of the rotary valve 310 is substantially straight, and a front (downstream) edge 315 of the rotary valve 310 is made up of a central horizontal straight portion 316 and roughly arcuate curved portions 317 formed on the left and right sides of this horizontal straight portion 316. That is, the cross-sectional shape of the rotary valve 310 is semi-circular at the horizontal straight portion 316 but gradually changes from a semi-circular to a quarter-circular shape with progress along the curved portions 317 to the left and right ends of the rotary valve 310.

Adjusting dials 319 for adjusting the blowout state of the conditioned air by rotating the rotary valve 310 are fixed to the outer ends of the support shafts 311 of the rotary valve 310. The support shafts 311 of the rotary valve 310, similarly to the first preferred embodiment, are given a turning motion by an actuator such as a valve motor by way of a link mechanism (not shown).

Next, operation of the seventh preferred embodiment will be briefly described on the basis of FIGS. 51–FIG. 54. When the rotary valve 310 is rotated by the actuator to the angular position of the spot blowout mode, in the middle of the air outlet 303, as shown in FIG. 53A, the air outlet 303 is completely closed by the rotary valve 310, while at the left and right ends of the air outlet 303, as shown in FIGS. 53B and 53C, the air outlet 303 is progressively opened. Consequently, conditioned air from the air-conditioning unit 302 is not blown from the middle part of the air outlet 303 at all, but rather is blown in increasing amounts with progress toward the left and right ends of the air outlet 303. As a result, in front of the left and right ends of the air outlet 303, a spot blowout mode is assumed wherein a concentrated amount of conditioned air is blown out toward air-conditioning zone occupants.

When on the other hand the rotary valve 310 is driven by the actuator to the angular position of the wide blowout mode, as shown in FIGS. 54A–54C, the middle part and the left and right end parts of the air outlet 303 are all substantially opened. Therefore, a wide blowout mode is assumed wherein the conditioned air from the air-conditioning unit 302 is blown into the air-conditioning zone uniformly from along the length of the air outlet 303.

Eighth Preferred Embodiment

FIGS. 55A–59B show an eighth preferred embodiment of the present invention. FIGS. 55A–55E are perspective views of alternative versions of the rotary valve 310 of the seventh preferred embodiment.

Figure 55A:
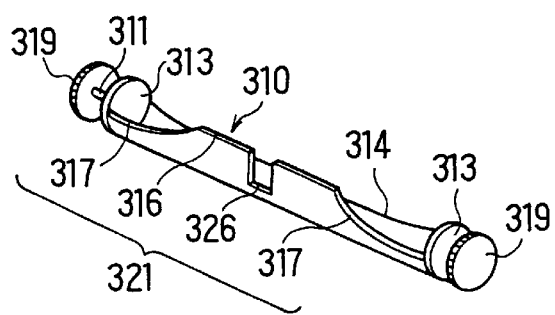
FIGS. 55A–55E are perspective views showing alternative versions of the rotary valve according to an eighth preferred embodiment of the present invention.

The rear edges 314 of the rotary valves 310 shown in FIGS. 55A–55E are all formed on a straight line, like the rear edge 314 of the seventh preferred embodiment, but the shapes of their front edges 321–325 are all different. That is, the front edge 321 of the rotary valve 310 of FIG. 55A is one obtained by forming a U-shaped concavity 326 in the middle of the horizontal straight portion 316 of the front edge 315 of the seventh preferred embodiment, so that in the spot blowout mode the conditioned air is blown in concentration not only from the curved portion 317 parts but also from the concavity 326.

Figure 55B:
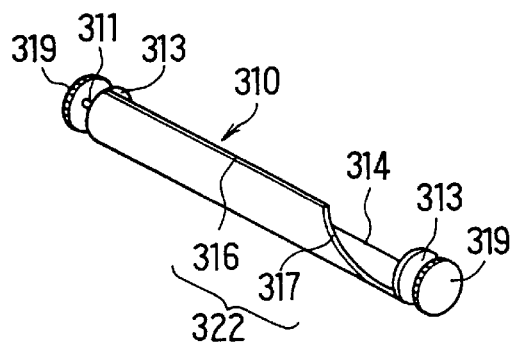

The front edge 322 of the rotary valve 310 of FIG. 55B is one obtained by dispensing with the left curved portion 317 of the seventh preferred embodiment and leaving only the right curved portion 317, so that the conditioned air is blown in concentration only from this right curved portion 317. The front edge 323 of the rotary valve 310 of FIG. 55C is formed in an inverted V-shape extending over the length of the rotary valve 310, so that the blowout flow of the conditioned air gradually increases with progress from the center of the rotary valve 310 toward its left and right ends.

Figure 55C:
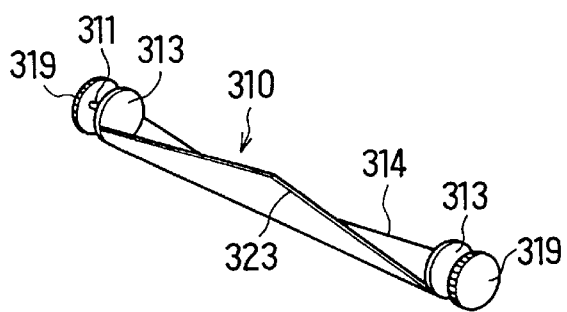
Figure 55D:
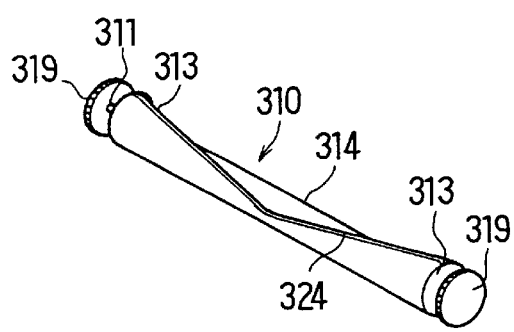
Figure 55E:
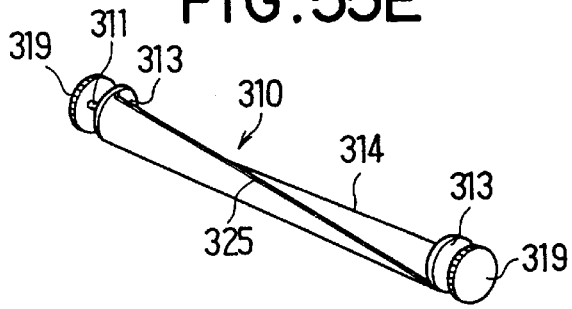

The front edge 324 of the rotary valve 310 of FIG. 55D is V-shaped, in a manner reverse from that of the rotary valve 310 of FIG. 55C, so that the blowout flow of the conditioned air increases with progress from the left and right ends of the rotary valve 310 toward the center. Also, the front edge 325 of the rotary valve 310 of FIG. 55E gradually decreases in height in a straight line from its left end to its right end, so that the blowout flow of the conditioned air progressively increases from the left end of the rotary valve 310 to the right end.

Next, a pattern of change of blowout positions of conditioned air at pause times, in a case where left and right blowout ducts 304 are provided in the front of the instrument panel 301 so that a driver side air-conditioning zone and a passenger side air-conditioning zone can be air-conditioned independently, will be described on the basis of FIGS. 56–59.

Figure 56A:
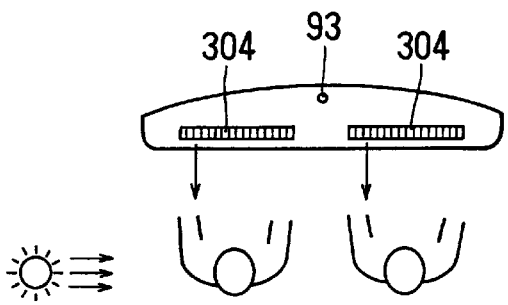
FIGS. 56A–56E are operation illustrations showing blowout positions at swing pause times for different solar radiation directions according to the eighth preferred embodiment.

When as shown in FIG. 56A the solar radiation direction is across from the left with respect to the forward motion of the vehicle, driver side and passenger side rotary valves 310 are rotated to predetermined positions and blowout positions of conditioned air blown from driver side and passenger side blowout ducts 304 are thereby set to positions such that the conditioned air is incident upon the left sides of the occupants exposed to the solar radiation.

Figure 56B:
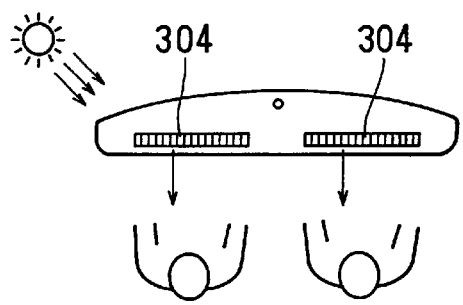

When as shown in FIG. 56B the solar radiation direction is diagonally from the front and the left with respect to the forward motion of the vehicle, the driver side and passenger side rotary valves 310 are rotated to predetermined positions and the blowout positions of the conditioned air blown from the driver side and passenger side blowout ducts 304 are thereby set to positions such that the conditioned air is incident upon the left sides and the left sides of the heads and chests of the occupants, which are exposed to the solar radiation.

Figure 56C:
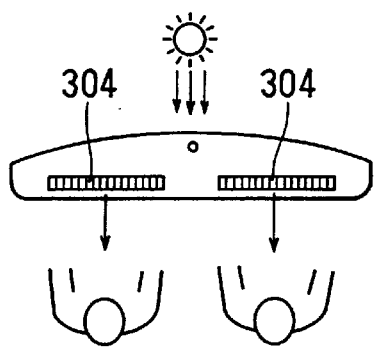
Figure 56D:
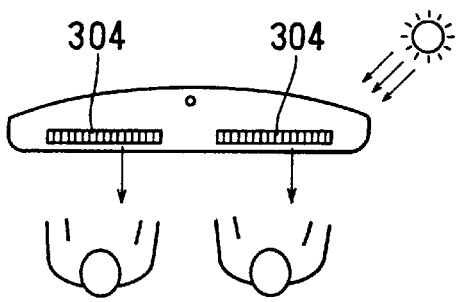
Figure 56E:
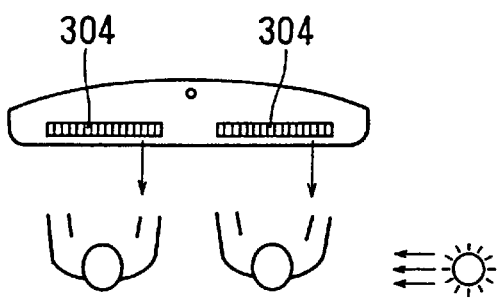

When as shown in FIG. 56C the solar radiation direction is directly from the front or directly from the rear with respect to the forward motion of the vehicle, the driver side and passenger side rotary valves 310 are rotated to predetermined positions, and the blowout positions of the conditioned air blown from the driver side and passenger side blowout ducts 304 are thereby set to positions such that the conditioned air strike the heads and chests (and particularly the faces) of the occupants, which are exposed to the solar radiation. In the cases shown in FIGS. 56D and 56E, the settings are those of FIGS. 56B and 56A reversed for the opposite side.

Figure 57A:
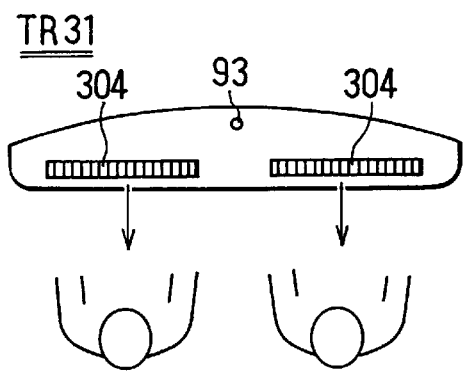
FIGS. 57A–57F are operation illustrations showing blowout positions at swing pause times for different passenger compartment temperatures according to the eighth preferred embodiment.
Figure 57D:
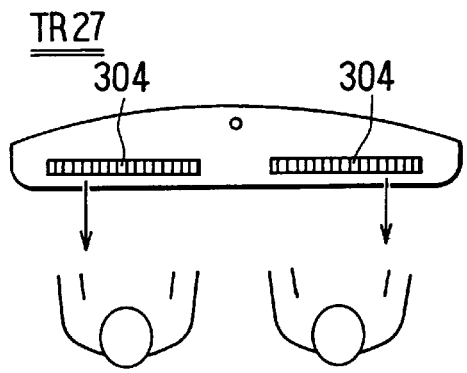
Figure 57B:
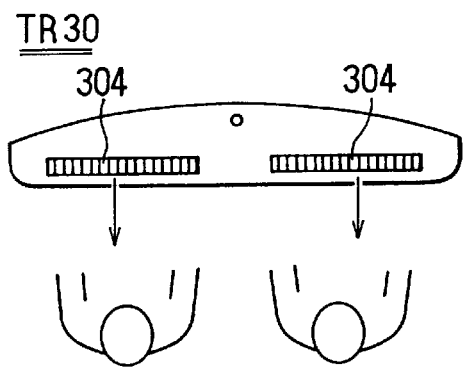
Figure 57E:
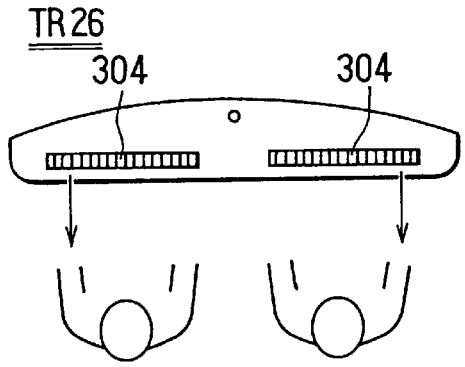
Figure 57C:
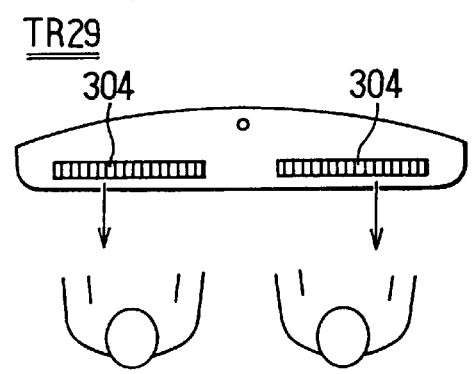
Figure 57F:
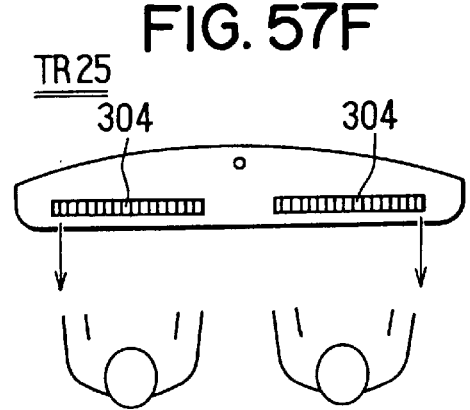

Next, when as shown in FIG. 57A the passenger compartment temperature (TR) is 31° C., if the set temperature is for example 25° C., because the passenger compartment temperature is very high, the driver side and passenger side rotary valves 310 are rotated to predetermined positions, and the blowout positions of the conditioned air blown from the driver side and passenger side blowout ducts 304 are thereby set to positions such that the conditioned air is incident upon the heads and chests (and particularly the faces) of the occupants. And, as the passenger compartment temperature (TR) descends to 30° C., 29° C., 27° C. and 26° C., as shown in FIGS. 57B–57R, the blowout positions of the conditioned air blown from the driver side and passenger side blowout ducts 304 are set to positions such that the conditioned air is incident upon the left and right side occupants more toward their left and right sides respectively. When the passenger compartment temperature (TR) descends to 25° C., because occupants will become uncomfortable if conditioned air is concentrated on them, the blowout positions of the conditioned air blown from the driver and passenger side blowout ducts 304 are set to positions such that the conditioned air misses the occupants.

Figure 58A:
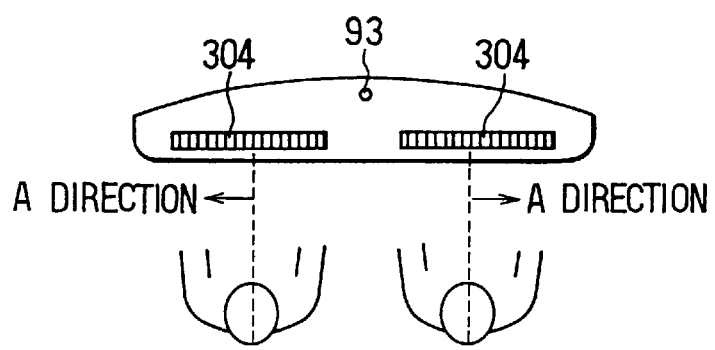
FIG. 58A is an operation illustration showing a swing pause time blowout position changing method.
Figure 58B:
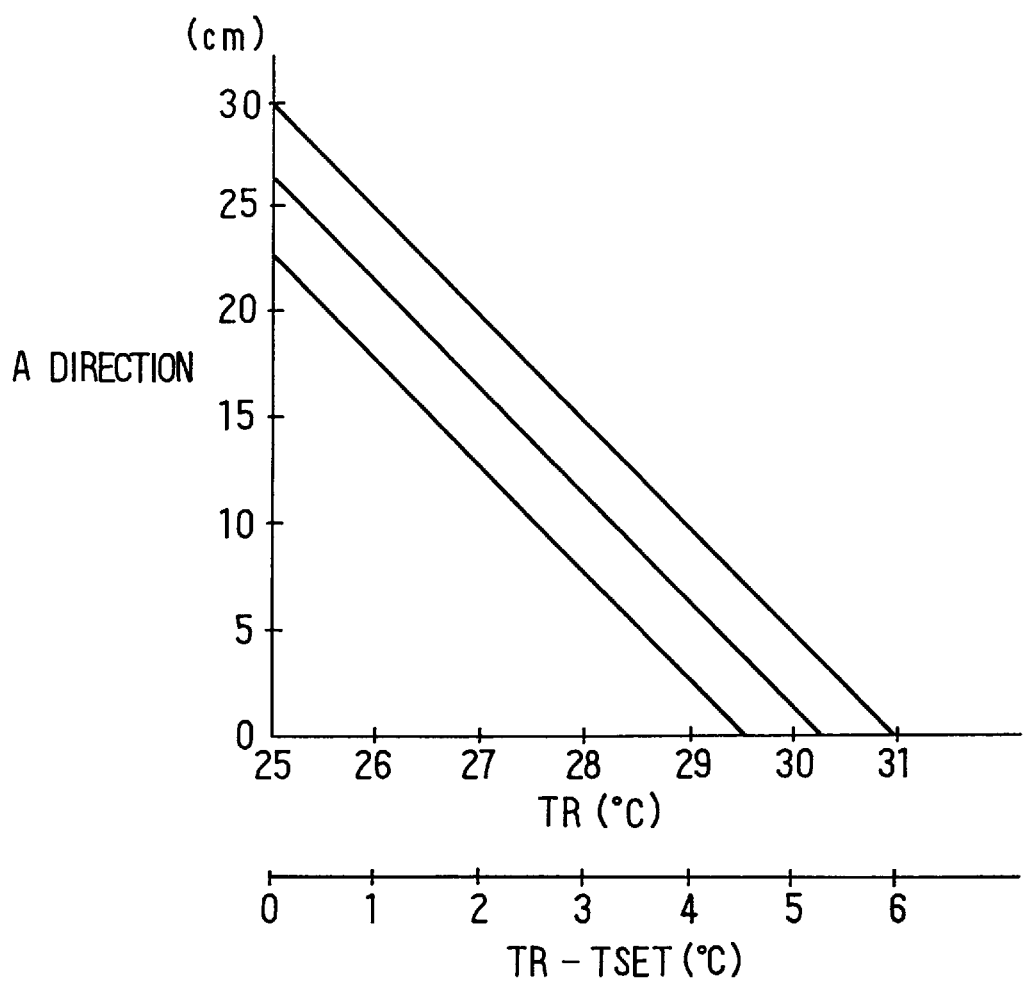
FIG. 58B is a characteristic diagram showing a relationship between swing pause time blowout position and passenger compartment temperature and difference between passenger compartment temperature and set temperature according to the eighth preferred embodiment.

FIGS. 58A and 58B show the blowout positions of the conditioned air blown from the driver side and passenger side blowout ducts 304 being changed so that the conditioned air is shifted from the vicinities of the faces of the occupants to positions that miss the occupants (shown as the A direction in FIGS. 58A and 58B as the cooling load falls, when the pause time occurs due to the swinging of the rotary valves 310. In this case, as a cooling load indicator, the passenger compartment temperature (TR) may be used alone, or the difference between the passenger compartment temperature (TR) and the set temperature (TSET) may be used, and solar radiation strength correction may be applied to the indicator.

Figure 59A:
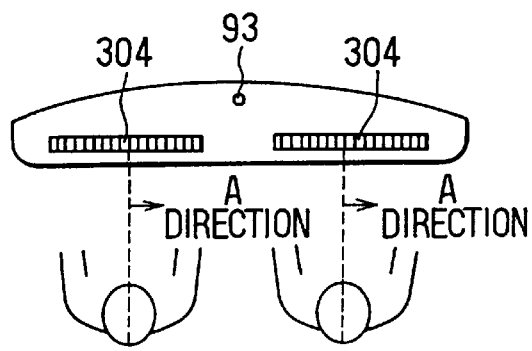
FIG. 59A is an operation illustration showing a swing pause time blowout position changing method.
Figure 59B:
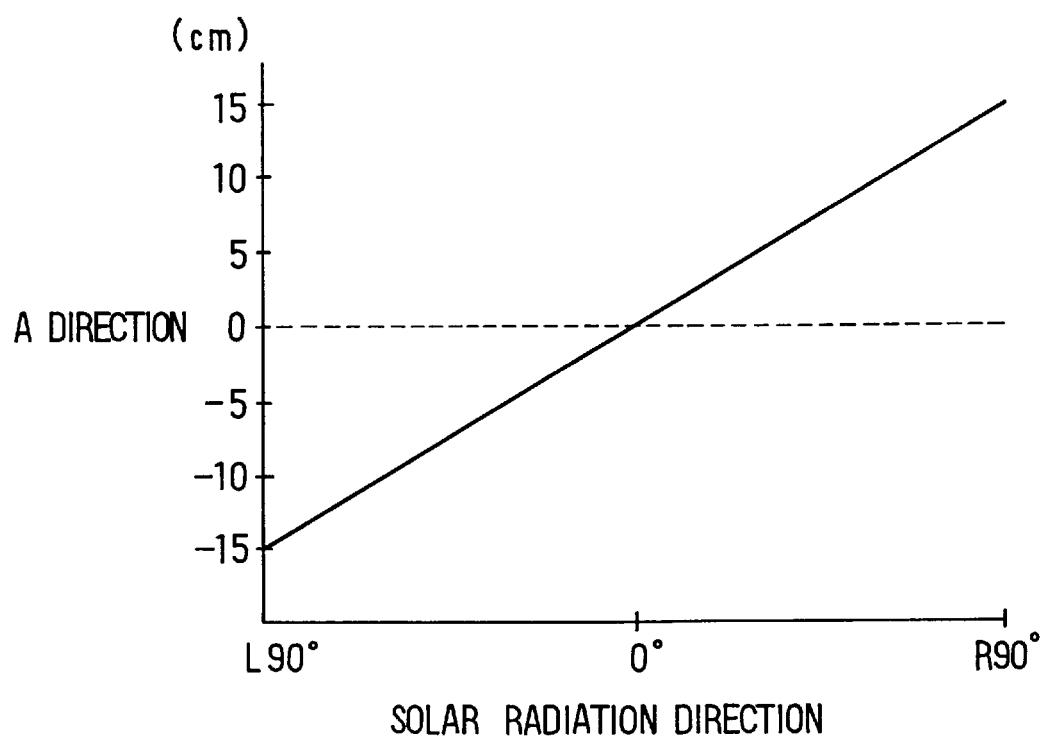
FIG. 59B is a characteristic diagram showing a relationship between swing pause time blowout position and solar radiation direction according to the eighth preferred embodiment.

FIGS. 59A and 59B show the blowout positions of the conditioned air blown from the driver side and passenger side blowout ducts 304 being changed so that the conditioned air is shifted from the vicinities of the faces of the occupants to positions that miss the occupants when the pause time comes during the swinging of the rotary valves 310. In this case, the solar radiation direction alone is used as the cooling load indicator.

Ninth Preferred Embodiment

Figure 60:
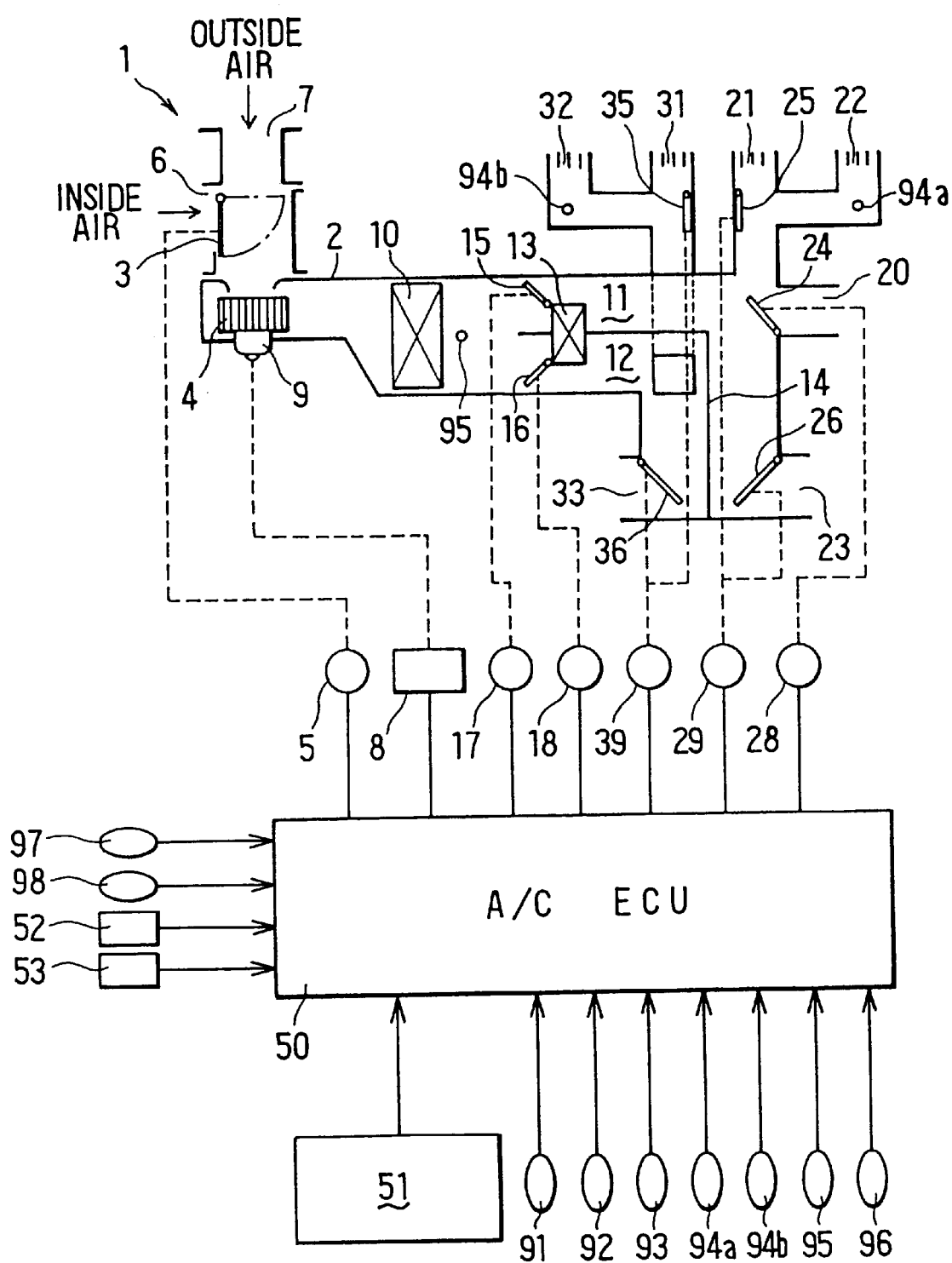
FIG. 60 is a schematic view of the overall construction of a vehicle air-conditioning system according to a ninth preferred embodiment of the present invention.
Figure 61A:
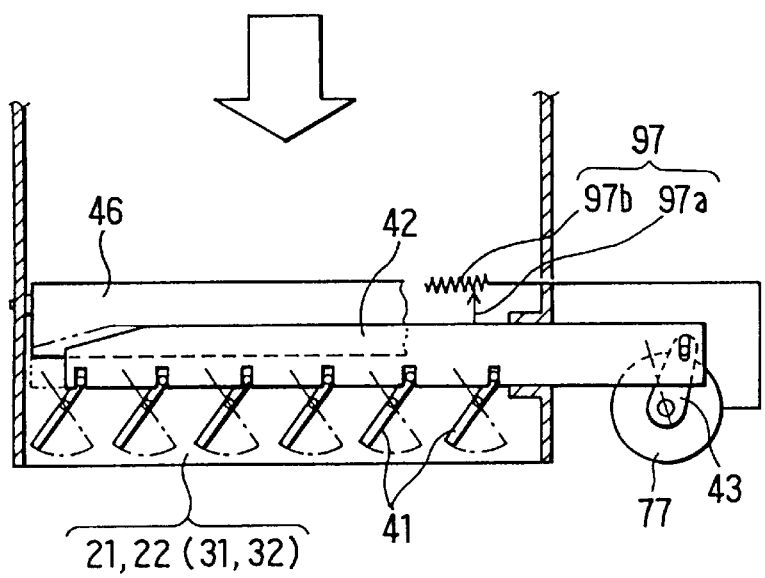
FIG. 61A is a sectional plan view of a louver left-right direction oscillating mechanism.
Figure 61B:
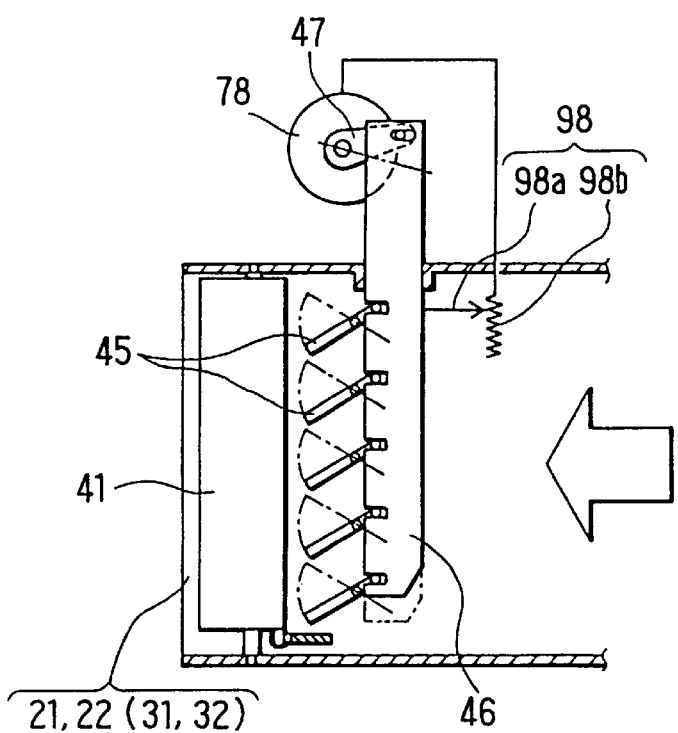
FIG. 61B is a sectional side view of a louver up-down direction oscillating mechanism according to the ninth preferred embodiment.
Figure 62:
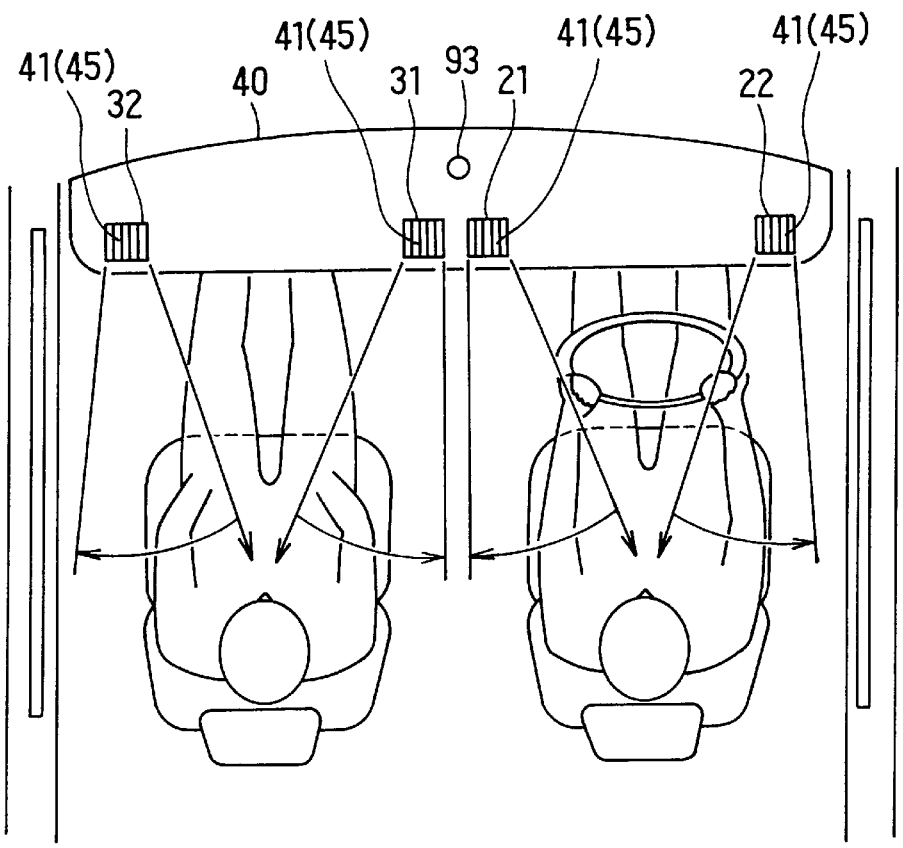
FIG. 62 is a schematic view showing the swing range of conditioned air to a passenger compartment according to a tenth preferred embodiment of the present invention.

FIG. 60 and FIGS. 61A and 61B show a ninth preferred embodiment of the invention. In this preferred embodiment, potentiometers 97, 98 for detecting the present positions of the center and side louvers 41, 45 of each of the blowout state changing devices are connected to the air-conditioning ECU 50. A plurality of potentiometers 97 (in this example, four) are provided in the vicinities of the louver left-right direction oscillating mechanisms, as shown in FIG. 61A, and are blowout direction or blowout position detecting devices each made up of a moving contact 97a moving horizontally together with the link lever 42, and a resistor element 97b or the like for changing a partial voltage ratio along with the movement of the contact 97a.

A plurality of potentiometers 98 (in this example, four) are provided in the vicinities of the louver up-down direction oscillating mechanisms, as shown in FIG. 61B, and are blowout direction or blowout position detecting devices each made up of a moving contact 98a moving up and down together with the link lever 46 and a resistor element 98b or the like for changing a partial voltage ratio along with the movement of this moving contact 98a. In this preferred embodiment, instead of stepping motors, louver motors (for example d.c. servo motors) 77, 78 are used as the actuators for oscillating the blowout state changing devices.

Tenth Preferred Embodiment: Construction

FIGS. 62–70 show a tenth preferred embodiment of the invention. To the air-conditioning ECU 50 of this embodiment, as shown in FIG. 1, are connected an inside air temperature sensor 9, an outside air temperature sensor 92, a solar radiation sensor 93, a post-evaporation temperature sensor 95 and a cooling water temperature sensor 96. Here, in the above described embodiments, the conditioned air blown out from each of FACE outlets 21, 22, 31 and 32 is controlled to be directed for a long period of time toward a front seat occupant, thereby improving the feeling of comfort of the front seat occupant.

Figure 63:
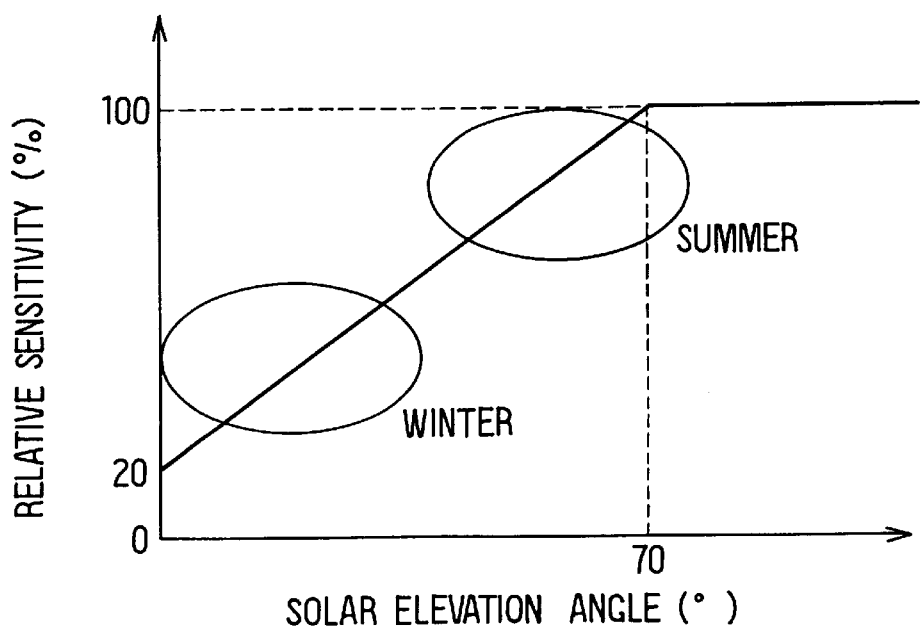
FIG. 63 is a graph showing a relationship between solar elevation-angle and relative sensitivity of a solar radiation sensor according to the tenth preferred embodiment.
Figure 64:
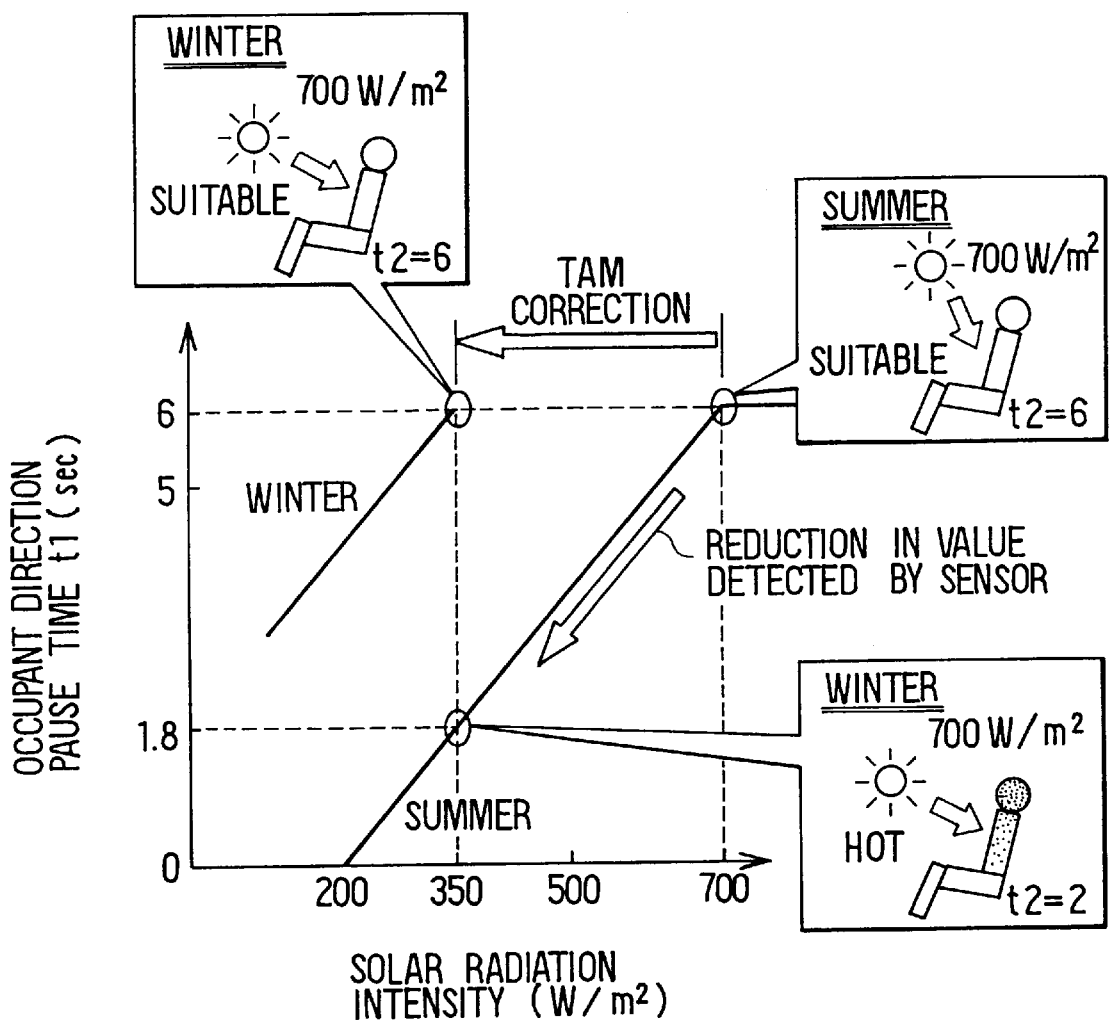
FIG. 64 is a graph showing pause time at a front seat occupant direction vs. amount of detected solar radiation according to the tenth preferred embodiment.
Figure 65:
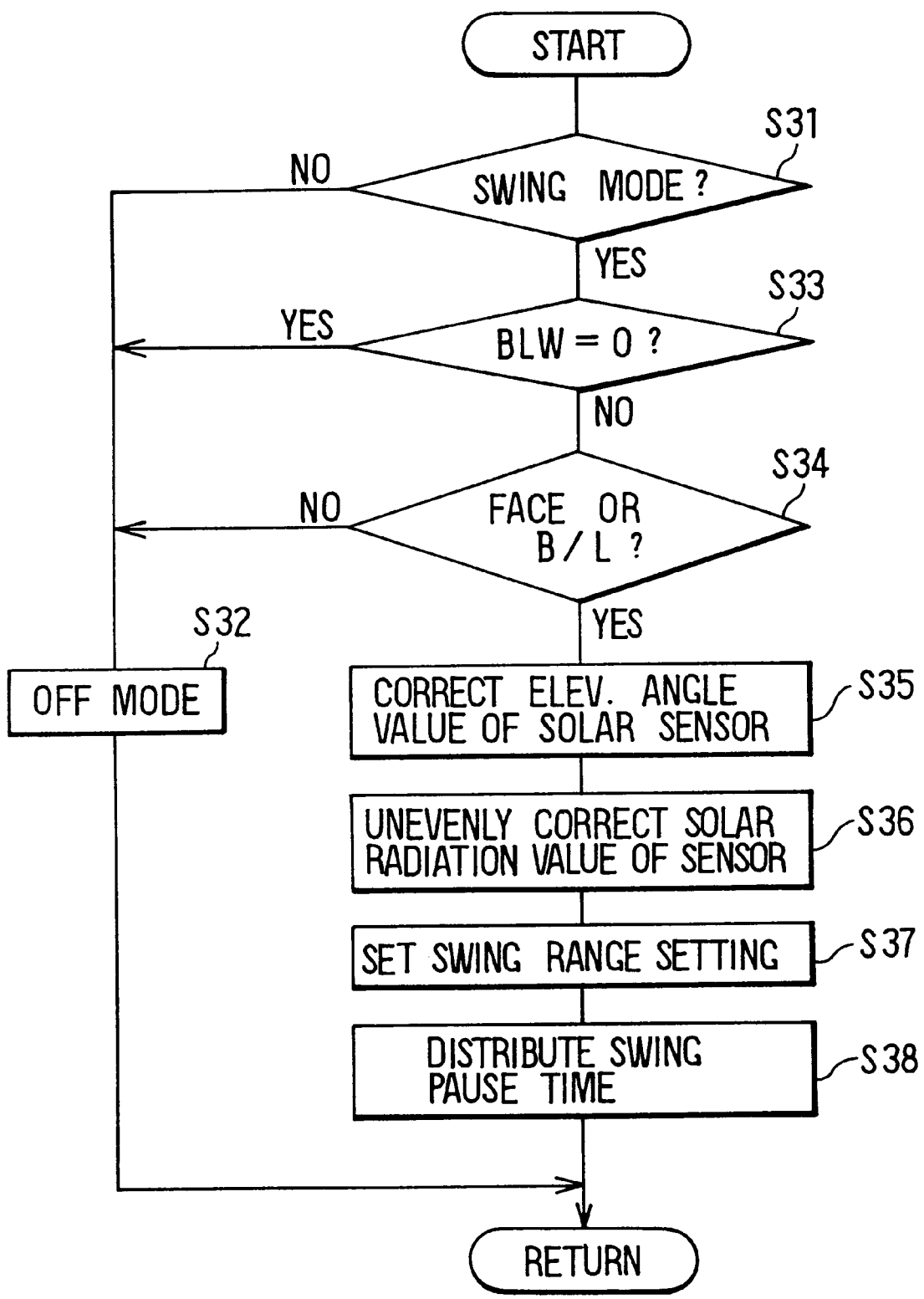
FIG. 65 is a flow diagram showing swing louver control carried out by an air-conditioning ECU according to the tenth preferred embodiment.

However, since the sensitivity of the solar radiation sensor is directional, the solar radiation sensor 93, optimally tuned when the solar elevation-angle is high such as in summer, will reduce the amount of detected solar radiation when the solar elevation angle is low such as in winter as shown in FIG. 63. Along with this, as shown in FIG. 64, the time during which the conditioned air blown out from each of the FACE outlets 21, 22, 31 and 32 is directed toward the front seat occupant is reduced even for strong solar radiation with a low solar elevation-angle in winter. This causes a front seat occupant to feel uncomfortably warm.

Hence, in this preferred embodiment, a swing louver control is performed such that the amount of detected solar radiation is corrected depending on an outside temperature (TAM) as shown in the graph of FIG. 64 for strong solar radiation with a low solar elevation-angle in winter, and a cool draft is directed toward the front seat occupant for a long time as in summer to improve the feeling of comfort of the front seat occupant. Here, in the graph of FIG. 64, t1 is an occupant direction pause time (sec), and t2 is a front direction pause time (sec).

Next, the swing louver control implemented by the air-conditioning ECU 50 of this preferred embodiment will be described on the basis of FIGS. 65–70. When the routine of FIG. 65 starts, it is determined by the swing mode/OFF mode switching switch whether or not the swing mode has been selected by which driver side and passenger side center louvers 41, 45, and driver and passenger side side louvers 41, 45 (step S31) are oscillated. When the result of this determination is NO, oscillation of the driver and passenger side center louvers 41, 45 and driver and passenger side side louvers 41,45 is stopped because OFF mode has been selected (step S32). Processing then advances to the routine of FIG. 65.

When the determination result of step S31 is YES, it is determined whether or not the blower controlling voltage applied to the blower 4 (blower level:BLW) is zero (step S33). When the result of this determination is YES, control processing of step S32 is carried out.

When the determination result of step S33 is NO, it is determined whether or not the outlet mode is the FACE mode or the B/L mode (step S34). When the result of this determination is NO, control processing of step S32 is carried out.

Figure 66:
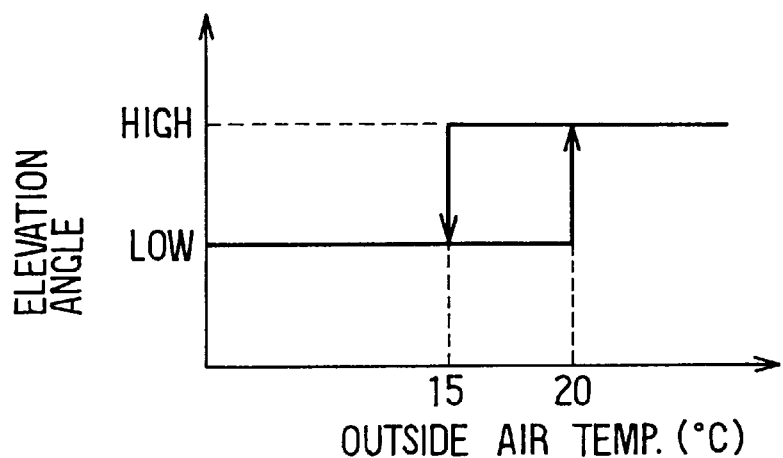
FIG. 66 is a characteristic diagram showing a procedure for determining an elevation-angle according to the tenth preferred embodiment.

When the determination result of step S34 is YES, elevation-angle correction of the value of the solar radiation sensor is carried out (step S35). Specifically, an elevation angle determination is first carried out on the basis of the outside air temperature (TAM) detected by the outside air temperature sensor 92 and the characteristic diagram of FIG. 66 showing an elevation-angle determination procedure. For example, for outside air temperature above a predetermined temperature (for example 20° C.), it is determined to be summer when the elevation-angle is high. For the outside air temperature below a predetermined temperature (for example 15° C.), it is determined to be winter when the elevation-angle is low.

Figure 67:
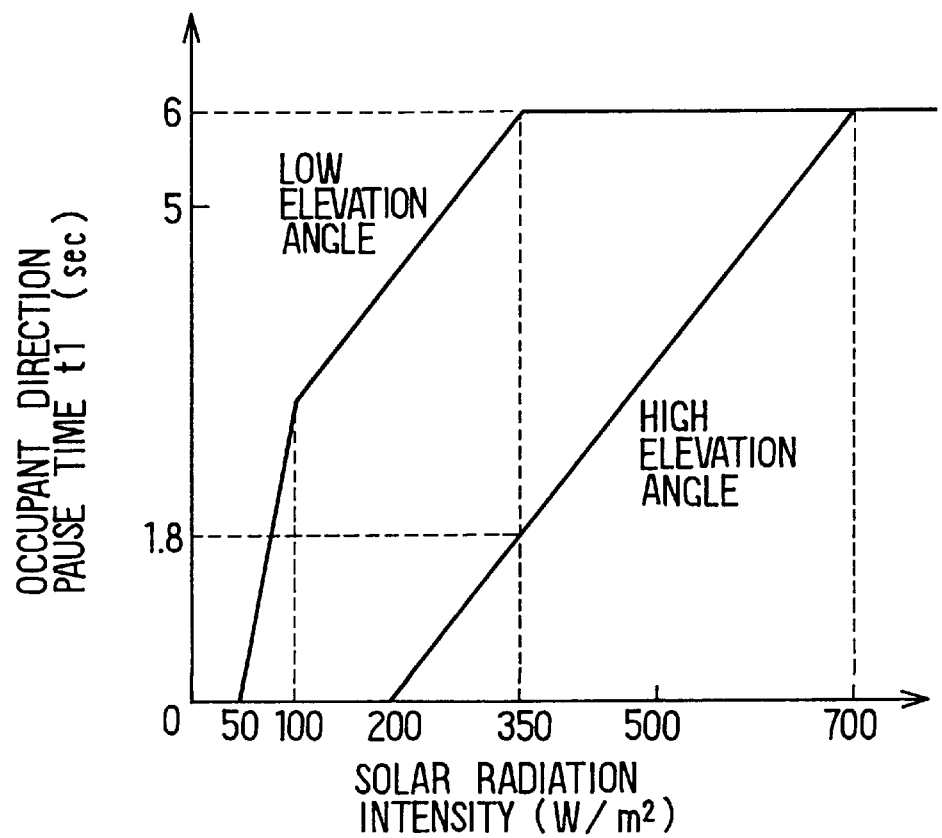
FIG. 67 is a graph showing pause time at a front seat occupant direction vs. amount of detected solar radiation at high elevation-angle and amount of corrected solar radiation at low elevation-angle according to the tenth preferred embodiment.

Next, when it is determined to be summer when the elevation-angle becomes high, the front seat occupant direction pause time (t1) is calculated depending on the amount of the solar radiation detected by the solar radiation sensor 93, as shown in FIG. 67. When it is determined to be winter when the elevation-angle is low, the pause time(t1) for directing the driver side and passenger side center louvers

Figure 68A:
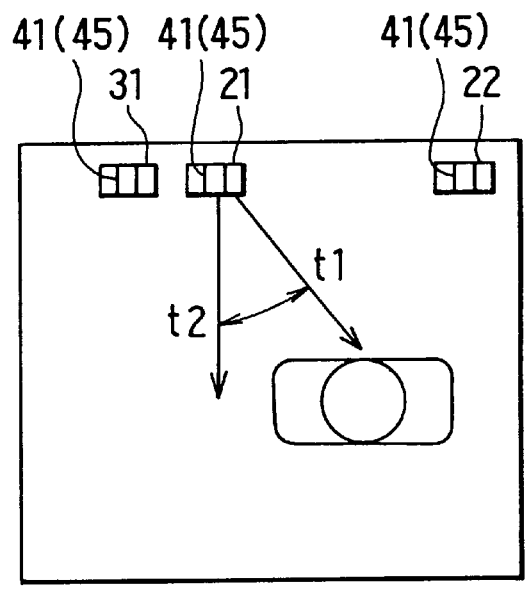
FIG. 68A is a schematic view showing swing pause direction.
Figure 68B:
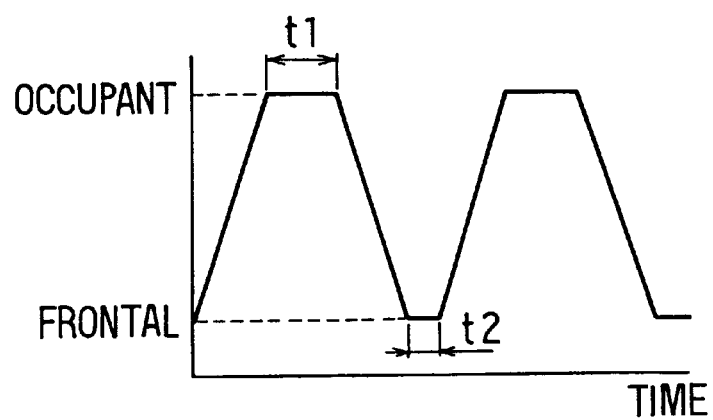
FIG. 68B is a timing diagram showing swings toward occupant direction and frontal direction according to the tenth preferred embodiment.

41, 45 toward the front seat occupant is calculated depending on the amount of corrected solar radiation for which the amount of the solar radiation detected by the solar radiation sensor 93 is corrected, as shown in FIG. 67. Here, FIG. 68A shows swing pause direction and FIG. 68B shows the swing toward the occupant and toward the front.

$$T2=7(\text{sec})-t1 \tag{Exp. 17}$$

Here, the case is shown where the total pause time is 7 seconds. However, the total pause time may be arbitrarily changed. The symbol t2 is the pause time during which the driver side and passenger side center louvers 41, 45 are directed toward the front of the FACE outlets 21, 31 (toward the rear of the vehicle). Here, for squarely incident solar radiation, the operating conditions of the driver side and passenger side side louvers 41, 45 may be controlled similarly to those of the driver side and passenger side center louvers 41, 45.

Next, uneven solar radiation correction is carried out (step S36). Specifically, as shown in step S19 in the flow diagram of FIG. 8, the left-right ratio (H) of strengths of solar radiation entering the passenger compartment are calculated.

Next, the swing ranges of the driver and passenger side center louvers 41, 45 and the driver side and passenger side side louvers 41, 45 are calculated depending on the outside air temperature (TAM) detected by the outside air temperature sensor 92, the amount of detected solar radiation (A) or the amount of corrected solar radiation (B), and temperature differences between the temperature inside the passenger compartment (TR) detected by the inside air temperature sensor 91 and the set temperatures TSET(Dr), TSET(Pa) (step S37).

Then, the pause time is distributed to the occupant side and the frontal side of each of the seats Dr, Da. Thereafter, processing leaves the routine of FIG. 65.

Specifically, as shown in step S21 of the flow diagram in FIG. 8, using the solar radiation left-right ratio (H), it is calculated how much of the total pause time is to be distributed to the driver side front seat occupant side swing end and to the frontal side swing end, and how much is to be distributed to the passenger side front seat occupant side swing end and to the front side.

In the swing louver control in the air-conditioning unit 1 of this embodiment, a low solar elevation-angle is estimated by the outside air temperature. Correction is then performed for a low amount of detected solar radiation, by which the conditioned air can be provided to be incident upon the occupant for a required long time even when the amount of detected solar radiation is low. Specifically, with the elevation-angle determination procedure of FIG. 66, it is determined whether the elevation-angle is high or low by using the value of the outside air temperature (TAM) that has been obtained by the existing sensor. Then, the front seat occupant direction pause time is calculated from the determined elevation-angle, and the amount of detected solar radiation or the amount of corrected solar radiation by using the graph of FIG. 67.

Figure 69:
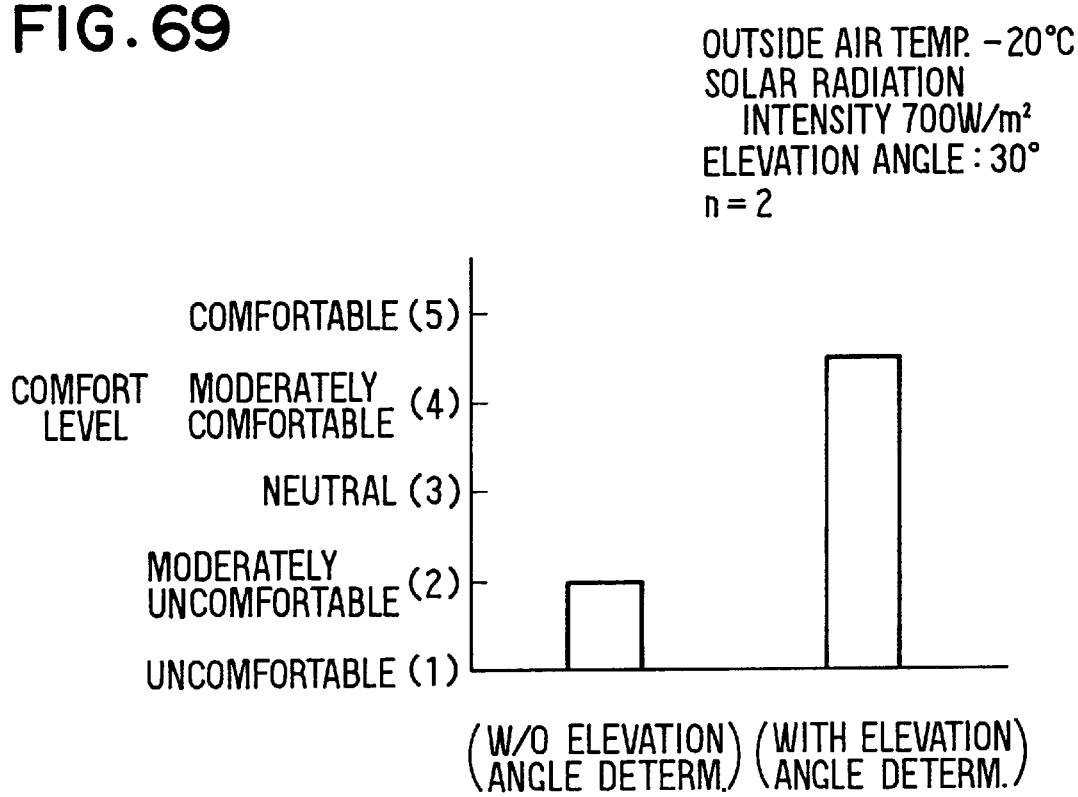
FIG. 69 is a graph showing feeling of comfort of occupant, in accordance with the tenth preferred embodiment.

As is described above, in winter when the amount of solar radiation is minimal due to low solar elevation-angle, a control characteristic different from that used in summer is applied. This overcomes the disadvantage of a directional solar radiation sensor 93 such that conditioned air is directed to strike the front seat occupant for a time as long as in summer as shown in the graph of FIG. 69 to improve the feeling of comfort of the front seat occupant as well as in summer. Here, the graph of FIG. 69 exhibits the difference in feeling of comfort between the cases with elevation-angle determination and without elevation-angle determination, where the outside air temperature is −20° C. and the solar radiation is 700 W/cm$^2$, projected squarely with an elevation-angle of 30°. It is understood from the graph of FIG. 69 that the case without elevation-angle determination provides a slightly uncomfortable feeling, while the case with elevation-angle determination provides a comfortable feeling.

Providing the conditioned air to be incident upon the rear seat occupant for an extended period of time will also improve the feeling of comfort of the rear seat occupant during the summer. In addition, determination of the elevation-angle using the value detected by the already provided outside air temperature sensor 92 enables season estimation to be easily performed with reduced cost. Moreover, in order to obtain a comfortable cool draft blown from the FACE outlets 21, 22, 31, 32 in winter, the actual outlet temperature or the target outlet temperature (TAO) may be corrected together with the correction of the amount of the detected solar radiation.

Figure 70:
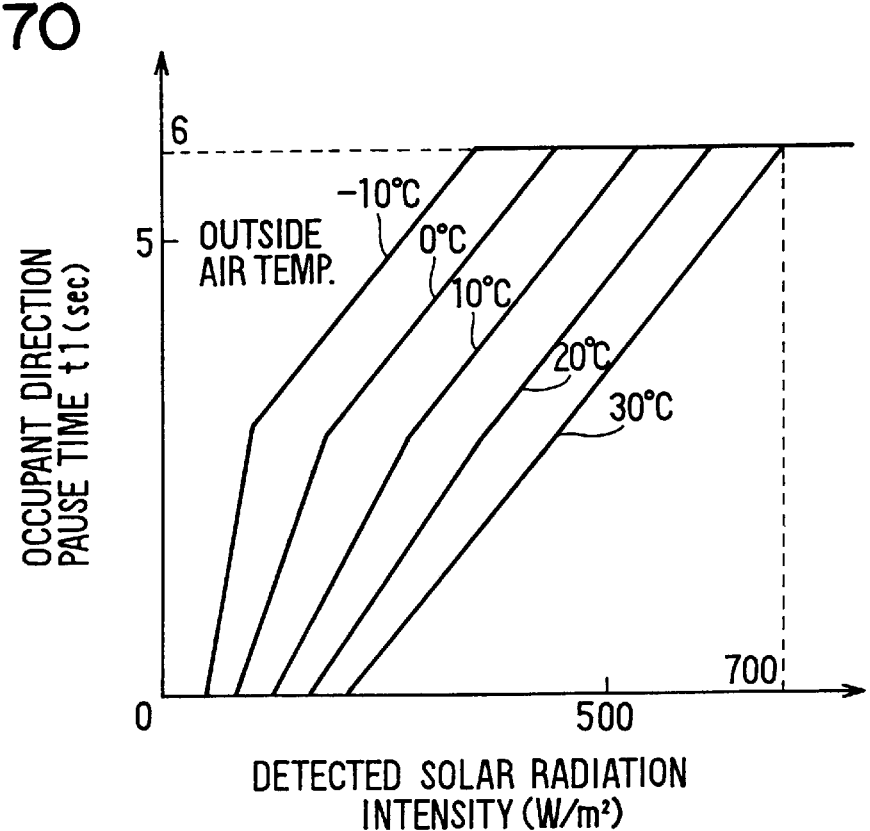
FIG. 70 is a graph showing a relationship between pause time at front seat occupant direction vs. amount of detected solar radiation according to the tenth preferred embodiment.

In this embodiment, as shown in the graph of FIG. 66, an amount of corrected solar radiation is used for which an amount of detected solar radiation is corrected to become larger when the outside air temperature is below a predetermined temperature (for example 15° C.). However, as shown in the graph of FIG. 70, an amount of corrected solar radiation may be used for which an amount of detected solar radiation to be corrected is increased, as the outside air temperature is decreased. That is, a change in the characteristics of the value of the solar radiation sensor using the solar elevation-angle may be performed in either a stepwise manner as shown in the graph of FIG. 70, or alternatively in a linear manner, thereby enabling further fine-tuned control.

Figure 71:
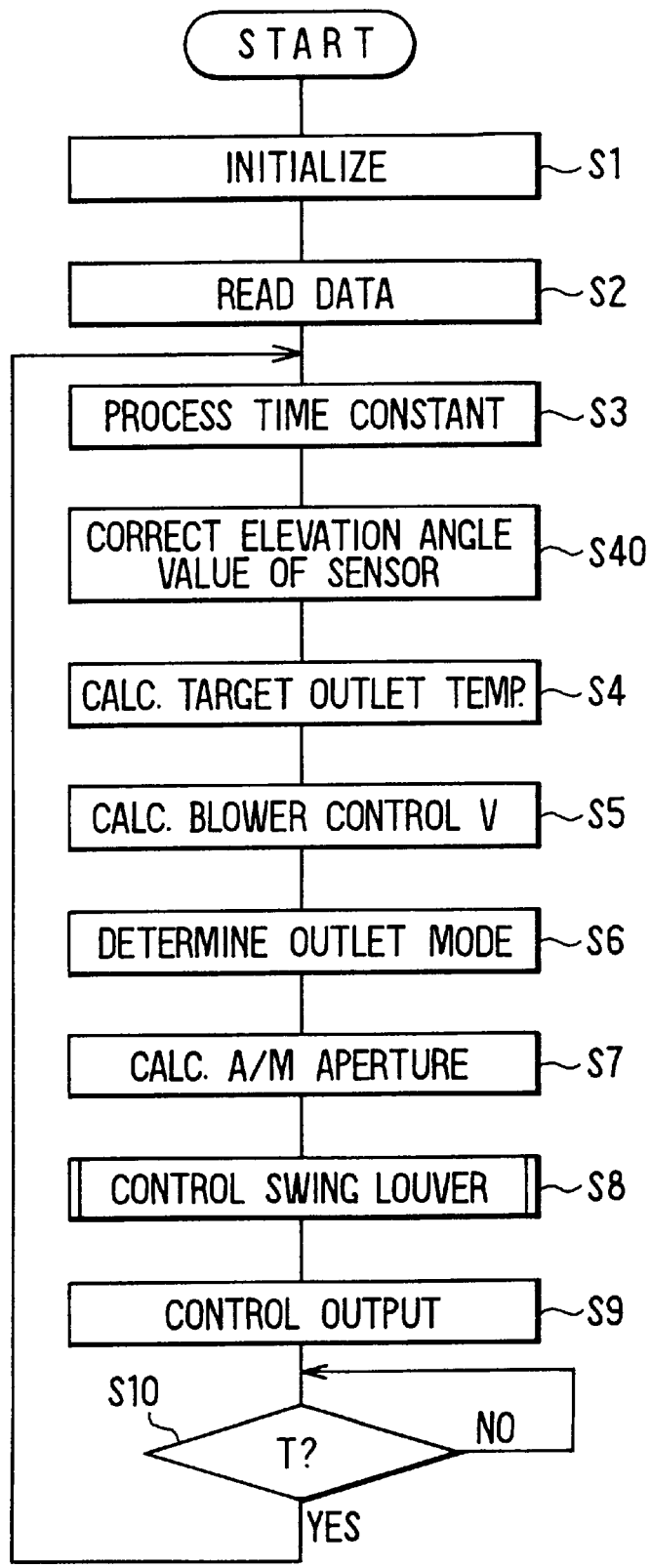
FIG. 71 is a flow diagram showing an example of a control program of an air-conditioning ECU according to an eleventh preferred embodiment of the present invention.
Figure 72:
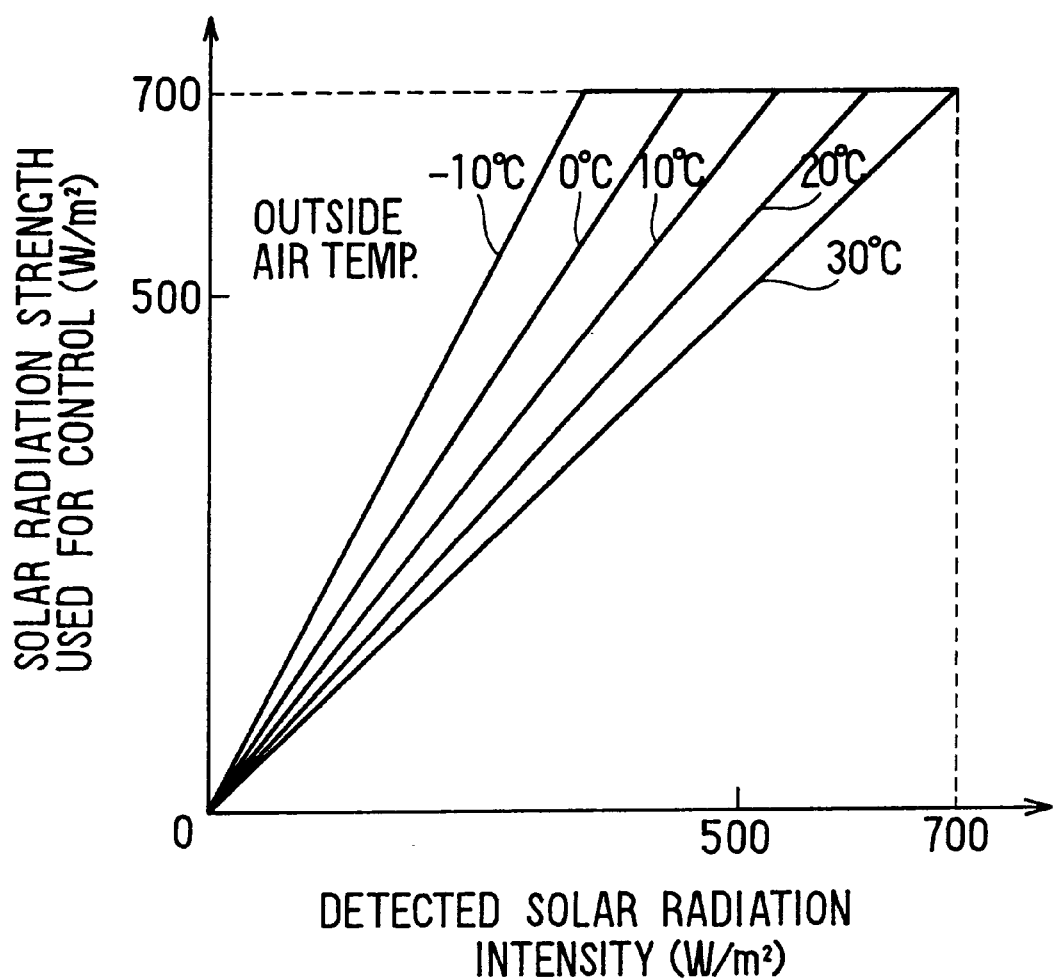
FIG. 72 is a graph showing a relationship between amount of solar radiation used for control (amount of corrected solar radiation) vs. amount of detected solar radiation in accordance with the eleventh preferred embodiment.

Next, an air-conditioning control implemented by the air-conditioning ECU 50 of this embodiment will be described on the basis of FIGS. 71 and 72. Description of steps corresponding to those in the flow diagram of FIG. 6 are omitted. Namely, after the time constant processing of step S3 is carried out, an elevation-angle correction of the value of solar radiation sensor is carried out similarly to that in step S35 in the flow diagram of FIG. 65 (step S40). This provides an amount of corrected solar radiation, for which an amount of detected solar radiation is corrected as shown in the graph of FIG. 72, to be used in step S4 to enable calculation of a target outlet temperature (TAO) that makes occupants feel comfortable.

Together with this, the calculation of the blower control voltage applied to the blower 4 in step S4, the outlet mode determination in step S6, and the A/M aperture calculation in step S7 can also provide the calculated blower control voltage, outlet mode and A/M aperture.

Other Preferred Embodiments

Although in the first preferred embodiment conditioned air was blown from the driver side side FACE outlet 22 and the passenger side side FACE outlet 32 even when the outlet mode was the FOOT mode or the F/D mode, conditioned air may alternatively be blown from the driver side side FACE outlet 22 and the passenger side side FACE outlet 32 only when the outlet mode is the FACE mode or the B/L mode. Also, the swing temporary stop control for temporarily stopping oscillation of the driver side and passenger side center and side louvers 41, 45 and random swing control of the driver side and passenger side center and side louvers 41, 45 may be utilized not only when the air-conditioning state is a cooling state, but also when the air-conditioning state is a heating state.

Whereas in the first preferred embodiment the driver and passenger side center swing grills and the driver and passenger side side swing grills were fixed to the instrument panel 40, alternatively each center and side swing grill may be rotatably mounted in the left-right direction to a housing member, or each center and side swing grill may be rotatably mounted in the up-down direction to a housing member. In this case, the swing grills may be made to oscillate as blowout state changing devices.

Whereas in the first preferred embodiment blowout state changing devices such as swing louvers or flow-directing grills for realizing swing ranges and changing blowout directions or blowout positions of conditioned air blown through outlets are provided in FACE outlets 21, 22, 31 and 32, blowout state changing devices such as flow-directing louvers or flow-directing grills may alternatively be provided in outlets located in the vehicle sides in the passenger compartment, in the middle of the passenger compartment (for example in the vicinity of a console box), or in the vehicle ceiling.

Although, in the first preferred embodiment as the swinging louvers for realizing a swing range and changing a blowout direction or blowout position of conditioned air blown through the outlets louvers 41 oscillating in the left-right direction and louvers 45 oscillating in the up-down direction were both provided at each of the FACE outlets, alternatively one or the other only of the louvers 41 oscillating in the left-right direction and louvers 45 oscillating in the up-down direction may be provided at each of the FACE outlets.

Whereas in the first preferred embodiment conditioned air was blown into the passenger compartment through the FACE outlets 21, 22, 31 and 32 of the air-conditioning duct 2 by a single blower 4, alternatively two blowers may be used so that the flow distribution of the conditioned air blown into the passenger compartment through the driver and passenger side FACE outlets of the air-conditioning duct 2 can be varied. Alternatively, a number of blowers corresponding to the number of FACE outlets may be used so that the flow distribution of the conditioned air blown into the passenger compartment through each of the FACE outlets of the air-conditioning duct 2 can be varied. In addition, the flow distribution to occupants may be changed independently for each FACE outlet or for one side.

Although in the first preferred embodiment the invention was applied to a vehicle air-conditioning system having a left-right independent temperature control type air-conditioning unit 1, the invention may alternatively be applied to a vehicle air-conditioning system having a front-rear independent temperature control type air-conditioning unit. Also, the invention can be applied to a vehicle air-conditioning system having an air-conditioning unit capable of carrying out temperature control inside a passenger compartment with a single blowout temperature change device.

The various functions of the invention can preferably be switched ON and OFF by occupants by operation of a multi-display or the like.

Whereas in the first preferred embodiment a solar radiation sensor 93 having a solar radiation strength detector was provided as air-conditioning load detecting device, alternatively a solar radiation sensor having a solar radiation strength detecting device, a solar radiation direction detecting device and a solar radiation height detecting device may be used. If as the solar radiation sensor the height of the sun of that day and time and the solar radiation direction with respect to the present position of the vehicle are stored in a microcomputer of a car navigation system, an output signal from that car navigation system may be read in to the air-conditioning ECU as a solar radiation sensor signal.

Alternatively, as the solar radiation sensor 93, a sensor having a solar radiation strength detecting device (for example a phototransistor, a photodiode or a solar cell) for detecting the amounts of solar radiation entering driver side and passenger side air-conditioning zones, a solar radiation direction detecting device (for example a photodiode, solar cell, or temperature-sensitive device such as a thermistor) for detecting the direction from which sunlight is incident (solar radiation direction, solar radiation bearing angle), and a solar radiation height detecting device (for example a photodiode, solar cell, or temperature-sensitive device such as a thermistor) for detecting the height of sunlight (solar radiation elevation angle, solar radiation height, sun elevation angle) may be used.

As the air-conditioning load detecting device for detecting the air-conditioning load in the passenger compartment, in addition to the solar radiation amount, the passenger compartment temperature, the difference between the passenger compartment temperature and the set temperature, the outside air temperature, the post-evaporator temperature, the cooling water temperature, the vehicle speed, the blower flow and the number of occupants are conceivable indicators, and sensors for detecting these values and temperature setting devices for setting temperatures can also be used as air-conditioning load detecting devices. Here, two inside air temperature sensors 91 may be used and disposed in a driver side air-conditioning zone and a passenger side air-conditioning zone.

Also, swing temporary stop control for temporarily stopping swinging of center and side louvers 41, 45 may be carried out independently for each of one or more air-conditioning zones. And swing temporary stop control for temporarily stopping swinging of center louvers 41, 45 of the driver side center FACE outlet 21 or side louvers 41, 45 of the driver side side FACE outlet 22 may be carried out independently. Similarly, swing temporary stop control for temporarily stopping swinging of center louvers 41, 45 of the passenger side center FACE outlet 31 or side louvers 41, 45 of the passenger side side FACE outlet 32 may be carried out independently.

Finally, although in the first preferred embodiment a method of counting pulses sent to the stepping motors 44, 48 or of detecting the operating position of the blowout state changing device using potentiometers was used as the method for detecting the operating position of the blowout state changing device, alternatively the operating position of the blowout state changing device may be detected by counting armature noise in servo motors having no potentiometers and thereby calculating the operating angle as with the stepping motors 44, 48.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A vehicle air-conditioning system comprising:
   an air-conditioning unit having an outlet for blowing conditioned air toward an air-conditioning zone;
   a blowout state changing device for changing a blowout state of the conditioned air blown from the outlet;
   an actuator for imparting an oscillating motion to the blowout state changing device;
   an air-conditioning load detector for detecting an air-conditioning load of the air-conditioning zone; and a blowout state controller for automatically controlling the actuator to inhibit the oscillating motion of the blowout state changing device for a predetermined time in a blowout direction when the air-conditioning load detected by the air-conditioning load detector is above a predetermined value.

2. A vehicle air-conditioning system according to claim 1, wherein the blowout state controller automatically controls the actuator by slowing or pausing the oscillation motion of the blowout state changing device in the blowout direction.

3. A vehicle air-conditioning system according to claim 1, wherein control of the actuator by the blowout state controller increases as the air-conditioning load detected by the air-conditioning load detector increases.

4. A vehicle air-conditioning system according to claim 1, wherein the predetermined blowout direction is an occupant blowout direction.

5. A vehicle air-conditioning system according to claim 4, wherein the occupant blowout direction is a front seat occupant blowout direction.

6. A vehicle air-conditioning system according to claim 1, wherein the blowout state controller inhibits the oscillating motion of the blowout state changing device by slowing the oscillating motion over an oscillation range of the blowout state changing device.

7. A vehicle air-conditioning system according to claim 6, wherein the blowout state controller controls the actuator so that the oscillating range over which the blowout state changing device is inhibited increases as the air-conditioning load detected by the air-conditioning load detector decreases.

8. A vehicle air-conditioning system according to claim 1, wherein the blowout state controller is further for controlling the actuator to inhibit the oscillating motion of the blowout state changing device for a predetermined time in a diffusion blowout direction when the detected air-conditioning load is below a predetermined value.

9. A vehicle air-conditioning system according to claim 8, wherein the diffusion blowout direction is a rear seat occupant direction.

10. A vehicle air-conditioning system according to claim 8, wherein the blowout state controller further controls the actuator so that a time for which the oscillating motion of the blowout state changing device is inhibited in a diffusion blowout direction increases as the air-conditioning load detected by the air-conditioning load detector decreases.

11. A vehicle air-conditioning system according to claim 1, wherein the blowout controller includes a louver control panel for providing selective control of conditioned air blown from face outlets in predetermined occupant zones.

12. A vehicle air-conditioning system according to claim 1, wherein the air-conditioning load detector is a solar radiation information detector for detecting solar radiation information entering the air-conditioning zone, and the direction at which the oscillating motion of the blowout state changing device is inhibited is in a vicinity corresponding to a part of an occupant upon which it is estimated that solar radiation detected by the solar radiation information detector is incident.

13. A vehicle air-conditioning system according to claim 1, wherein the blowout state controller inhibits oscillation of the blowout state changing device by determining one of an oscillation pause position, a slow oscillation position, an occupant-concentration position, and a blowout range at the occupant direction in accordance with the air-conditioning load detected by the air-conditioning load detector.

14. A vehicle air-conditioning system according to claim 1, wherein the air-conditioning load detector is a solar radiation information detector for detecting information concerning solar radiation entering an air-conditioning zone, and one of an oscillation pause position, a slow oscillation position, an occupant-concentration position and a blowout range at the occupant direction is directed to an occupant upon which it is estimated that solar radiation detected by the solar radiation information detector is incident.

15. A vehicle air-conditioning system according to claim 1, wherein the blowout state changing device comprises a drum ventilator rotatably mounted within a casing in the air-conditioning unit outlet, and a plurality of vertical and cross louvers pivotably supported within the drum ventilator for being oscillated by the actuator.

16. A vehicle air-conditioning system according to claim 1, wherein the blowout state changing device comprises an elongate air outlet louver rotatably mounted in the air conditioning unit outlet.

17. A vehicle air-conditioning system according to claim 1, wherein the blowout state changing device comprises an elongate rotary valve rotatably positioned at the air-conditioning unit outlet and contoured to cause a change conditioned air flow through the outlet when oscillated by the actuator.

18. A vehicle air-conditioning system according to claim 1, wherein the predetermined time is determined from one or more parameters selected from a group consisting of:

an outside air temperature, an air-conditioning initial post-evaporator temperature, an air-conditioning initial passenger compartment temperature, an air-conditioning initial outlet temperature, an air-conditioning initial draft flow, an air-conditioning initial blower voltage, an outlet mode, an amount of solar radiation, a set temperature, a difference between an air-conditioning initial passenger compartment temperature and a set temperature, an initial seat temperature, an initial steering wheel temperature, and a vehicle speed.

19. A vehicle air-conditioning system according to claim 18, wherein the predetermined time during cooling increases as one of the outside air temperature, the air-conditioning initial post-evaporator temperature, the air-conditioning initial passenger compartment temperature, the air-conditioning initial outlet temperature, the air-conditioning initial draft flow, the air-conditioning initial blower voltage, and the amount of solar radiation increases, or as the outlet mode minimizes the draft flow to an occupant's upper body, or as the solar radiation direction is in a direction such that the heat load imposed on an occupant increases, or as the set temperature or the vehicle speed increases.

20. A vehicle air-conditioning system according to claim 18, wherein the predetermined time during heating increases as one of the outside air temperature, the air-conditioning initial post-evaporator temperature, the air-conditioning initial passenger compartment temperature, the air-conditioning initial outlet temperature, the air-conditioning initial draft flow, the air-conditioning initial blower voltage, the amount of solar radiation and the vehicle speed decreases, or as the outlet mode decreases such that the draft flow to an occupant's lower body decreases, or as the solar radiation direction is a direction such that the heat load imposed on an occupant decreases, or as the set temperature increases.

21. A vehicle air-conditioning system according to claim 1, further comprising a plurality of outlets for blowing air conditioning drafts toward a plurality of air-conditioning zones;

a plurality of blowout state changing devices for changing a blowout state of the air-conditioning drafts blown from the plurality of outlets;

a plurality of actuators for imparting an oscillating motion to the plurality of blowout state changing means; and a plurality of air-conditioning load detectors each for detecting an air-conditioning load in a respective one of the plurality of air-conditioning zones.

22. A vehicle air-conditioning system according to claim 21, wherein the plurality of blowout state changing devices comprise a face door for changing an amount of conditioned air flowing through a face duct to a plurality of face outlets, and driver and passenger side face doors for changing amounts of conditioned air flow through driver and passenger face outlets, respectively.

23. A vehicle air-conditioning system according to claim 21, wherein the blowout state controller is for controlling the actuators so that for each of different air-conditioning zones a total time for which the respective blowout state changing devices are inhibited in an occupant blowout direction, and a time for which the oscillating motion of the respective blowout state changing devices is inhibited over a range covering a passenger compartment diffuse blowout time, are substantially the same.

24. A vehicle air-conditioning system according to claim 23, wherein the occupant blowout direction is a front seat occupant blowout direction.

25. A vehicle air-conditioning system according to claim 21, further comprising a plurality of air-conditioning load detecting devices for detecting an air-conditioning load in each of the plurality of air-conditioning zones.

26. A vehicle air-conditioning system according to claim 25, wherein the blowout state controller controls the actuators of the plurality of blowout state changing devices so that when air-conditioning loads detected by the air-conditioning load detectors are above predetermined values, control of each of the plurality of blowout state changing devices is substantially the same even when there is a difference in air-conditioning loads between different air-conditioning zones.

27. A vehicle air-conditioning system according to claim 25, wherein the blowout state controller controls actuators of the blowout state changing device so that when air-conditioning loads detected by the air-conditioning load detectors are above predetermined values, control of different blowout state changing devices among the plurality of blowout state changing devices is less than when the air-conditioning loads are below predetermined values, even when there is a difference in air-conditioning loads between different air-conditioning zones.

28. A vehicle air-conditioning system according to claim 25, wherein the blowout state controller controls the actuators of the blowout state changing devices such that, even when there is a difference in air-conditioning loads between different air-conditioning zones, control parameters of the plurality of blowout state changing devices converge as an air-conditioning loads detected by the air-conditioning load detectors increase.

29. A vehicle air-conditioning system according to claim 21, wherein the plurality of blowout state changing devices comprise a plurality of louvers, and further comprising a plurality of potientiometers connected to the actuators for detecting present positions of the plurality of louvers.

30. A vehicle air-conditioning system according to claim 1, wherein an air-conditioning load above a predetermined value during cooling is detected from one or more parameters from a group consisting of:

a post-evaporator temperature, a passenger compartment temperature, a skin temperature, an outlet temperature, a target outlet temperature, a seat temperature above a predetermined value, a steering wheel temperature above a predetermined value, a blower flow, a draft flow above a predetermined value, an amount of solar radiation in a direction of an occupant's upper body being above a predetermined value, a blower voltage above a predetermined voltage; a solar radiation direction changed in such a direction as to raise a heat load imposed on an occupant, an executed set temperature reducing operation, an outlet mode switched to a mode such that a draft flow to an occupant's upper body is decreased, a difference between a set temperature and a passenger compartment temperature above a predetermined value, a vehicle speed below a predetermined value, and a set temperature below a predetermined value.

31. A vehicle air-conditioning system according to claim 1, wherein an air conditioning load above a predetermined value during heating is detected from one or more parameters from a group consisting of:

a post-evaporator temperature, a passenger compartment temperature, a skin temperature, an outlet temperature, a target outlet temperature, a seat temperature, a steering wheel temperature below a predetermined value, a set temperature below a predetermined value, a blower flow, or a draft flow or amount of solar radiation in the direction of an occupant's upper body, above a predetermined value, a blower voltage above a predetermined blower voltage, a solar radiation direction having changed in such a direction as to raise a heat load imposed on an occupant, an occupant having performed a set temperature increasing operation, an outlet mode having switched to a mode such that a draft flow to an occupant's lower body is decreased, a difference between a set temperature and a passenger compartment temperature above a predetermined value, and a vehicle speed below a predetermined value.

32. A vehicle air-conditioning system according to claim 1, wherein an air-conditioning load below a predetermined value during cooling is detected from one or more of a group of parameters consisting of:

a post-evaporator temperature, a passenger compartment temperature, a skin temperature, an outlet temperature, a target outlet temperature, a seat temperature, a steering wheel temperature below a predetermined value; a vehicle speed below a predetermined value, a blower flow below a predetermined value, a draft flow amount of solar radiation in the direction of an occupant's upper body below a predetermined value, a blower voltage below a predetermined voltage, a solar radiation direction changed in such a direction as to lower a heat load imposed on an occupant, an executed set temperature increasing operation, an outlet mode switched to a mode such that a draft flow to an occupant's lower body is increased, a difference between a set temperature and a passenger compartment temperature being below a predetermined value, and a vehicle speed or a set temperature being above a predetermined value.

33. A vehicle air-conditioning system according to claim 1, wherein an air-conditioning load below a predetermined value during heating is detected from one or more of a group of parameters consisting of:

a post-evaporator temperature, a passenger compartment temperature, a skin temperature, an outlet temperature, a target outlet temperature, a seat temperature, a steering wheel temperature, a vehicle speed above a predetermined value, a set temperature above a predetermined value, a blower flow below a predetermined value, a draft flow amount of solar radiation in the direction of an occupant's upper body below a predetermined value, a blower voltage below a predetermined blower voltage, a solar radiation direction changed in such a direction as to lower a heat load imposed on an occupant, an executed set temperature reducing operation, a switched outlet mode that increases a draft flow to an occupant's upper body, a difference between a set temperature and a passenger compartment temperature being below a predetermined value, and a vehicle speed being below a predetermined value.

34. A vehicle air-conditioning system comprising:
an air-conditioning unit having a plurality of outlets for blowing conditioned air toward a plurality of air-conditioning zones;
a plurality of blowout state changing devices for changing blowout states of the conditioned air blown from the plurality of outlets;
actuators for imparting an oscillating motion to the blowout state changing devices; and
a blowout state controller for automatically controlling the actuators so that a timing with which the blowout state changing devices approach and move away from respective most adjacent air-conditioning zones is substantially the same during oscillation of the plurality of blowout state changing devices.

35. A vehicle air-conditioning system according to claim 34, wherein the plurality of blowout state changing devices comprise a face door for changing an amount of conditioned air flowing through a face duct to a plurality of face outlets, and driver and passenger side face doors for changing amounts of conditioned air flow through driver and passenger face outlets, respectively.

36. A vehicle air-conditioning system according to claim 34, wherein the blowout state controller is for controlling the actuators so that for each of different air-conditioning zones a total time for which the respective blowout state changing devices are paused or slowed in an occupant blowout direction, and a time for which the oscillation of the respective blowout state changing devices is paused or slowed over a range during a passenger compartment diffuse blowout time, are substantially the same.

37. A vehicle air-conditioning system according to claim 36, wherein the occupant blowout direction is a front seat occupant blowout direction.

38. A vehicle air-conditioning system according to claim 34, further comprising a plurality of air-conditioning load detectors for detecting an air-conditioning load in each of the plurality of air-conditioning zones.

39. A vehicle air-conditioning system according to claim 38, wherein the blowout state controller controls the actuators of the plurality of blowout state changing devices so that when the air-conditioning loads detected by the air-conditioning load detectors are above a predetermined value, control of each of the plurality of blowout state changing devices is substantially the same even when there is a difference in air-conditioning load between different air-conditioning zones.

40. A vehicle air-conditioning system according to claim 38, wherein the blowout state controller controls actuators of the blowout state changing device so that when air-conditioning loads detected by the air-conditioning load detectors are above a predetermined value, control of different blowout state changing devices among the plurality of blowout state changing devices is less than when the air-conditioning load is below a predetermined value, even when there is a difference in air-conditioning load between different air-conditioning zones.

41. A vehicle air-conditioning system according to claim 38, wherein the blowout state controller controls the actuators of the blowout state changing devices such that, even when there is a difference in air-conditioning loads among different air-conditioning zones, control parameters of different blowout state changing devices among the plurality of blowout state changing devices converge as an air-conditioning loads detected by the air-conditioning load detectors increase.

42. A vehicle air-conditioning system according to claim 38, wherein air-conditioning loads above a predetermined value during cooling are determined from one or more parameters from a group consisting of:
a post-evaporator temperature, a passenger compartment temperature, a skin temperature, an outlet temperature, a target outlet temperature, a seat temperature above a predetermined value, a steering wheel temperature above a predetermined value, a blower flow, a draft flow above a predetermined value, an amount of solar radiation in a direction of an occupant's upper body being above a predetermined value, a blower voltage above a predetermined voltage; a solar radiation direction changed in such a direction as to raise a heat load imposed on an occupant, an executed set temperature reducing operation, an outlet mode switched to a mode such that a draft flow to an occupant's upper body is decreased, a difference between a set temperature and a passenger compartment temperature above a predetermined value, a vehicle speed below a predetermined value, and a set temperature below a predetermined value.

43. A vehicle air-conditioning system according to claim 38, wherein air conditioning loads above a predetermined value during heating are determined from one or more parameters from a group consisting of:
a post-evaporator temperature, a passenger compartment temperature, a skin temperature, an outlet temperature, a target outlet temperature, a seat temperature, a steering wheel temperature below a predetermined value, a set temperature below a predetermined value, a blower flow, or a draft flow or amount of solar radiation in the direction of an occupant's upper body, above a predetermined value, a blower voltage above a predetermined blower voltage, a solar radiation direction having changed in such a direction as to raise a heat load imposed on an occupant, an occupant having performed a set temperature increasing operation, an outlet mode having switched to a mode such that a draft flow to an occupant's lower body is decreased, a difference between a set temperature and a passenger compartment temperature above a predetermined value, and a vehicle speed below a predetermined value.

44. A vehicle air-conditioning system according to claim 38, wherein air-conditioning loads below a predetermined value during cooling are determined from one or more of a group of parameters consisting of:
a post-evaporator temperature, a passenger compartment temperature, a skin temperature, an outlet temperature, a target outlet temperature, a seat temperature, a steering wheel temperature below a predetermined value; a vehicle speed below a predetermined value, a blower flow below a predetermined value, a draft flow amount of solar radiation in the direction of an occupant's upper body below a predetermined value, a blower voltage below a predetermined voltage, a solar radiation direction changed in such a direction as to lower a heat load imposed on an occupant, an executed set temperature increasing operation, an outlet mode switched to a mode such that a draft flow to an occupant's lower body is increased, a difference between a set temperature and a passenger compartment temperature being below a predetermined value, and a vehicle speed or a set temperature being above a predetermined value.

45. A vehicle air-conditioning system according to claim 38, wherein air-conditioning loads below a predetermined value during heating are determined from one or more of a group of parameters consisting of:

a post-evaporator temperature, a passenger compartment temperature, a skin temperature, an outlet temperature, a target outlet temperature, a seat temperature, a steering wheel temperature, a vehicle speed above a predetermined value, a set temperature above a predetermined value, a blower flow below a predetermined value, a draft flow amount of solar radiation in the direction of an occupant's upper body below a predetermined value, a blower voltage below a predetermined blower voltage, a solar radiation direction changed in such a direction as to lower a heat load imposed on an occupant, an executed set temperature reducing operation, a switched outlet mode that increases a draft flow to an occupant's upper body, a difference between a set temperature and a passenger compartment temperature being below a predetermined value, and a vehicle speed being below a predetermined value.

46. A vehicle air-conditioning system according to claim 38, wherein at least one air-conditioning zone is controlled independently from other air-conditioning zones.

47. A vehicle air-conditioning system according to claim 38, wherein at least one blowout state changing device is controlled independently of the other blowout state changing devices.

48. A vehicle air-conditioning system according to claim 34, wherein the plurality of blowout state changing devices comprise a plurality of louvers, and further comprising a plurality of potientiometers connected to the actuators for detecting present positions of the plurality of louvers.

49. A vehicle air-conditioning system comprising:

an air-conditioning unit having an outlet for blowing conditioned air toward a passenger compartment;

a blowout state changing device capable of changing a blowout state of the conditioned air blown from the outlet;

an actuator for driving the blowout state changing means;

a solar radiation amount detector for detecting an amount of solar radiation entering the passenger compartment;

an outside air temperature detector for detecting a temperature of air outside the passenger compartment; and a blowout state controller for controlling the actuator so that the amount of solar radiation detected by the solar radiation amount detector is corrected based on the temperature of air outside the passenger compartment detected by the outside air temperature detector, and the operating condition of the blowout state changing device is changed based on the corrected amount of solar radiation.

50. A vehicle air-conditioning system according to claim 49, wherein the blowout state controller is further for correcting the amount of detected solar radiation detected by the solar radiation amount detector depending on air temperature outside the passenger compartment detected by the outside air temperature detector, and for changing one of an amount of a blower flow, a target outlet temperature, an outlet flow, an outlet temperature, an outlet mode and a blowout state depending on the amount of corrected solar radiation.

51. A vehicle air-conditioning system according to claim 49, wherein the amount of detected solar radiation is corrected to become larger when the temperature of air outside the passenger compartment detected by the outside air temperature detector is below a predetermined temperature.

52. A vehicle air-conditioning system according to claim 49, wherein the amount of detected solar radiation is corrected to become larger as the temperature of air outside the passenger compartment detected by the outside air temperature detector becomes smaller.

\* \* \* \* \*